US008010837B2

(12) United States Patent
Kawaguchi et al.

(10) Patent No.: US 8,010,837 B2
(45) Date of Patent: *Aug. 30, 2011

(54) STORAGE SUB SYSTEM AND DATA RESTORATION METHOD THEREOF

(75) Inventors: Tomohiro Kawaguchi, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/563,615

(22) Filed: Sep. 21, 2009

(65) Prior Publication Data

US 2010/0011239 A1    Jan. 14, 2010

Related U.S. Application Data

(63) Continuation of application No. 11/367,677, filed on Mar. 6, 2006, now Pat. No. 7,594,137.

(30) Foreign Application Priority Data

Jan. 25, 2006   (JP) .................................. 2006-016409

(51) Int. Cl.
*G06F 11/00* (2006.01)
(52) U.S. Cl. ......................................................... 714/6.3
(58) Field of Classification Search .................. 707/202, 707/204; 711/162; 714/6, 15, 6.3
See application file for complete search history.

(56) References Cited

U.S. PATENT DOCUMENTS

| | | | |
|---|---|---|---|
| 5,210,866 A | 5/1993 | Milligan et al. | |
| 5,995,983 A | 11/1999 | Mano | |
| 6,055,547 A | 4/2000 | Cooper et al. | |
| 6,205,449 B1 | 3/2001 | Rastogi et al. | |
| 6,609,183 B2 | 8/2003 | Ohran | |
| 6,636,954 B2 | 10/2003 | Maeda | |
| 6,668,264 B1 | 12/2003 | Patterson et al. | |
| 6,701,455 B1 | 3/2004 | Yamamoto et al. | |
| 6,771,843 B1 | 8/2004 | Huber et al. | |
| 6,792,518 B2 | 9/2004 | Armangau et al. | |

(Continued)

FOREIGN PATENT DOCUMENTS

EP    0584804    4/1996

(Continued)

OTHER PUBLICATIONS

Extended European Search Report in EP 06253379.0, dated Apr. 22, 2009 (pp. 1-10).

(Continued)

*Primary Examiner* — Robert Beausoliel, Jr.
*Assistant Examiner* — Joshua Lottich
(74) *Attorney, Agent, or Firm* — Antonelli, Terry, Stout & Kraus, LLP.

(57) ABSTRACT

This storage system includes a first storage sub system having a first logical volume where a first data area is dynamically allocated to each prescribed area, and which stores data transmitted from a host computer in the first data area, and a second storage sub system having a second data area for backing up the first logical volume; wherein the first storage sub system includes: a first management unit for managing the status of the first data area allocated to each of the areas of the first logical volume; a transfer unit for transferring the data stored in the first data area allocated to each of the areas of the first logical volume to the second storage sub system; and a restoration unit for restoring the first logical volume based on the status of the first data area managed by the first management unit and/or the data transferred from the second storage sub system.

23 Claims, 33 Drawing Sheets

U.S. PATENT DOCUMENTS

| | | | |
|---|---|---|---|
| 6,802,025 B1 | 10/2004 | Thomas et al. |
| 6,862,671 B1 | 3/2005 | Bergsten |
| 6,895,416 B2 | 5/2005 | Gara et al. |
| 6,938,135 B1 | 8/2005 | Kekre et al. |
| 6,948,038 B2 | 9/2005 | Berkowitz et al. |
| 7,055,010 B2 | 5/2006 | Lin et al. |
| 7,085,785 B2 | 8/2006 | Sawdon et al. |
| 7,162,600 B2 | 1/2007 | Kano et al. |
| 7,206,961 B1 | 4/2007 | Mutalik et al. |
| 7,237,075 B2 | 6/2007 | Welsh et al. |
| 7,237,080 B2 | 6/2007 | Green et al. |
| 7,284,104 B1 | 10/2007 | Wu et al. |
| 7,308,546 B1 | 12/2007 | Colgrove et al. |
| 7,328,319 B1 | 2/2008 | Bottomley |
| 7,350,042 B1 | 3/2008 | Kekre et al. |
| 7,373,366 B1 | 5/2008 | Chatterjee et al. |
| 7,376,678 B2 | 5/2008 | Yamanaka et al. |
| 7,389,394 B1 | 6/2008 | Karr et al. |
| 7,409,495 B1 | 8/2008 | Kekre et al. |
| 7,412,583 B2 | 8/2008 | Burton et al. |
| 7,421,617 B2 | 9/2008 | Anderson et al. |
| 7,472,239 B2 | 12/2008 | Horiuchi et al. |
| 2002/0059505 A1 | 5/2002 | St. Pierre et al. |
| 2003/0177306 A1 | 9/2003 | Cochran et al. |
| 2004/0044705 A1 | 3/2004 | Stager et al. |
| 2004/0181642 A1 | 9/2004 | Watanabe et al. |
| 2004/0230766 A1 | 11/2004 | Cameron |
| 2004/0236772 A1 | 11/2004 | Arakawa et al. |
| 2004/0260861 A1 | 12/2004 | Serizawa et al. |
| 2004/0267835 A1 | 12/2004 | Zwilling et al. |
| 2004/0268070 A1 | 12/2004 | Hasegawa |
| 2005/0044310 A1 | 2/2005 | Cameron |
| 2005/0120092 A1 | 6/2005 | Nakano et al. |
| 2005/0125609 A1 | 6/2005 | Satoyama et al. |
| 2005/0138313 A1 | 6/2005 | Kasako et al. |
| 2005/0138315 A1 | 6/2005 | Eguchi et al. |
| 2005/0172166 A1 | 8/2005 | Eguchi et al. |
| 2005/0216682 A1 | 9/2005 | Shinozaki et al. |
| 2005/0235107 A1 | 10/2005 | Ohno et al. |
| 2005/0246576 A1 | 11/2005 | Takayama |
| 2005/0289309 A1 | 12/2005 | Suzuki |
| 2006/0206544 A1 | 9/2006 | Oks et al. |
| 2006/0212481 A1 | 9/2006 | Stacey et al. |
| 2006/0224844 A1 | 10/2006 | Kano et al. |
| 2006/0259687 A1 | 11/2006 | Thomas et al. |
| 2006/0259727 A1 | 11/2006 | Thomas et al. |
| 2007/0011213 A1 | 1/2007 | Burton et al. |
| 2007/0022144 A1 | 1/2007 | Chen |
| 2007/0055835 A1 | 3/2007 | Malkin et al. |
| 2007/0088924 A1 | 4/2007 | Jean-Denis et al. |
| 2007/0294321 A1 | 12/2007 | Midgley et al. |

FOREIGN PATENT DOCUMENTS

| | | |
|---|---|---|
| JP | 2003-122509 | 4/2003 |
| JP | 2005-011316 | 1/2005 |
| JP | 2005-18233 | 1/2005 |

OTHER PUBLICATIONS

Office Action in JP 2006-016409, dated Apr. 26, 2011, (in Japanese, 3 pgs.), [English language translation, 2 pgs.].

| VOLUME BLOCK NUMBER (11231) | DATA AREA ALLOCATION STATUS (11232) | DATA AREA ID (11233) |
|---|---|---|
| 1 | YES | 387 |
| 2 | NO | NULL |
| 3 | NO | NULL |
| 4 | YES | 32 |
| 5 | YES | 199 |
| 6 | NO | NULL |
| 7 | YES | 827 |
| 8 | NO | NULL |

| VOLUME BLOCK NUMBER (11241) | DATA AREA ALLOCATION STATUS (11242) |
|---|---|
| 1 | YES |
| 2 | NO |
| 3 | NO |
| 4 | YES |
| 5 | YES |
| 6 | NO |
| 7 | YES |
| 8 | NO |

FIG.15

| ID | WWN | ALLOCATION BITMAP |
|---|---|---|
| 1 | NULL | |
| 2 | 10:00<br>:00:60:69<br>:00:60:53 | |
| 3 | 10:00<br>:00:60:69<br>:00:60:53 | |
| 4 | 10:00<br>:00:60:69<br>:00:73:34 | |

31241, 31242, 31243, 3124

STORAGE SUB SYSTEM AND DATA RESTORATION METHOD THEREOF

CROSS-REFERENCES TO RELATED APPLICATIONS

This application is a continuation of U.S. application Ser. No. 11/367,677, filed Mar. 6, 2006, now U.S. Pat. No. 7,594,137 and, which application relates to and claims priority from Japanese Patent Application No. 2006-016409, filed on Jan. 25, 2006, the entire disclosure of which is incorporated herein by reference.

BACKGROUND

The present invention relates to a storage system and its data restoration method, and, for instance, is suitably employed in technology for performing the backup of a storage sub system having a function of dynamically allocating a data area of a volume storing data, and restoring such backup data.

Conventionally, a storage sub system having a function of dynamically allocating a data area of a volume storing data is known, and various types of technologies relating to such storage sub system have been proposed.

For example, Japanese Patent Laid-Open Publication No. 2005-11316 discloses a storage system having a storage sub system, and a switch device for dynamically allocating a data area in the storage sub system to a virtual volume. In this case, when a write request from a host computer is received in the switch device with this storage system, upon receiving such write request from the host computer, the storage sub system dynamically allocates a data area to the virtual volume, and updates a mapping table recording the correspondence of the virtual volume and the data area in the storage sub system allocated to such virtual volume.

Further, with this storage system, the mapping table is updated in the switch device, allocation of the data area no longer used by the host computer among the data areas allocated to the virtual volume is released, and further the mapping table is further updated.

Meanwhile, Japanese Patent Laid-Open Publication No. 2003-122509 discloses a storage system having a remote copy function of restoring the storage sub system by replicating (backing up) data by transferring it to a remote storage sub system, and returning the backup data in the event of a disaster such as the loss of data in the storage sub system. In this case, the storage system transfers data synchronously or asynchronously with the remote storage sub system, and manages the progress thereof.

Further, with this storage system, when backing up data and storing it for a long period of time, data of all areas of the storage sub system is stored in a tape library of a tape device managed by a server installed for controlling such backup.

Nevertheless, when combining the foregoing function of dynamically allocating the data area and the remote copy function, upon restoring the backup data, it becomes necessary to write data in all areas of a virtual volume in the storage sub system of the restoration destination.

In particular, when the storage sub system of the backup destination is a tape device or an old model and does not possess the function of dynamically allocating a data area, upon performing backup, information concerning the allocated data area will be lost, and, in connection with this, upon performing restoration, an unnecessary data area will be allocated to the virtual volume of the storage sub system. Thus, a problem will arise in that the data area is wastefully consumed, and, as a result, the data area of the storage sub system cannot be used efficiently.

SUMMARY

This invention was devised in view of the foregoing problems, and an object thereof is to provide a storage system and its data restoration method capable of promoting the efficiency in using a data area.

In order to achieve the foregoing object, this invention provides a storage system including a first storage sub system having a first logical volume where a first data area is dynamically allocated to each prescribed area, and which stores data transmitted from a host computer in the first data area, and a second storage sub system having a second data area for backing up the first logical volume; wherein the first storage sub system includes: a first management unit for managing the status of the first data area allocated to each of the areas of the first logical volume; a transfer unit for transferring the data stored in the first data area allocated to each of the areas of the first logical volume to the second storage sub system; and a restoration unit for restoring the first logical volume based on the status of the first data area managed by the first management unit and/or the data transferred from the second storage sub system.

Accordingly, upon restoring the first logical volume, it is possible to effectively prevent the allocation of an unnecessary data area to the first logical volume and the wasteful consumption of the data area, and, as a result, the data area can be efficiently allocated to the first logical volume.

Further, this invention also provides a data restoration method of a storage system including a first storage sub system having a first logical volume where a first data area is dynamically allocated to each prescribed area, and which stores data transmitted from a host computer in the first data area, and a second storage sub system having a second data area for backing up the first logical volume, including: a first step for managing the status of the first data area allocated to each of the areas of the first logical volume; a second step for transferring the data stored in the first data area allocated to each of the areas of the first logical volume to the second storage sub system; and a third step for restoring the first logical volume based on the status of the first data area managed at the first step and/or the data transferred from the second storage sub system.

Accordingly, upon restoring the first logical volume, it is possible to effectively prevent the allocation of an unnecessary data area to the first logical volume and the wasteful consumption of the data area, and, as a result, the data area can be efficiently allocated to the first logical volume.

According to this invention, by managing the status of the first data area allocated to each of the areas of the first logical volume; transferring the data stored in the first data area allocated to each of the areas of the first logical volume to the second storage sub system; and thereafter restoring the first logical volume based on the status of the first data area managed at the first step and/or the data transferred from the second storage sub system, upon restoring the first logical volume, it is possible to effectively prevent the allocation of an unnecessary data area to the first logical volume and the wasteful consumption of the data area, and, as a result, the data area can be efficiently allocated to the first logical volume. It is thereby possible to realize a storage system and its data restoration method capable of promoting the efficiency in using a data area.

DESCRIPTION OF DRAWINGS

FIG. 2 is a diagram showing the configuration of a table for managing the allocation of data areas in the first embodiment;

FIG. 3 is a diagram showing the configuration of a table enabling the specification of areas to which data areas of the target backup data based on FIG. 2 in the first embodiment were allocated;

FIG. 15 is a diagram showing the configuration of a table enabling the specification of areas to which data areas of the target backup data in the third embodiment were allocated;

DETAILED DESCRIPTION

Embodiments of the present invention are now explained with reference to the drawings. Incidentally, the present invention shall not be limited by the embodiments described below.

(1) First Embodiment (1-1) Configuration of Storage System in First Embodiment

Figure 1:
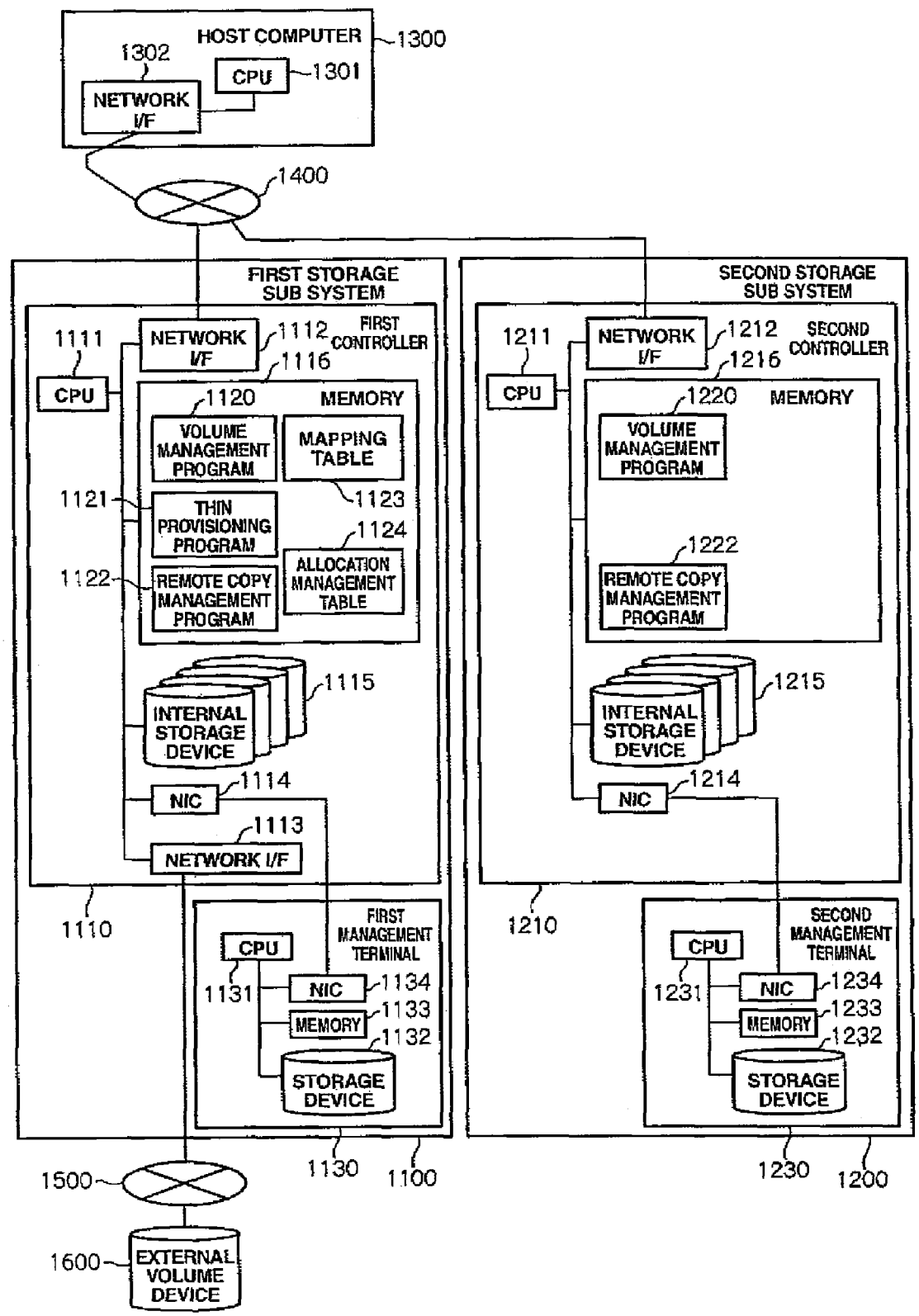
FIG. 1 is a diagram showing the overall configuration in the first embodiment.

FIG. 1 is a diagram showing the configuration of the storage system applying this invention in the first embodiment. The storage system 1000 according to this embodiment is configured by a first storage sub system 1100, a second storage sub system 1200 and a host computer 1300 being connected via a network 1400 such as a SAN (Storage Area Network).

Incidentally, in this embodiment, although a configuration is illustrated where the first storage sub system 1100, second storage sub system 1200 and host computer 1300 are connected via the same network 1400, in addition to this configuration, the network between the first storage sub system 1100 and host computer 1300, and the network between the first storage sub system 1100 and second storage sub system 1200 may be separated.

Here, a storage sub system is a system that consolidates a plurality of hard disk drives or the like, manages these hard disk drives or the like with a RAID (Redundant Array of Independent Disks) or JBOD (Just Bunch Of Disks) configuration, and provides these as a logical storage area to a host computer. Incidentally, this logical storage area is referred to as a volume.

The first storage sub system 1100 is configured from a first controller 1110 and a first management terminal 1130, and is capable of performing maintenance operations such as creating volumes and setting various functions with the first management terminal 1130. Further, the host computer 1300 may also be used to set the various functions.

Further, the first storage sub system 1100 is connected to an external volume device 1600 via a prescribed network 1500.

The first controller 1110 is configured from one or more CPUs (Central Processing Units) 1111 for controlling the overall first controller 1110, a network i/F (Interface) 1112 for connecting to the network 1400, a network I/F 1113 for connecting to the network 1500, an NIC (Network Interface Card) 1114 for connecting to the first management terminal 1130, an internal storage device 1115 formed from a plurality of hard disk drives or the like storing various types of configuration information or programs of the first controller 1110 as well as data transmitted from the host computer 1300, and a memory 1116 for expanding such various types of configuration information or programs.

Expanded in the memory 1116 are a volume management program 1120, a thin provisioning program 1121, a remote copy management program 1122, a mapping table 1123 and an allocation management table 1124. The volume management program 1120, thin provisioning program 1121, and remote copy management program 1122 are programs to be executed with the CPU 1111.

The first management terminal 1130 is configured from one or more CPUs 1131 for controlling the overall first management terminal 1130, a storage device 1132 storing various types of information and programs of the first controller 1110, a memory 1133 for expanding various types of configuration information and programs, and an NIC 1134 for connecting to the first controller 1110.

Meanwhile, the second storage sub system 1200 is configured from a second controller 1210 and a second management terminal 1230, and is capable of performing maintenance operations such as creating volumes and setting various functions with the second management terminal 1230.

The second controller 1210 is configured the same as the first controller 1110 other than that it is not provided with a network I/F for connecting to the network 1500, and that a thin provisioning program, a mapping table and a allocation management table are not expanded (provided) in the memory 1116, and is configured from a CPU 1211, a network I/F 1212, an NIC 1214, an internal storage device 1215 and a memory 1216.

Expanded in the memory 1216 are a volume management program 1220 and a remote copy management program 1221. The volume management program 1220 and remote copy management program 1221 are programs to be executed with the CPU 1211.

The second management terminal 1230 is configured the same as the first management terminal 1130, and is configured from a CPU 1231, a storage device 1232, a memory 1233 and an NIC 1234.

Meanwhile, the host computer 1300 is a computer device having a CPU 1301 and a network I/F 1302 for connecting to the network 1400, and, for instance, is configured from a server having UNIX (registered trademark) or Windows (registered trademark) as its OS (Operation System). Further, the host computer 1300 also has an information processing resource such as a memory. Moreover, the host computer 1300 is connected to a personal computer or workstation as an information I/O device via a network.

In this case, management of the volume of the first storage sub system 1100 is conducted by the volume management program 1120 stored in the memory 1116 of the storage controller 1110 being executed by the CPU 1111.

The first storage sub system 1100 handles the external volume device 1600 the same as the internal storage device 1115, and may also be a storage device configuring a volume to be provided to the host computer 1300. Further, the first storage sub system 1100, without possessing the internal storage device 1115, may provide a volume to the host computer 1300 with only the external volume device 1600. Incidentally, the external volume device 1600 may also be a volume provided by another sub system.

The first storage sub system 1100, upon providing a volume, has a thin provisioning function which is a function for dynamically allocating a data area regarding a storage area in which a write request was given by the host computer 1300. A data area referred to herein indicates a specific area of a physical device (hard disk drive, etc.) of the internal storage device 1115 and external volume device 1600.

The thin provisioning function is operated in coordination with the volume management program 1120 and thin provisioning program 1121 stored in the memory 1116 being executed by the CPU 1111. Further, the thin provisioning program 1121 operates based on the information stored in the mapping table 1123.

With this thin provisioning function, upon receiving a write request from the host computer 13001 the thin provisioning program 1121 refers to the mapping table 1123, and, when it is detected that the allocation of a data area to the data to be written has not yet been performed, allocation of the data area is performed, and the correspondence of the section that received the write request and the allocated data area is stored in the mapping table 1123.

Further, with the thin provisioning function, upon receiving a write request from the host computer 1300, the thin provisioning program 1121 refers to the mapping table 1123, and, when it is detected that the allocation of a data area to the data to be written has been performed, the data area allocated in correspondence with the section that received the write request is specified with the information stored in the mapping table 1123, and data is written in this data area.

Moreover, with the thin provisioning function, upon receiving a read request from the host computer 1300, the thin provisioning program 1121 refers to the mapping table 1123, and, when it is detected that the allocation of a data area to the data to be read has not been performed, a predetermined pattern such as "0" is transmitted to the host computer 1300.

Moreover; with the thin provisioning function, upon receiving a read request from the host computer 1300, the thin provisioning program 1121 refers to the mapping table 1123, and, when it is detected that the allocation of a data area to the data to be read has been performed, the data area allocated in correspondence with the section that received the read request is specified with the information stored in the mapping table 1123, and the data to be read stored in the data area is transmitted to the host computer 1300.

The second storage sub system 1200 is a storage sub system that does not have a thin provisioning function, or has a thin provisioning function but the function thereof is not operating, or has a thin provisioning function but is not able to link the first storage sub system 1100 and the thin provisioning function.

Incidentally, although this embodiment can be employed even in a case where the second storage sub system 1200 has a thin provisioning function, in such a case, it is desirable to use a method other than this embodiment.

The first storage sub system 1100 and second storage sub system 1200 mutually have a remote copy function. A remote copy function is a function of designating volumes of different storage sub systems, and, with these respectively as a replication source and a replication destination, transferring the data in the volume of the replication source to the volume of the replication destination so as to replicate such volume.

Here, when the volume of the first storage sub system 1100 is made to be the replication source and the volume of the second storage sub system 1200 is made to be the replication destination, data of the replication source volume is transmitted to the replication destination volume by the remote copy management program 1122 being executed by the CPU 1111.

Contrarily, when the volume of the second storage sub system 1200 is made to be the replication source and the volume of the first storage sub system 1100 is made to be the replication destination, data of the replication source volume is transmitted to the replication destination volume by the remote copy management program 1222 being executed by the CPU 1211.

Incidentally, when the volume of the first storage sub system 1100 is made to be the replication source and the volume of the second storage sub system 1200 is made to be the replication destination, the volume of the first storage sub system 1100 is referred to as a backup source volume, and the volume of the second storage sub system 1200 is referred to as a backup destination volume, and this replication processing is referred to as backup.

Incidentally, backup means to replicate a volume by transmitting data in a volume of a storage sub system at an arbitrary time to a volume of another storage sub system.

Further, after performing backup, when the volume of the second storage sub system 1200 is made to be the replication source and the volume of the first storage sub system 1100 is made to be the replication destination, the volume of the second storage sub system 1200 is referred to a restoration source volume, and the volume of the first storage sub system 1100 is referred to as a restoration destination volume, and this replication processing is referred to as restoration.

Incidentally, restoration means to restore the volume of a certain storage sub system to a point in time when such volume was backed up by returning the data backed up in the volume of another storage sub system to the volume of a certain sub system in the event of a disaster such as the loss of data in the storage sub system.

(1-2) Backup and Restoration Control Method in First Embodiment

The method of performing backup from the first storage sub system 1100 to the second storage sub system 1200 in this embodiment is now explained.

With this storage system 1000, the volume of the second storage sub system 1200 is backed up with a remote copy function based on the volume using the thin provisioning function of the first storage sub system 1100.

The backup performed with the remote copy function between the volume using the thin provisioning function of the first storage sub system 1100 and the volume of the second storage sub system 1200 is implemented, in the first storage sub system 1100, by the volume management program 1120, remote copy management program 1122 and thin provisioning program 1121 being executed by the CPU 1111.

Meanwhile, in the second storage sub system 1200, [such backup] is implemented by the volume management program 1220 and remote copy management program 1222 being executed by the CPU 1211.

Among the above, the volume management program 1120 and volume management program 1220 manage whether the target volume uses the thin provisioning function. Further, the remote copy management program 1122 and remote copy management program 1222 perform backup from the backup source volume to the backup destination volume via the network 1400.

This backup is started after a backup request is issued from the host computer 1300 or the first management terminal 1130 of the first storage sub system 1100 to the first controller 1110, the backup request is transferred to the second controller 1210 of the second storage sub system 1200 via the network 1400, and the backup request is received by the second controller 1210.

This backup request may also be issued from the host computer 1300 or second management terminal 1220 to the second controller 1210. In this case, the backup is started after the backup request is transferred from the storage controller 1210 of the second storage sub system 1200 to the storage controller 1110 of the first storage sub system 1100 via the network 1400, and the backup request is received by the first controller 1110.

In this case, although the remote copy management program 1122 will perform backup by transmitting data of the overall target volume, when the backup source volume is a volume using the thin provisioning function, it will transfer the overall volume according to the read processing to the volume using the thing provisioning function based on the mapping table 1123.

Here, the remote copy management program 1122 of the first storage sub system 1100 requests the thin provisioning program 1121 to perform the backup of information regarding sections allocated with a data area of the target volume.

The thin provisioning program 1121 that received the backup request refers to the mapping table 1123, creates a bitmap of information regarding the sections allocated with a data area, and stores this in the allocation management table 1124.

The storage destination of the allocation management table 1124 is not limited to any type of storage device such as a memory 1116, internal storage device 1115 or external volume device 1600, so as long as it is a data storage section that can be referred to by the first controller 1110.

Further, [storage destination of the allocation management table 1124] may also be a storage device in the external management terminal capable of replying to a referral request from the first controller 1110 of a memory 1133 or storage device 1132 in the first management terminal 1130.

The method of restoring data backed up in this embodiment from the second storage sub system 1200 to the first storage sub system 1100 is now explained.

When a disaster such as the loss of volume data of the first storage sub system 1100 occurs, the host computer 1300, storage management terminal 1120 and storage management terminal 1220 request the start of restoration of copying data of the backup destination volume to the backup source volume.

This restoration is the control of transmitting data in a direction reverse to the backup in the remote copy function where the backup source in the foregoing backup control is inverted into the restoration destination and the backup destination is inverted to the restoration source.

Here, when the volume management program 1120 detects that the restoration destination is a volume using the thin provisioning function of the first storage sub system 1100, the remote copy management program 1122 acquires information regarding the sections to which a data area of the target volume stored simultaneously with the backup based on the remote copy function has been allocated from the allocation management table 1124 stored in the storage sub system of the storage destination, and changes the mapping table 1123 so as to reproduce the allocation of the data area at the time of backup based on such information.

Here, with the mapping table 1123, the correspondence with the data area at the time of backup does not necessarily have to be restored, and it will suffice so as long as it is ensured that the data area at the time of restoration is allocated to sections allocated with the data area at the time the target volume was backed up, and the data area at the time of restoration is not allocated to sections not allocated with the data area at the time of backup.

Pursuant to restoration, remote copy management program 1220 orders the first controller 1110, via the network 1400, to copy the overall volume from the restoration source volume to the restoration destination volume.

The first controller 1110 that receives the data calls the thin provisioning program 1121 with the remote copy management program 1122 and refers to the mapping table 1123, and, if a data area is allocated to the section to which the target data is to be written, writes the received data in such data area, and, if a data area is not allocated, abandons the received data.

Like this, by restoring information regarding the section allocated with a data area and data stored in the allocated data area with the storage system 1000, it is possible to restore the target volume data of the first controller 1110, as well as restore the data area allocated to the target volume before backup.

FIG. 2 is a diagram showing the schematic configuration of the mapping table 1123. The mapping table 1123 is configured from a volume block number storage column 11231, a data area allocation status storage column 11232 and a data area ID storage column 11233.

The mapping table 1123 manages the volumes using the thin provisioning function in block units, and stores the volume block number in the volume block number storage column 11231.

Further, the mapping table 1123 stores the allocation status of data areas to the volume block number in the data area allocation status storage column 11232.

Moreover, if the mapping table 1123 is allocating a data area to the target volume block number, it stores the ID of the data area allocated to the volume block number in the data area ID storage column 11233.

Moreover, if the mapping table 1123 is not allocating a data area to the target volume block number, it stores NULL or the like in the data area ID storage column 11233 and specifies that the allocation of a data area to the target volume block number has not yet been implemented.

And, the thin provisioning function acquires the allocation status of the data area and information of the data storage destination based on the ID of the data area allocated to the volume block number and information on NULL.

FIG. 3 is a diagram showing the schematic configuration of the allocation management table 1124. The allocation management table 1124 is configured from a volume block number storage column 11231 and a data area allocation status storage column 11242.

The allocation management table 1124 stores the volume block number of a volume using the thin provisioning function at an arbitrary time when a backup request was made in the volume block number storage column 11241, and also stores the allocation status of the data area to the volume block number in the data area allocation status storage column 11242.

The allocation management table 1124 can be created by deeming, based on the mapping table 1123, a block in correspondence with a data area as "allocated" and a block that is not in correspondence with a data area as "not allocated".

Figure 4:
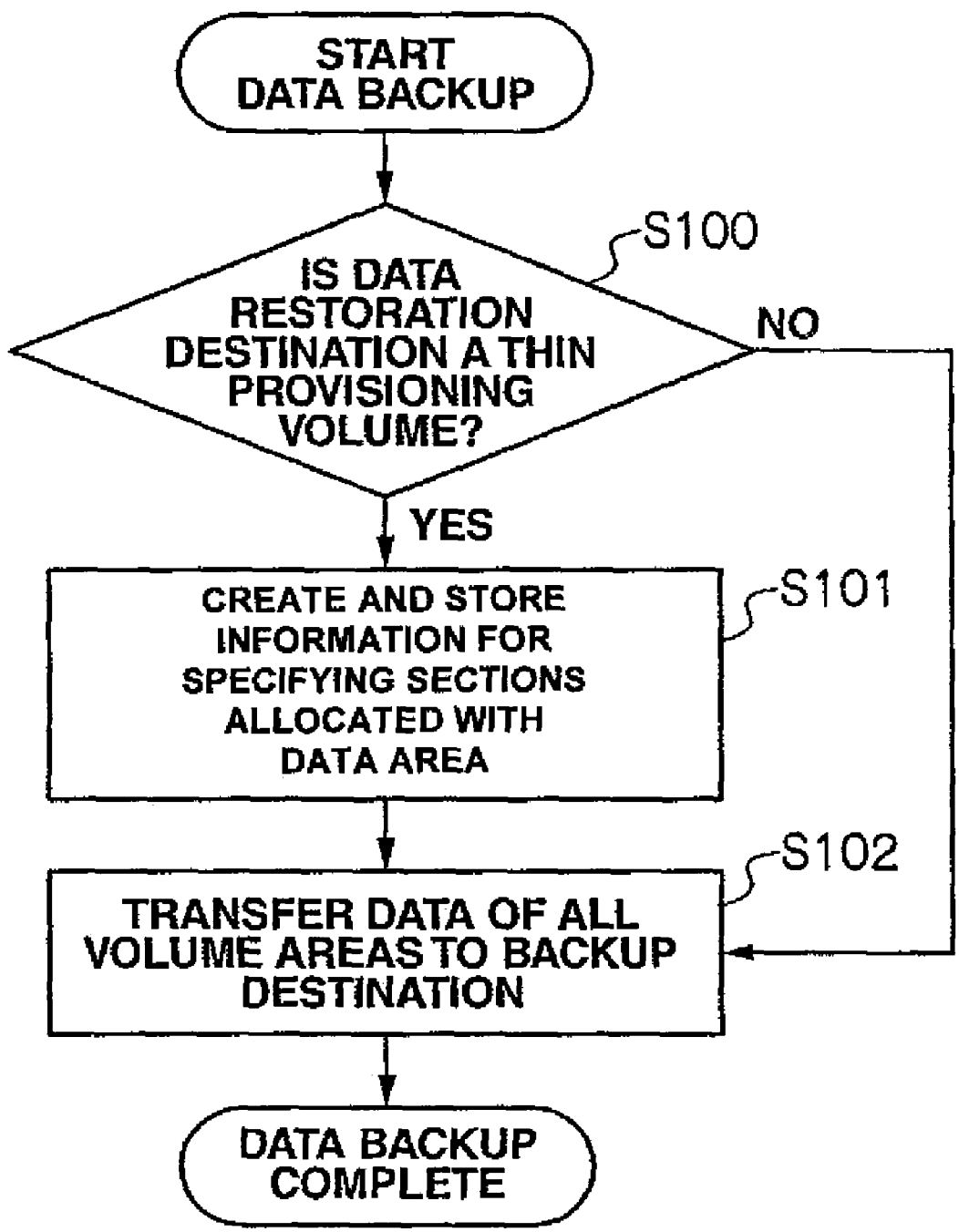
FIG. 4 is a flowchart showing the operation of the overall system of backup processing in the first embodiment.

FIG. 4 is a flowchart showing the schematic operation of the coordinated control method of the volume management program 1120, thin provisioning program 1121 and remote copy management program 1122 in the CPU 1111 of the first controller 1110 as the data transmission source upon performing backup with the remote copy function.

Foremost, the CPU 1111 of the first controller 1110, at step S100, calls the volume management program 1120 to check whether the backup source volume is a volume that uses the thin provisioning function.

As a result of checking whether it is a volume that uses the thin provisioning function, if it becomes clear that it is a volume that does not use the thin provisioning function, the CPU 1111 of the first controller 1110 proceeds to step S102 for transferring data of all areas in the target volume to the backup destination volume. This transfer processing is performed based on the remote copy management program 1120.

Meanwhile, as a result of checking whether it is a volume that uses the thin provisioning function, if it becomes clear that it is a volume that does use the thin provisioning function, the CPU 1111 of the first controller 1110 proceeds to step S101, and, at step S101, creates an allocation management table 1124 from the mapping table 1123. This table creation processing is performed based on the thin provisioning program 1121.

After the completion of step S101 which is the creation processing of the allocation management table 1124, the CPU 1111 of the first controller 1110 proceeds to step S102 which is the data transfer processing of all areas in the target volume. Backup is completed pursuant to the completion of this processing.

Incidentally, although the CPU 1111 of the first controller 1110 performs step S102 to the overall target volume after the completion of step S101, improvement of performance may be sought by partitioning the volume into suitable areas and executing step S102 after step S101 is completed to a certain area, and performing step S101 to a subsequent area during the transfer at step S102.

Figure 5:
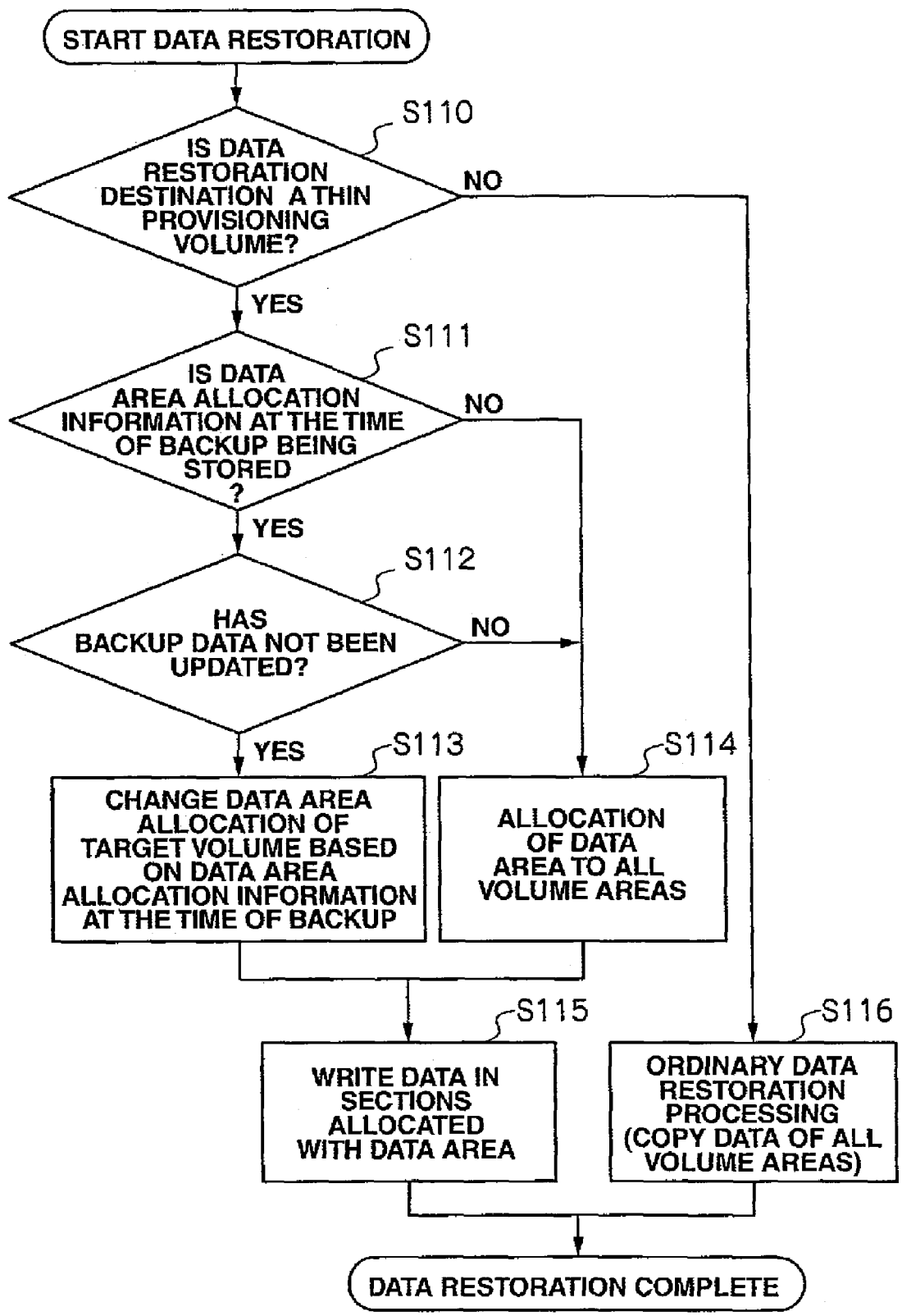
FIG. 5 is a flowchart showing the operation of the overall system of restoration processing in the first embodiment.

FIG. 5 is a flowchart showing the schematic operation of the restoration control method from backup data using the remote copy function.

Foremost, the CPU 1111 of the first controller 1110, at step S110, calls the volume management program 1120 to check whether the restoration destination volume is a volume that uses the thin provisioning function.

As a result of checking whether it is a volume that uses the thin provisioning function at step S110, if it becomes clear that it is a volume that does not use the thin provisioning function, the CPU 1111 of the first controller 1110 proceeds to step S116 for transferring data of all areas of the restoration source volume to the restoration destination volume in the second storage sub system 1200. This transfer processing is performed based on the remote copy management program 1222.

Meanwhile, as a result of checking whether it is a volume that uses the thin provisioning function at S110, if it becomes clear that it is a volume that does use the thin provisioning function, the CPU 1111 of the first controller 1110 proceeds to step S111 for checking whether the allocation management table 1124 stored simultaneously at the time of backup is being stored.

As a result of checking whether the allocation management table 1124 is being stored at step S111, if it becomes clear that the allocation management table 1124 of the target volume is not being stored, the CPU 1111 of the first controller 1110 must write data in all areas of the restoration source volume in all areas of the restoration destination volume since it is not able to restore the state of data area allocation at the time of backup. Thus, [the CPU 1111 of the first controller 1110] proceeds to step S114 for allocating a data area to all areas of the restoration destination volume.

Meanwhile, as a result of checking whether the allocation management table 1124 is being stored at step Sill, if it becomes clear that the allocation management table 1124 of the target volume is being stored, the CPU 1111 of the first controller 1110 proceeds to step S112 for checking whether the second storage sub system 1200 has updated the backup data.

In the remote copy function, after the completion of remote copy, the remote copy management program 1122 manages the updated section based on the writing in the backup source volume with a difference bitmap, and the emote copy management program 1222 manages the updated section based on the writing in the backup destination volume with a difference bitmap, respectively.

Thus, the CPU 1111 of the first controller 1110 performs the determination at step S112 by being notified of the difference bitmap status from the remote copy management program 1222.

When the CPU 1111 of the first controller 1110 determines that an update has been made as a result of step S112, it is not able to restore the management information using the stored allocation management table 1124 since it will deem the data of the backup source volume at the time the allocation management table 1124 was stored and the data of the restoration source volume to be different data. Thus, it is necessary to write the data of all areas of the restoration source volume to all areas of the restoration destination volume in the second storage sub system 1200.

As a result, the CPU 1111 of the first controller 1110 proceeds to step S114 for allocating a data area to all areas of the restoration destination volume.

Meanwhile, when the CPU 1111 of the first controller 1110 determines that an update has not been as a result of step S112, it proceeds to step S113 for restoring the data allocation status at the time of backup.

Incidentally, if the status of any difference is not notified from the remote copy management program 1222 to the remote copy management program 1122, the CPU 1111 of the first controller 1110 needs to proceed to step S114 since it is not able to determine the status of any difference.

Nevertheless, since the CPU 1111 of the first controller 1110 is able to set the remote copy destination as "non-writable" at the time of backup, if it is explicitly clear that it is impossible to update the backup destination volume after backup, and it is possible to notify such information from the second storage sub system 1200 to the first storage sub system 1100, it may deem that an update has not been made and proceed to step S113.

The CPU 1111 of the first controller 1110, at step S113, specifies sections requiring and not requiring data area allocation based on the allocation management table 1124 acquired at the time of backup, and allocates a data area to sections required the allocation of a data area. After this processing, the CPU 1111 of the first controller 1110 proceeds to step S115.

The CPU 1111 of the first controller 1110, at step S114, allocates a data area to all areas of the restoration destination volume, then proceeds to step S115.

The CPU 1111 of the first controller 1110, at step S115, writes data of sections allocated with a data area among the data transmitted from the restoration source volume to the restoration destination volume based on the remote copy management program 1222 in the corresponding data area. Further, the CPU 1111 of the first controller 1110 abandons all other data. Restoration is completed pursuant to the completion of this processing.

Incidentally, in order to shorten the time required to complete restoration in the data area allocation processing at step S113 and step S114, the CPU 1111 of the first controller 1110 may also execute the foregoing steps while performing the data transmission/reception processing at step S115. Further, the CPU 1111 of the first controller 1110 may standardize the processing at step S115 and step S116, and performing the data transmission/reception processing by deeming this to be a volume in which the data area allocation at step S116 has already been completed.

Figure 6:
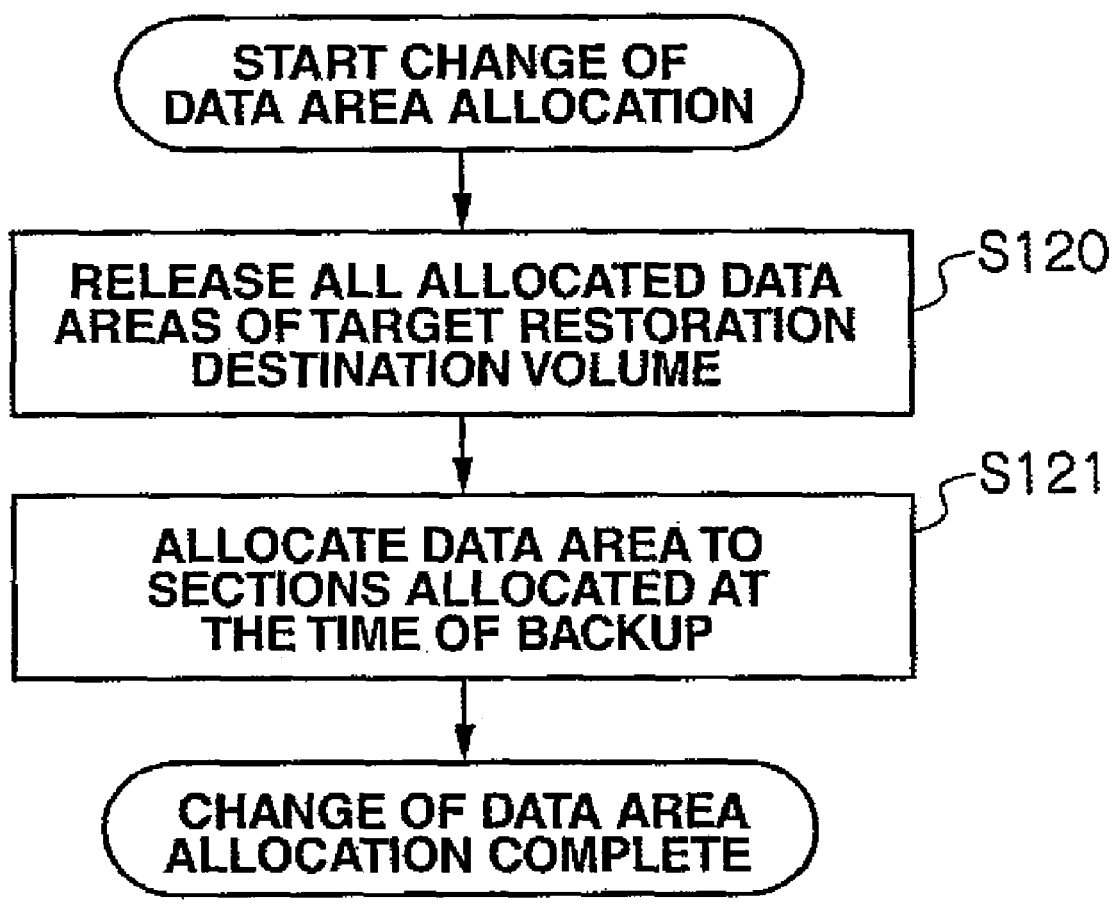
FIG. 6 is a flowchart showing the operation of controlling the reallocation of the first data area of restoration processing in the first embodiment.

FIG. 6 is a flowchart showing the first method regarding the detailed processing at step S113.

In this method, after releasing all data areas allocated to the target restoration destination volume, reallocation is performed to sections requiring allocation. The outline of this method is described below.

Foremost, the CPU 1111 of the first controller 1110, at step S120, releases all data areas allocated to the target volume. After the completion of this processing, the CPU 1111 of the first controller 1110 proceeds to step S121.

The CPU 1111 of the first controller 1110, at step S121, refers to the stored allocation management table 1124, and performs data area allocation processing to sections allocated with a data area. In this case, data area allocation processing is not performed to sections not allocated with a data area. The processing of step S113 is completed pursuant to the completion of this processing.

Figure 7:
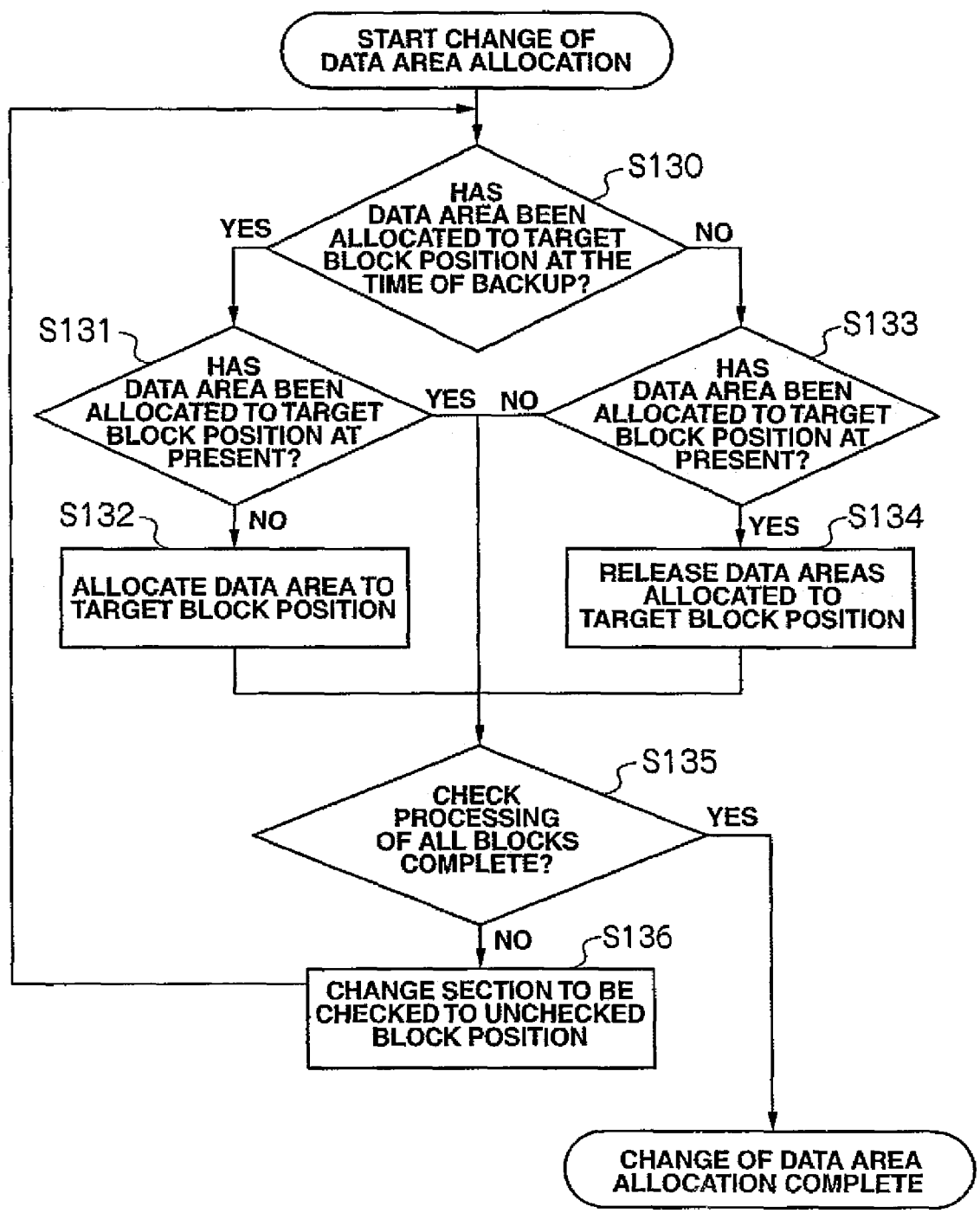
FIG. 7 is a flowchart showing the operation of controlling the reallocation of the second data area of restoration processing in the first embodiment.

FIG. 7 is a flowchart showing the second method regarding the detailed processing at step S113.

In this method, among the data areas allocated to the target volume, allocation to sections that do not require allocation after the completion of step S113 is released, and, among the sections not allocated with a data area, a data area is allocated to sections that require allocation after the completion of step S113. The outline of this method is described below. In this flowchart, the data area allocation of a target volume is indicated as being conducted in volume block number units.

Foremost, the CPU 1111 of the first controller 1110, at step S130, acquires the data area allocation status at the time of backup of a certain volume block number. The CPU 1111 of the first controller 1110 proceeds to step S131 if a data area was allocated to the target volume block number at the time of backup, and proceeds to step S133 if a data area was not allocated.

The CPU 1111 of the first controller 1110, at step S131, acquires the data area allocation status at the start of restoration. Here, the CPU 1111 of the first controller 1110, at step S131, in concert with the processing of step S130, judges that a data area needs to be allocated to the target volume block number after the end of restoration if the target volume block number is allocated with a data area at the time of backup and a data area has not been allocated to the target volume block number at the start of restoration, and, at step S132, allocates a data area to such volume block number.

The CPU 1111 of the first controller 1110, after the data area allocation processing at step S132, proceeds to step S135 for judging whether processing of all volume block numbers of the target volume has ended.

Meanwhile, the CPU 1111 of the first controller 1110, at step S131, in concert with the processing of step S130, judges that the data area may be ongoingly used if the target volume block number is allocated with a data area at the time of backup and the start of restoration, and proceeds to step S135 for judging whether processing of all volume block numbers of the target volume has ended.

The CPU 1111 of the first controller 1110, at step S133, acquires the data area allocation status at the start of restoration. Here, the CPU 1111 of the first controller 11101 at step S133, in concert with the processing of step S134, judges that a data area does not need to be allocated to the target volume block number after the end of restoration if the target volume block number is not allocated with a data area at the time of backup and a data area has been allocated to the target volume block number at the start of restoration, and, at step S134, releases the data area of such volume block number.

Incidentally, upon reusing the data area to be released, or in order to prevent the reading of data stored in the data area after the internal storage 1115 storing such data area is removed from the first storage sub system 1100, the release of data may also be conducted after writing data such as "0" or a random number in the pertinent data area. Further, this writing process, in addition to disabling the logical reading of data, may also disable the physical reading of data by writing random numbers a plurality of times.

The CPU 1111 of the first controller 1110, after the release of data area allocation at step S134, proceeds to step S135 for judging whether processing of all volume block numbers of the target volume has ended.

Meanwhile, the CPU 1111 of the first controller 1110, at step S133, in concert with the processing of step S130, judges that operations relating to data area allocation is not required when a data area has not been allocated to the target volume block number at the time of backup and at the start of restoration, does not perform any such operation, and proceeds to step S135 for judging whether processing of all volume block numbers of the target volume has ended.

The CPU 1111 of the first controller 1110, at step S135, compares the data area allocation of the target volume block number at the time of backup and the start of restoration regarding all volume block numbers in the target volume, and judges whether the incidental data area allocation or release processing is complete.

If processing of all volume block numbers is incomplete, the CPU 1111 of the first controller 1110, at step S136, switches the target volume block number to an unprocessed volume block number, and returns to step S130. When there is no remaining unprocessed volume block number, the processing routine is ended.

Figure 8:
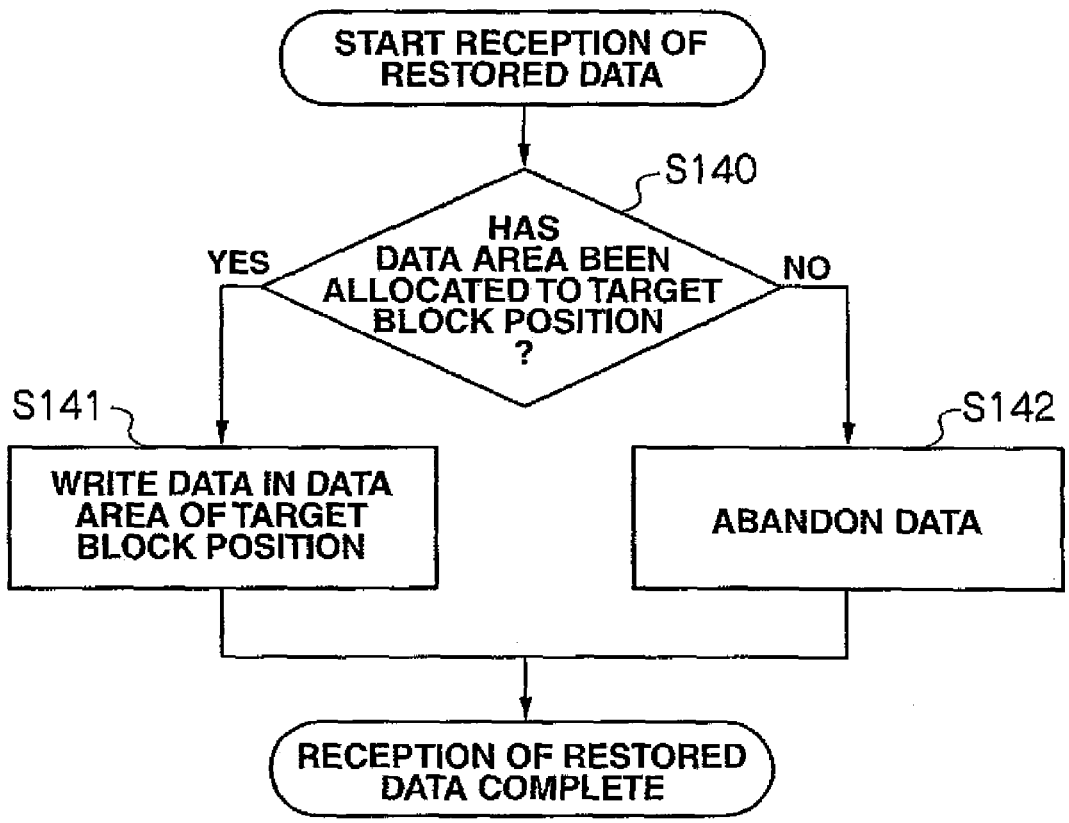
FIG. 8 is a flowchart showing the operation of controlling the data writing of restoration processing in the first embodiment.

FIG. 8 is a flowchart showing the schematic operation in the detailed processing of step S115.

The CPU 1111 of the first controller 1110, at step S140, checks whether a data area is allocated to the storage destination of data transmitted from the remote copy management program 1222 and received by the remote copy management program 1122. Here, the CPU 1111 of the first controller 1110 proceeds to step S141 for writing data in this data area if the target volume block number is allocated with a data area.

Meanwhile, the CPU 1111 of the first controller 1110 proceeds to step S142 since it does not need to write data in this data area if the target volume block number is not allocated with a data area.

The CPU 1111 of the first controller 1110, at step S141, stores the received data in the data area in order to restore the data stored in the data area at the time of backup.

The CPU 1111 of the first controller 1110, at step S142, does not perform writing processing since it determines that the data not allocated with a data area at the time of backup can be restored without having to store the data, and abandons such data.

Like this, with the storage system 1000, upon backing up data of a volume that uses the thin provisioning function, information for specifying the data position in the volume allocated with a data area is stored in the first storage sub system 1100.

And, with the storage system 1000, when restoring backup data, the data area allocation at the time of backup is restored based on the stored information, and the backup data is written in the data area.

As a result, with the storage system 1000, upon restoring backup data, it is possible to effectively prevent the allocation of an unnecessary data area to the restoration destination volume and the wasteful consumption of the data area, and, as a result, the data area can be efficiently allocated to the restoration destination volume.

Figure 9:
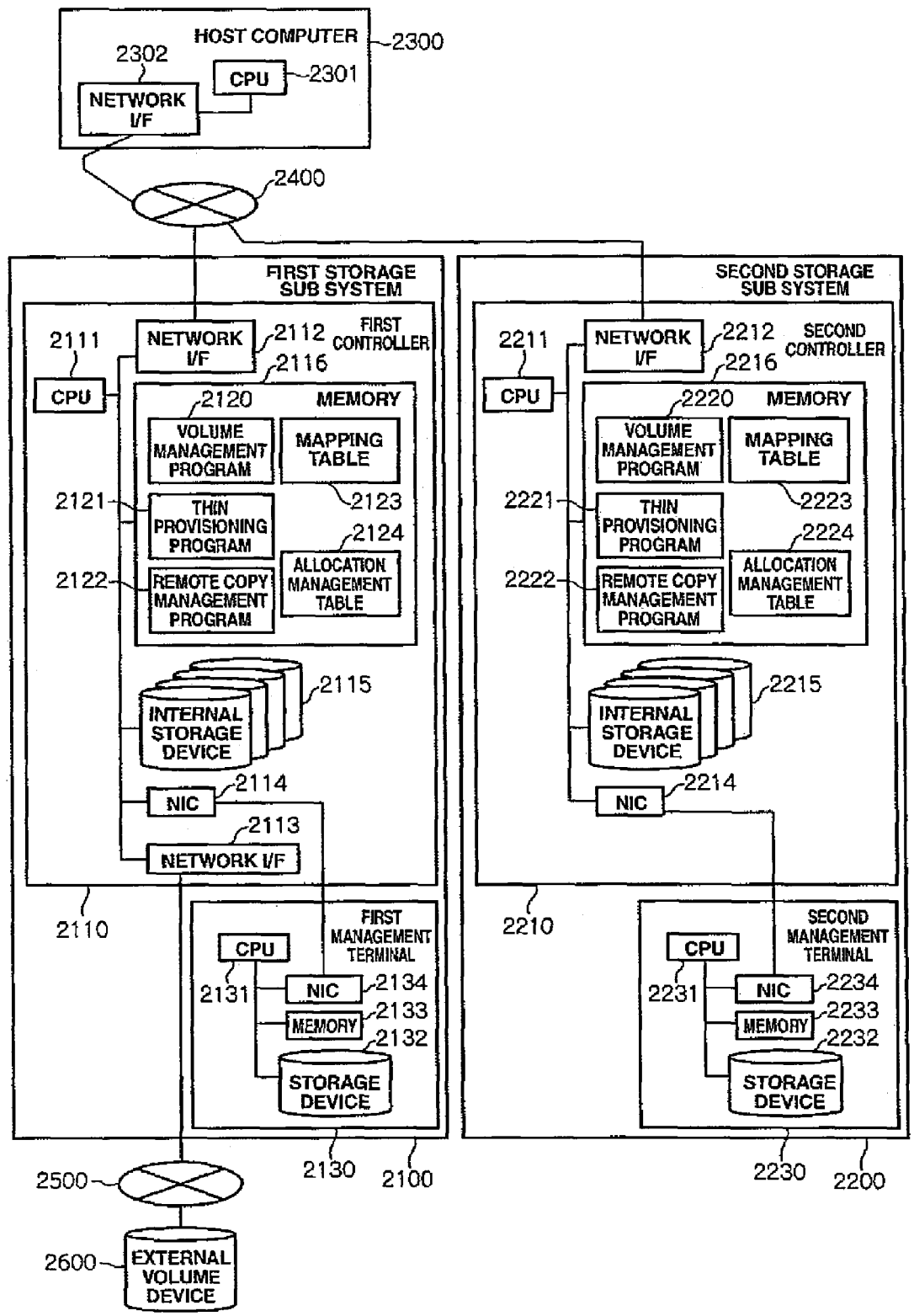
FIG. 9 is a diagram showing the overall configuration in the second embodiment.

(2) Second Embodiment (2-1) Configuration of Storage System in Second Embodiment FIG. 9 is a diagram showing the configuration of the storage system applying this invention in the second embodiment. The storage system 2000 according to this embodiment is configured by a first storage sub system 2100, a second storage sub system 2200 and a host computer 2300 being connected via a network 2400 such as a SAN.

Incidentally, in this embodiment, although a configuration is illustrated where the first storage sub system 2100, second storage sub system 2200 and host computer 2300 are connected via the same network 2400, in addition to this configuration, the network between the first storage sub system 2100 and host computer 2300, and the network between the first storage sub system 2100 and second storage sub system 2200 may be separated.

Here, a storage sub system is a system that consolidates a plurality of hard disk drives or the like, manages these hard disk drives or the like with a RAID or JBOD configuration, and provides these as a logical storage area to a host computer. Incidentally, this logical storage area is referred to as a volume.

The first storage sub system 2100 is configured from a first controller 2110 and a first management terminal 2130, and is capable of performing maintenance operations such as creating volumes and setting various functions with the first management terminal 2130. Further, the host computer 2300 may also be used to set the various functions.

Further, the first storage sub system 2100 is connected to an external volume device 2600 via a prescribed network 2500.

The first controller 2110 is configured from one or more CPUs (Central Processing Units) 2111 for controlling the overall first controller 2110, a network I/F (Interface) 2112 for connecting to the network 2400, a network I/F 2113 for connecting to the network 2500, an NIC 2114 for connecting to the first management terminal 2130, an internal storage device 2115 formed from a plurality of hard disk drives or the like storing various types of configuration information or programs of the first controller 2110 as well as data transmitted from the host computer 2300, and a memory 2116 for expanding such various types of configuration information or programs.

Expanded in the memory 2116 are a volume management program 2120, a thin provisioning program 2121, a remote copy management program 2122, a mapping table 2123 and an allocation management table 2124. The volume management program 2120, thin provisioning program 2121, and remote copy management program 2122 are programs to be executed with the CPU 2111.

The first management terminal 2130 is configured from one or more CPUs 2131 for controlling the overall first management terminal 2130, a storage device 2132 storing various types of information and programs of the first controller 2110, a memory 2133 for expanding various types of configuration information and programs, and an NIC 2134 for connecting to the first controller 2110.

Meanwhile, the second storage sub system 2200 is configured from a second controller 2210 and a second management terminal 2230, and is capable of performing maintenance operations such as creating volumes and setting various functions with the second management terminal 2230.

The second controller 2210 is configured the same as the first controller 2110 other than that it is not provided with a network I/F for connecting to the network 2500, and is configured from a CPU 2211, a network I/F 2212, an NIC 2214, an internal storage device 2215 and a memory 2216.

Expanded in the memory 2216 are a volume management program 2220, a thin provisioning program 2221, a remote copy management program 2222, a mapping table 2223 and an allocation management table 2224. The volume management program 2220, thin provisioning program 2221 and remote copy management program 2222 are programs to be executed with the CPU 2211.

The second management terminal 2230 is configured the same as the first management terminal 2130, and is configured from a CPU 2231, a storage device 2232, a memory 2233 and an NIC 2234.

Meanwhile, the host computer 2300 is a computer device having a CPU 2301 and a network I/F 2302 for connecting to the network 2400, and, for instance, is configured from a server having UNIX (registered trademark) or Windows (registered trademark) as its OS. Further, the host computer 2300 also has an information processing resource such as a memory. Moreover, the host computer 2300 is connected to a personal computer or workstation as an information I/O device via a network.

In this case, management of the volume of the first storage sub system 2100 is conducted by the volume management program 2120 stored in the memory 2116 of the storage controller 2110 being executed by the CPU 2111.

The first storage sub system 2100 handles the external volume device 2600 the same as the internal storage device 2115, and may also be a storage device configuring a volume to be provided to the host computer 2300. Further, the first storage sub system 2100, without possessing the internal storage device 2115, may provide a volume to the host computer 2300 with only the external volume device 2600. Incidentally, the external volume device 2600 may also be a volume provided by another storage sub system.

The first storage sub system 2100, upon providing a volume, has a thin provisioning function which is a function for dynamically allocating a data area regarding a storage area in which a write request was given by the host computer 2300. A data area referred to herein indicates a specific area of a physical device (hard disk drive, etc.) of the internal storage device 2115 and external volume device 2600.

The thin provisioning function is operated in coordination with the volume management program 2120 and thin provisioning program 2121 stored in the memory 2116 being executed by the CPU 2111. Further, the thin provisioning program 2121 operates based on the information stored in the mapping table 2123.

With this thin provisioning function, upon receiving a write request from the host computer 2300, the thin provisioning program 2121 refers to the mapping table 2123, and, when it is detected that the allocation of a data area to the data to be written has not yet been performed, allocation of the data area is performed, and the correspondence of the section that received the write request and the allocated data area is stored in the mapping table 2123.

Further, with the thin provisioning function, upon receiving a write request from the host computer 2300, the thin provisioning program 2121 refers to the mapping table 2123, and, when it is detected that the allocation of a data area to the data to be written has been performed, the data area allocated in correspondence with the section that received the write request is specified with the information stored in the mapping table 2123, and data is written in this data area.

Moreover, with the thin provisioning function, upon receiving a read request from the host computer 2300, the thin provisioning program 2121 refers to the mapping table 2123, and, when it is detected that the allocation of a data area to the data to be read has not been performed, a predetermined pattern such as "0" is transmitted to the host computer 2300.

Moreover, with the thin provisioning function, upon receiving a read request from the host computer 2300, the thin provisioning program 2121 refers to the mapping table 2123, and, when it is detected that the allocation of a data area to the data to be read has been performed, the data area allocated in correspondence with the section that received the read request is specified with the information stored in the mapping table 2123, and the data to be read stored in the data area is transmitted to the host computer 2300.

The second storage sub system 2200 is a storage sub system that has a thin provisioning function as with the first storage sub system 210.

The first storage sub system 2100 and second storage sub system 2200 mutually have a remote copy function. A remote copy function is a function of designating volumes of different storage sub systems, and, with these respectively as a replication source and a replication destination, transferring the data in the volume of the replication source to the volume of the replication destination so as to replicate such volume.

Here, when the volume of the first storage sub system 2100 is made to be the replication source and the volume of the second storage sub system 2200 is made to be the replication destination, data of the replication source volume is transmitted to the replication destination volume by the remote copy management program 2122 being executed by the CPU 2111.

Contrarily, when the volume of the second storage sub system 2200 is made to be the replication source and the volume of the first storage sub system 2100 is made to be the replication destination, data of the replication source volume is transmitted to the replication destination volume by the remote copy management program 2222 being executed by the CPU 2211.

Incidentally, when the volume of the first storage sub system 2100 is made to be the replication source and the volume of the second storage sub system 2200 is made to be the replication destination, the volume of the first storage sub system 2100 is referred to as a backup source volume, and the volume of the second storage sub system 2200 is referred to as a backup destination volume, and this replication processing is referred to as backup.

Incidentally, backup means to replicate a volume by transmitting data in a volume of a storage sub system at an arbitrary time to a volume of another storage sub system.

Further, after performing backup, when the volume of the second storage sub system 2200 is made to be the replication source and the volume of the first storage sub system 2100 is made to be the replication destination, the volume of the second storage sub system 2200 is referred to a restoration source volume, and the volume of the first storage sub system 2100 is referred to as a restoration destination volume, and this replication processing is referred to as restoration.

Incidentally, restoration means to restore the volume of a certain storage sub system to a point in time when such volume was backed up by returning the data backed up in the volume of another storage sub system to the volume of a certain sub system in the event of a disaster such as the loss of data in the storage sub system.

(2-2) Backup and Restoration Control Method in Second Embodiment

The method of performing backup from the first storage sub system 2100 to the second storage sub system 2200 in this embodiment is now explained.

With this storage system 2000, the volume of the second storage sub system 2200 is backed up with a remote copy function based on the volume using the thin provisioning function of the first storage sub system 2100.

The backup performed with the remote copy function of the volume using the thin provisioning function is implemented, in the first storage sub system 2100, by the volume management program 2120, remote copy management program 2122 and thin provisioning program 2121 being executed by the CPU 2111.

Meanwhile, in the second storage sub system 2200, [such backup] is implemented by the volume management program 2220, remote copy management program 2222 and thin provisioning program 2221 being executed by the CPU 2211.

Among the above, the volume management program 2120 and volume management program 2220 manage whether the target volume uses the thin provisioning function. Further, the remote copy management program 2122 and remote copy management program 2222 perform backup from the backup source volume to the backup destination volume via the network 2400.

Moreover, the thin provisioning program 2121 and thin provisioning program 2221 are able to transmit and receive information regarding the data area allocation of the target volume upon using the remote copy function.

In this case, although the remote copy management program 1122 will perform backup by transmitting the overall target volume data, when the backup source volume is a volume that uses the thin provisioning function, it transfers the overall volume according to the read processing of the foregoing volume that uses the thin provisioning function based on the mapping table 1123.

Prior to this, the remote copy management program 2122 of the second storage sub system 2200 requests the thin provisioning program 2121 to transfer information regarding sections allocated with a data area of the target volume to the thin provisioning program 2218.

The thin provisioning program 2121 that received the transfer request refers to the mapping table 2123, creates a bitmap of information regarding the sections allocated with a data area, and transfers this to the thin provisioning program 2221.

The thin provisioning program 2221 that receives this information stores such information in the allocation management table 2224 in the memory 2216.

The storage destination of the allocation management table 2224 is not limited to any type of storage device such as a memory 2116 or internal storage device 2115, so as long as it is a data storage section that can be referred to by the first controller 2110.

The thin provisioning program 2221 refers to the allocation management table 2224 and allocates a data area to the backup destination volume in a section that is the same as the section to which the data area of a volume using the thin provisioning function in the first storage sub system 2100 is allocated.

With this storage system 2000, after the replication of the data area allocation with the thin provisioning program 2221 is complete, the data transfer processing between target volumes with the remote copy management program 2122 and remote copy management program 2222 is started The CPU 2211 of the second controller 2210 that received the data calls the thin provisioning program 2221 with the remote copy management program 2222 in the data transfer processing, refers to the mapping table 2224, and writes the received data in the data area if a data area has been allocated to a section in which the target data is to be written, and abandons the received data if a data area has not been allocated.

Like this, with the storage system 1000, by transferring the information regarding the section allocated with a data area and the data stored in such allocated data area, it is possible to replicate data of the backup source volume of the first controller 2110 and the backup source volume itself including the data area allocation state.

Next, the method of restoring the volume of the [first] storage controller 2110 from the backup volume created in the second [storage] controller 2210 is explained.

This restoration uses the remote copy function which deems the backup destination volume to be the restoration source volume, and deems the backup source volume to be the restoration destination volume.

Further, since the [first] storage controller 2210 and [second] storage controller 2110 are storage sub systems having equivalent functions, this embodiment can be realized by reversing the transfer direction of the foregoing backup data and information concerning the section allocated with a data area.

Incidentally, in this embodiment also, the configuration illustrated in FIG. 2 can be used as the mapping table 2123 and mapping table 2223. Further, the configuration illustrated in FIG. 3 can be used as the allocation management table 2124 and allocation management table 2224.

Figure 10:
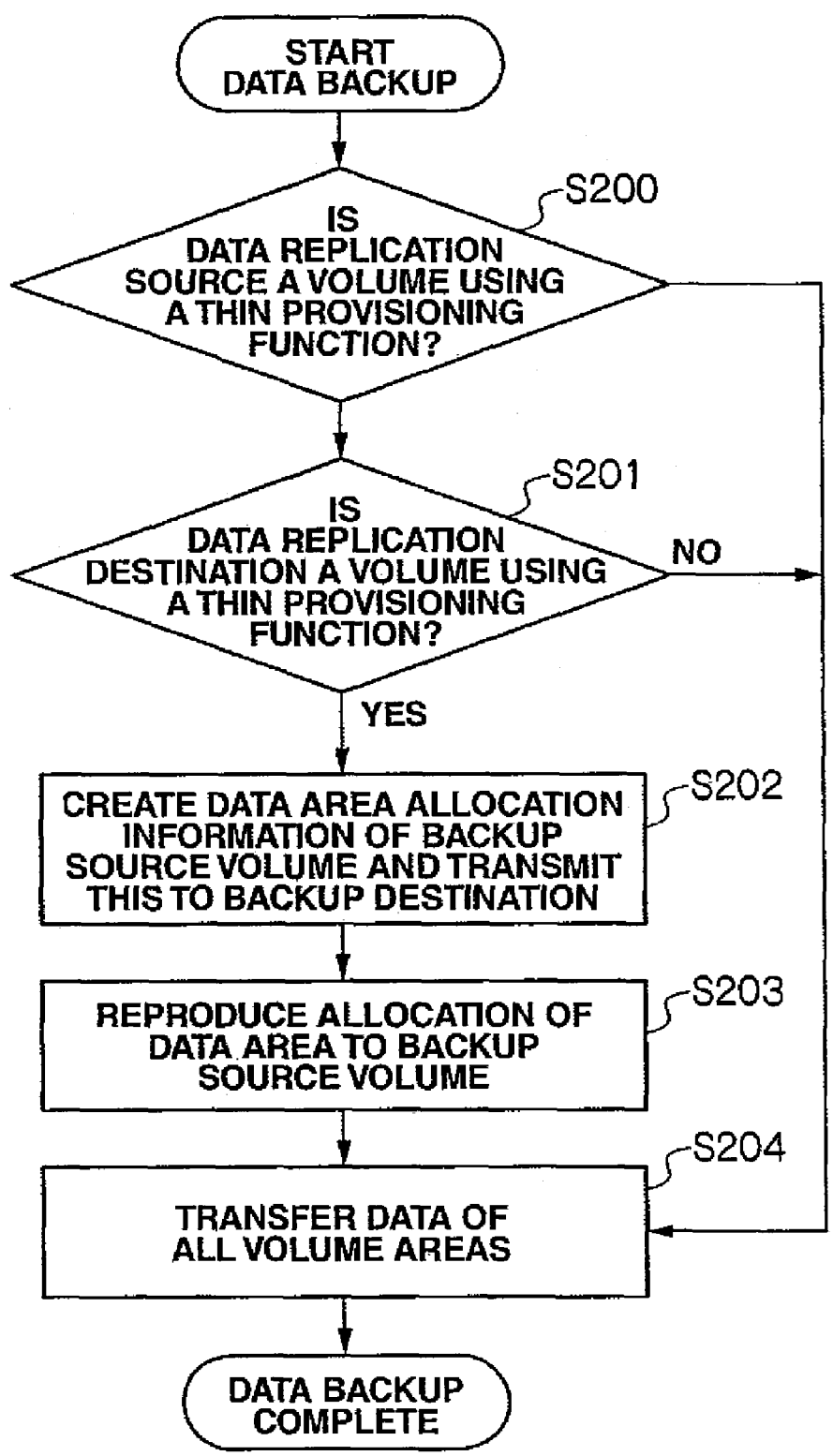
FIG. 10 is a flowchart showing the operation of the overall system of backup processing in the second embodiment.

FIG. 10 is a flowchart showing the schematic operation of the backup control method using the remote copy function.

Foremost, the CPU 2111 of the first controller 2110, at step S200, calls the volume management program 2120 to check whether the backup source volume is a volume that uses the thin provisioning function.

The CPU 2211 of the second controller 2210, at step S201, calls the volume management program 2220 to check whether the backup destination volume is a volume that uses the thin provisioning function.

As a result of checking whether it is a volume that uses the thin provisioning function, if it becomes clear that either the backup source volume or the backup destination volume is a volume that does not use the thin provisioning function, the CPU 2111 of the first controller 2110 proceeds to step S204 for transferring data of all areas in the target volume to the backup destination volume. This transfer processing is performed based on the remote copy management program 2120.

Meanwhile, as a result of checking whether it is a volume that uses the thin provisioning function, if it becomes clear that either the backup source volume or the backup destination volume is a volume that does use the thin provisioning function, the CPU 2111 of the first controller 2110 proceeds to step S202, and, at step S202, creates information for specifying the section allocated with a data area to the backup source volume from the mapping table 2123. Thereafter, the CPU 2111 of the first controller 2110 transmits this information to the second controller 2210, and proceeds to step S203. This table creation processing is performed based on the thin provisioning program 2121.

The CPU 2211 of the second controller 2210, at step S203, stores the information transmitted from the CPU 2111 of the first controller 2110 in the allocation management table 2224. Further, the CPU 2211 of the second controller 2210 allocates a data area to the backup destination volume based on this information, creates a data area allocation status that is the same as the backup source volume, and reproduces a data area allocation status that is the same as the backup source volume. This table creation processing is performed based on the thin provisioning program 2221.

Incidentally, the CPU 2211 of the second controller 2210 changes the mapping table 2223 according to this data area allocation status.

After the completion of step S203 which is the creation processing of the allocation management table 2224, the CPU 2111 of the first controller 2110 proceeds to step S204 which is the data transfer processing of all areas in the target volume. Backup is completed pursuant to the completion of this processing.

Incidentally, although the CPU 2111 of the first controller 2110 performs step S204 to the overall target volume after the completion of step S203, improvement of performance may be sought by partitioning the volume into suitable areas and executing step S204 after step S203 is completed to a certain area, and performing step S203 to a subsequent area during the transfer at step S204.

In addition, the flowchart showing the schematic operation of the restoration control method can be realized in this embodiment by reversing the schematic operation of the backup control method.

Figure 11:
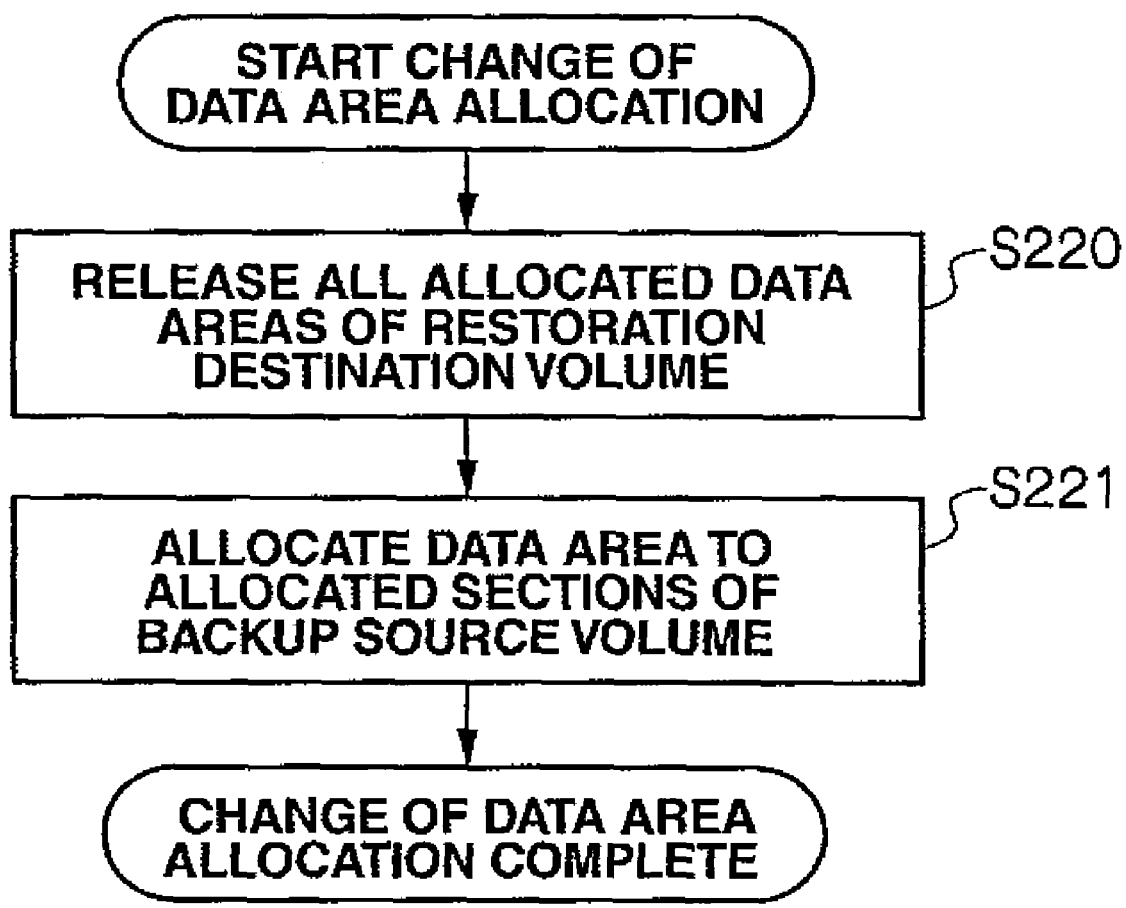
FIG. 11 is a flowchart showing the operation of controlling the reallocation of the first data area of restoration processing in the second embodiment.

FIG. 11 is a flowchart showing the first method regarding the detailed processing at step S220.

In this method, after releasing all data areas allocated to the restoration destination volume, reallocation is performed to sections requiring allocation. The outline of this method is described below.

Foremost, the CPU 2211 of the second controller 2210, at step S220, releases all data areas allocated to the target volume. After the completion of this processing, the CPU 2211 of the second controller 2210 proceeds to step S221.

The CPU 2211 of the second controller 2210, at step S221, refers to the stored allocation management table 2224, and performs data area allocation processing to sections allocated with a data area. In this case, data area allocation processing is not performed to sections not allocated with a data area. The processing of step S203 is completed pursuant to the completion of this processing.

Figure 12:
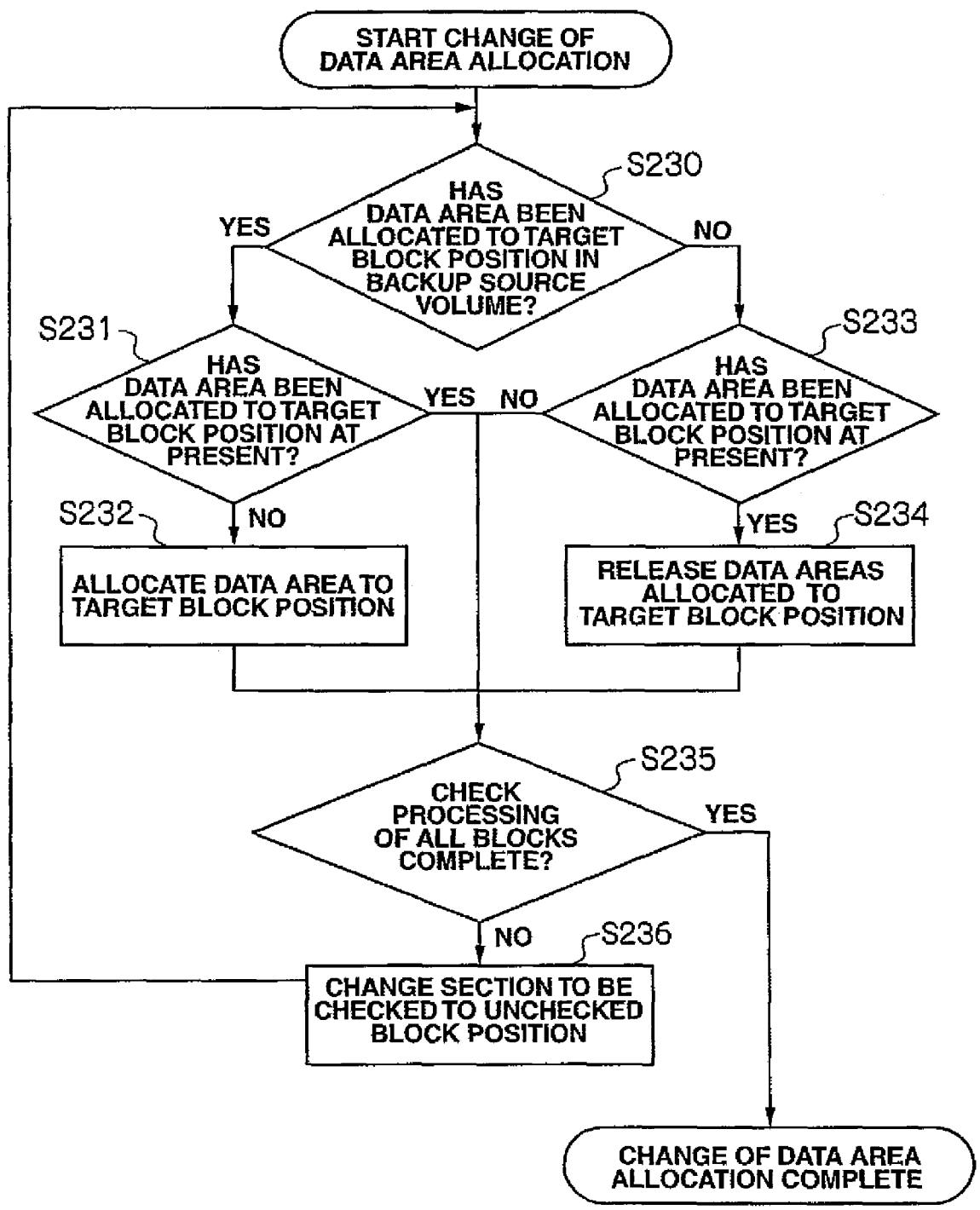
FIG. 12 is a flowchart showing the operation of controlling the reallocation of the second data area of restoration processing in the second embodiment.

FIG. 12 is a flowchart showing the second method regarding the detailed processing at step S203.

In this method, among the data areas allocated to the target volume, allocation to sections that do not require allocation after the completion of step S203 is released, and, among the sections not allocated with a data area, a data area is allocated to sections that require allocation after the completion of step S203. The outline of this method is described below. In this flowchart, the data area allocation of a target volume is indicated as being conducted in volume block number units.

Foremost, the CPU 2211 of the second controller 2210, at step S230, acquires the data area allocation status at the time of backup of a certain volume block number. The CPU 2211 of the second controller 2210 proceeds to step S231 if a data area was allocated to the target volume block number of the backup source volume at the time of backup, and proceeds to step S233 if a data area was not allocated.

The CPU 2211 of the second controller 2210, at step S231, acquires the data area allocation status of the backup destination volume. Here, the CPU 2211 of the second controller 2210, at step S231, in concert with the processing of step S230, judges that a data area needs to be allocated to the target volume block number of the backup destination volume if the target volume block number is allocated with a data area of the backup source volume and a data area has not been allocated to the target volume block number of the backup destination volume, and, at step S232, allocates a data area to such volume block number.

The CPU 2211 of the second controller 2210, after the data area allocation processing at step S232, proceeds to step S235 for judging whether processing of all volume block numbers of the target volume has ended.

Meanwhile, the CPU 2211 of the second controller 2210, at step S231, in concert with the processing of step S230, judges that the data area may be ongoingly used if the target volume block number is allocated with a data area of the backup source volume and backup destination volume, and proceeds to step S235 for judging whether processing of all volume block numbers of the target volume has ended.

The CPU 2211 of the second controller 2210, at step S233, acquires the data area allocation status of the backup destination volume. Here, the CPU 2211 of the second controller 2210, at step S233, in concert with the processing of step S234, judges that a data area does not need to be allocated to the target volume block number of the backup destination volume if the target volume block number is not allocated with a data area of the backup source volume and a data area has been allocated to the target volume block number of the backup destination volume, and, at step S234, releases the data area of such volume block number.

The CPU 2211 of the second controller 2210, after the release of data area allocation at step S234, proceeds to step S235 for judging whether processing of all volume block numbers of the target volume has ended.

Meanwhile, the CPU 2211 of the second controller 2210, at step S233, in concert with the processing of step S230, judges that operations relating to data area allocation is not required when a data area has not been allocated to the target volume block number of the backup source volume and backup destination volume, does not perform any such operation, and proceeds to step S235 for judging whether processing of all volume block numbers of the target volume has ended.

The CPU 2211 of the second controller 2210, at step S235, compares the data area allocation of the target volume block number of the backup source volume and the backup destination volume regarding all volume block numbers in the target volume, and judges whether the incidental data area allocation or release processing is complete.

If processing of all volume block numbers is incomplete, the CPU 2211 of the second controller 2210, at step S236, switches the target volume block number to an unprocessed volume block number, and returns to step S230. When there is no remaining unprocessed volume block number, the processing routine is ended.

Figure 13:
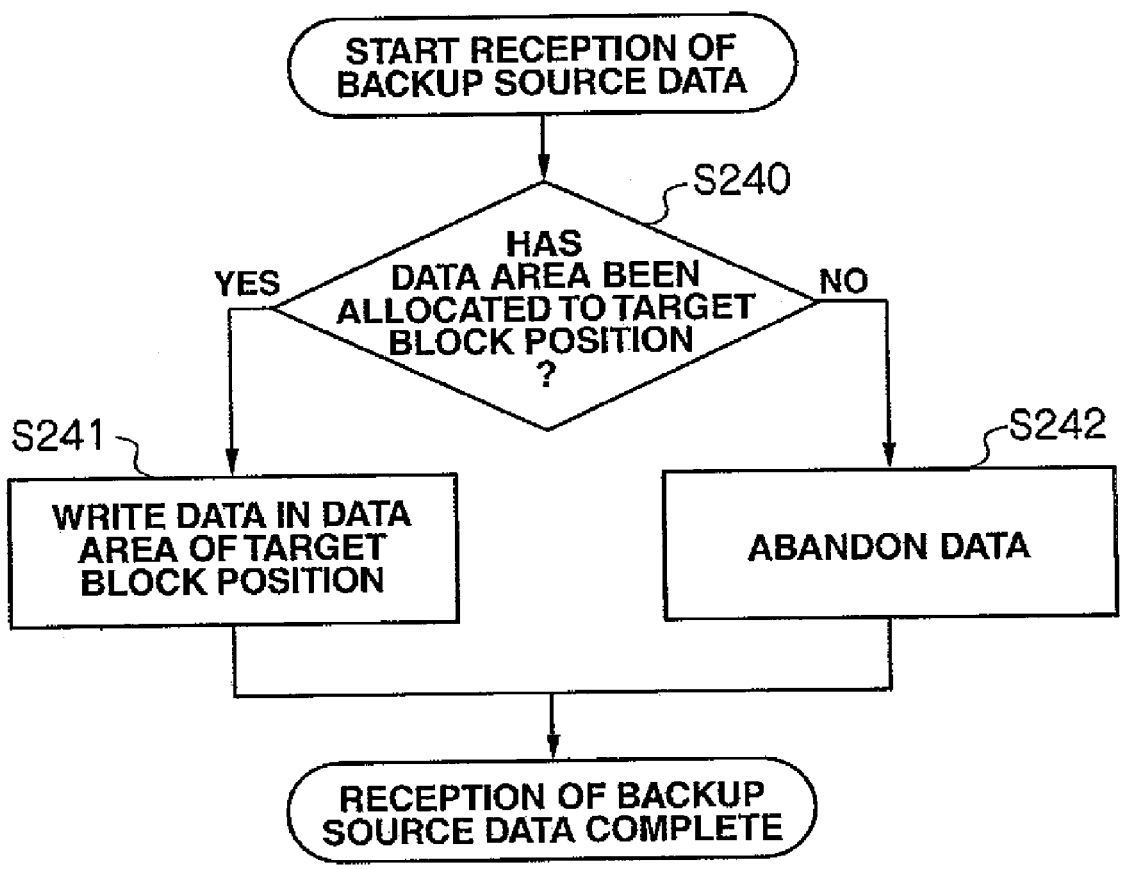
FIG. 13 is a flowchart showing the operation of controlling the data writing of restoration processing in the second embodiment.

FIG. 13 is a flowchart showing the schematic operation in the detailed processing of step S204 which is data reception processing in the restoration destination volume using the thin provisioning function.

The CPU 2211 of the second controller 2210, at step S240, checks whether a data area is allocated to the storage destination of data transmitted from the remote copy management program 2122 and received by the remote copy management program 2222. Here, the CPU 2211 of the second controller 2210 proceeds to step S241 for writing data in this data area if the target volume block number is allocated with a data area.

Meanwhile, the CPU 2211 of the second controller 2210 proceeds to step S242 since it does not need to write data in this data area if the target volume block number is not allocated with a data area.

The CPU 2211 of the second controller 2210, at step S241, stores the received data in the data area in order to restore the data stored in the data area of the backup source volume.

The CPU 2211 of the second controller 2210, at step S242, does not perform writing processing since it determines that the data not allocated with a data area at the time of backup can be restored without having to store the data, and abandons such data.

Like this, with the storage system 2000, upon backing up data of a volume that uses the thin provisioning function in the first storage sub system 2100, information for specifying the data position in the volume allocated with a data area is created, transmitted to the second storage sub system 2200, and thereby stored.

And, with the storage system 2000, the data area allocation of the backup source volume is restored based on the stored information in the second storage sub system 2200, and the backup data is written in the data area of the backup source volume.

As a result, with the storage system 2000, it is possible to effectively prevent the allocation of an unnecessary data area to the backup destination volume and the wasteful consumption of the data area, and, upon restoring backup data, it is possible to effectively prevent the allocation of an unnecessary data area to the restoration destination volume and the wasteful consumption of the data area, and, as a result, the data area can be efficiently allocated to the restoration destination volume.

(3) Third Embodiment (3-1) Configuration of Storage System in Third Embodiment

Figure 14:
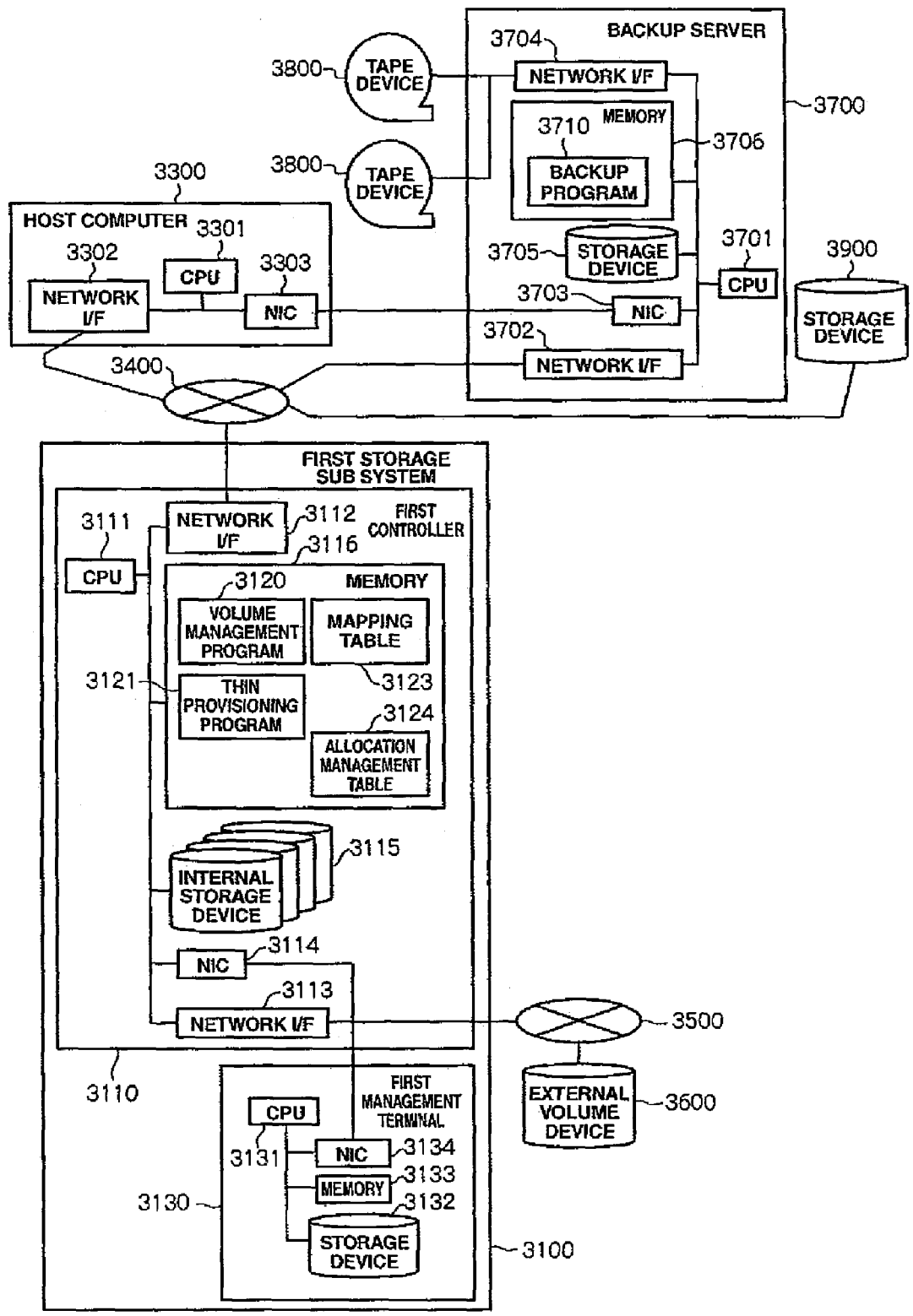
FIG. 14 is a diagram showing the overall configuration in the third embodiment.

FIG. 14 is a diagram showing the configuration of the storage system applying this invention in the third embodiment. The storage system 3000 according to this embodiment is configured by a first storage sub system 3100, a backup server 3700, a storage device 3900, and a host computer 3300 being connected via a network 3400 such as a SAN.

Incidentally, in this embodiment, although a configuration is illustrated where the first storage sub system 3100, backup server 3700, storage device 3900, and host computer 3300 are connected via the same network 3400, in addition to this configuration, the network between the first storage sub system 3100 and host computer 3300, and the network of the first storage sub system 3100, backup server 3700, and storage device 3900 may be separated.

Here, a storage sub system is a system that consolidates a plurality of hard disk drives or the like, manages these hard disk drives or the like with a RAID or JBOD configuration, and provides these as a logical storage area to a host computer. Incidentally, this logical storage area is referred to as a volume.

The first storage sub system 3100 is configured from a first controller 3110 and a first management terminal 3130, and is capable of performing maintenance operations such as creating volumes and setting various functions with the first management terminal 3130. Further, the host computer 3300 may also be used to set the various functions.

Further, the first storage sub system 3100 is connected to an external volume device 3600 via a prescribed network 3500.

The first controller 3110 is configured from one or more CPUs 3111 for controlling the overall first controller 3110, a network I/F 3112 for connecting to the network 3400, a network I/F 3113 for connecting to the network 3500, an NIC 3114 for connecting to the first management terminal 3130, an internal storage device 3115 formed from a plurality of hard disk drives or the like storing various types of configuration information or programs of the first controller 3110 as well as data transmitted from the host computer 3300, and a memory 3116 for expanding such various types of configuration information or programs.

Expanded in the memory 3116 are a volume management program 3120, a thin provisioning program 3121, a mapping table 3123 and an allocation management table 3124. The volume management program 3120 and thin provisioning program 3121 are programs to be executed with the CPU 3111.

The first management terminal 3130 is configured from one or more CPUs 3131 for controlling the overall first management terminal 3130, a storage device 3132 storing various types of information and programs of the first controller 3110, a memory 3133 for expanding various types of configuration information and programs, and an NIC 3134 for connecting to the first controller 3110.

Meanwhile, the backup server 3700 is configured from one or more CPUs 3701 for controlling the overall backup server 3700, a network I/F 3702 for connecting to the network 3400, an NIC 3703 for connecting to the host computer 3300, a network I/F 3704 for connecting to a tape device 3800, a storage device 3705 formed from a plurality of hard disk drives or the like storing various types of configuration information or programs of the backup server 3700 as well as data transmitted from the host computer 3300 and first storage sub system 3100, and a memory 3706 for expanding such various types of configuration information or programs.

Expanded in the memory 3706 is a backup program 3710. This backup program 3710 is a program to be executed with the CPU 3701.

Further, the backup server 3700, for instance, is connected to the tape device 3800 via the network I/F 3704 of the backup server 3700 based on a prescribed network such as a SCSI (Small Computer System Interface).

In this case, the backup server 3700 has a function of controlling the backup and restoration of volumes of the first storage sub system 3100, and this function is provided by the backup program 3710 stored in the memory 3706 of the backup server 3700.

The backup program 3710 has a function of notifying the first storage sub system 3100 the start of backup, and backing up the data read from the first storage sub system 3100 by transferring it to a storage (tape device 3800 or storage device 3900) accessible from the backup server 3700.

Incidentally, backup means to replicate a volume by transmitting data in a volume of a storage sub system at an arbitrary time to a volume of another storage sub system.

Further, the backup program 3710 has a function of notifying the first storage sub system 3100 the start of restoration, and restoring the data read from the first storage sub system 3100 by transferring it to a storage (tape device 3800 or storage device 3900) accessible from the backup server 3700.

Incidentally, restoration means to restore the volume of a certain storage sub system to a point in time when such volume was backed up by returning the data backed up in the volume of another storage sub system to the volume of a certain sub system in the event of a disaster such as the loss of data in the storage sub system.

Incidentally, so as long as the physical device of the backup destination is accessible from the backup server 3700, it may be a tape device 3800 on a network independent from the network 3400 that is not directly accessible from the first storage sub system 3100, or on the network 3400 that is directly accessible from the first storage sub system 3100.

Nevertheless, this embodiment is based on the premise that the backup data is not altered. Thus, the physical device of the backup destination is desirably a medium such as a tape media or DVD-R in which alteration of data is not fundamentally performed.

Meanwhile, the host computer 3300 is a computer device having a CPU 3301 and a network I/F 3302 for connecting to the network 3400, and, for instance, is configured from a server having UNIX (registered trademark) or Windows (registered trademark) as its OS. Further, the host computer 3300 also has an information processing resource such as a memory. Moreover, the host computer 3300 is connected to a personal computer or workstation as an information I/O device via a network.

In this case, management of the volume of the first storage sub system 3100 is conducted by the volume management program 3120 stored in the memory 3116 of the storage controller 3110 being executed by the CPU 3111.

The first storage sub system 3100 handles the external volume device 3600 the same as the internal storage device 3115, and may also be a storage device configuring a volume to be provided to the host computer 3300. Further, the first storage sub system 3100, without possessing the internal storage device 3115, may provide a volume to the host computer 3300 with only the external volume device 3600. Incidentally, the external volume device 3600 may also be a volume provided by another storage sub system.

The first storage sub system 3100, upon providing a volume, has a thin provisioning function which is a function for dynamically allocating a data area regarding a storage area in which a write request was given by the host computer 3300. A data area referred to herein indicates a specific area of a physical device (hard disk drive, etc.) of the internal storage device 3115 and external volume device 3600.

The thin provisioning function is operated in coordination with the volume management program 3120 and thin provisioning program 3121 stored in the memory 3116 being executed by the CPU 3111. Further, the thin provisioning program 3121 operates based on the information stored in the mapping table 3123.

With this thin provisioning function, upon receiving a write request from the host computer 3300, the thin provisioning program 3121 refers to the mapping table 3123, and, when it is detected that the allocation of a data area to the data to be written has not yet been performed, allocation of the data area is performed, and the correspondence of the section that received the write request and the allocated data area is stored in the mapping table 3123.

Further, with the thin provisioning function, upon receiving a write request from the host computer 3300, the thin provisioning program 3121 refers to the mapping table 3123, and, when it is detected that the allocation of a data area to the data to be written has been performed, the data area allocated in correspondence with the section that received the write request is specified with the information stored in the mapping table 3123, and data is written in this data area.

Moreover, with the thin provisioning function, upon receiving a read request from the host computer 3300, the thin provisioning program 3121 refers to the mapping table 3123, and, when it is detected that the allocation of a data area to the data to be read has not been performed, a predetermined pattern such as "0" is transmitted to the host computer 3300.

Moreover, with the thin provisioning function, upon receiving a read request from the host computer 3300, the thin provisioning program 3121 refers to the mapping table 3123, and, when it is detected that the allocation of a data area to the data to be read has been performed, the data area allocated in correspondence with the section that received the read request is specified with the information stored in the mapping table 3123, and the data to be read stored in the data area is transmitted to the host computer 3300.

When the host computer 3300 requests the acquisition of information regarding an arbitrary volume, the first storage sub system 3100 is able to respond by adding information to a reply message to such information acquisition request when it detects that the target volume is using the thin provisioning function in the volume management program 3120.

Incidentally, even if the first storage sub system 3100 is not able to return information that the thin provisioning function is being used to the host computer 3300, it will suffice so as long as the system administrator or management software of the first storage sub system 3100 that set the target volume transmits information that the thin provisioning function is being used to the backup server 3700.

(3-2) Backup and Restoration Control Method in Third Embodiment

The method of performing backup from the first storage sub system 3100 to the tape device 3800 via the backup server 3700 in this embodiment is now explained.

Here, although an explanation is provided where the physical device of the backup destination is a tape device 3800 on a network that is independent from the network 3400 capable of directly transferring data from the first storage sub system 3100, the physical device of the backup destination may also be a storage device 3900 connected to the network 3400 capable of directly transferring data from the first storage sub system 3100.

With this storage system 3000, backup is performed from a volume using the thin provisioning function of the first storage sub system 3100 to the tape device 3800 managed by the backup server 3700 that is unrelated to the thin provisioning function.

Nevertheless, in the backup server 3700 controlling the backup, it is known at the start of backup that the backup source volume is using the thin provisioning function.

Prior to backing up the data in the backup source volume, the CPU 3701 of the backup server 3700 requests the first storage sub system 3100 to perform the backup of information for specifying sections in which a data area has been allocated to the target volume. Here, a dedicated command for a volume using the thin provisioning function is used.

The CPU 3111 of the first controller 3110 that received the backup request refers to the mapping table 3123 with the thin provisioning program 3121, creates a bitmap of information regarding the sections allocated with a data area (this information is hereinafter referred to as the "allocation bitmap"), and stores this in the allocation management table 3124.

Further, the CPU 3111 of the first controller 3110 adds an ID and similarly stores this ID for enabling the subsequent referral of the allocation bitmap. And, the CPU 3111 of the first controller 3110 notifies the ID to the backup server 3700.

The storage destination of the allocation management table 3124 is not limited to any type of storage device such as a memory 3116, internal storage device 3115 or external volume device 3600, so as long as it is a data storage section that can be referred to by the first controller 3110.

Further, storage destination of the allocation management table 3124 may also be a storage device in the external management terminal capable of replying to a referral request from the first controller 3110 of a memory 3133 or storage device 3132 in the [first] storage management terminal 3130.

Moreover, for ensuring security, it the CPU 3111 of the first controller 3110 is to limit restoration so that it can only be performed from the network server that performed the backup, it may add the ID and store information for specifying the backup server 3700 that made the request. The serial number of a device interface of the network server, WWN (World Wide Name) of a fiber channel or the like may be used for this.

Further, the CPU 3111 of the first controller 3110, without using the allocation management table 3124, may transmit the allocation bitmap to the backup server 3700 instead of transmitting the ID.

In this case, the CPU 3701 of the backup server 3700 manages the received information of the ID or allocation bitmap by associating it with the tape device 3800 of the backup destination.

The storage destination of the ID or allocation bitmap is a device such as the memory 3706 or storage device 3705 in the backup server 3700 that can be managed by the backup server 3700.

Further, in addition to the memory 3706 or storage device 3705, the storage destination of the ID or allocation bitmap may be stored as metadata in the tape device 3800 of the backup destination.

The CPU 3701 of the backup server 3700, after storing the ID or allocation bitmap, issues a read request to the backup source volume of the first controller 3110 for data of all areas of the volume, and stores this in the tape device 3800. This backup is complete pursuant to completing the storage of data of all areas of the volume.

Next, the method of restoring data from the tape device 3800 to the first storage sub system 3100 via the backup server 3700 based on the foregoing backup data is explained.

Here, although an explanation is provided where the physical device of the restoration source is a tape device 3800 on a network that is independent from the network 3400 capable of directly transferring data from the first storage sub system 3100, the physical device of the restoration source may also be a storage device 3900 connected to the network 3400 capable of directly transferring data from the first storage sub system 3100.

With this storage system 3000, restoration is performed from the tape device 3800 managed by the backup server 3700 that is unrelated to the thin provisioning function to the volume using the thin provisioning function of the first storage sub system 3100.

Nevertheless, in the backup server 3700 controlling the restoration, it is known at the start of backup that the restoration destination volume is using the thin provisioning function. Further, it is possible to determine that the backup source volume was using the thin provisioning function at the time of backup based on information such as the ID acquired at the time of backup.

Prior to the restoration of data, the CPU 3701 of the backup server 3700 requests the [first] storage sub system 3100 to perform the restoration of information concerning the data area allocation to the restoration destination volume at the time of backup. Here, a dedicated command for a volume using the thin provisioning function is used.

The CPU 3701 of the backup server 3700 requests restoration and further designated the ID acquired at the time of backup in order to refer to the allocation bitmap in the allocation management table 3124 stored at the time of backup.

Further, if the CPU 3701 of the backup server 3700 is storing an allocation bitmap instead of an ID in the backup server 3400, it transmits the allocation bitmap from the backup server 3400 to the first storage sub system 3100.

If the CPU 3111 of the first controller 3110 is storing information for specifying the backup server that made the restoration request, [the CPU 3111 of the first controller 3110] denies a restoration request made from a network server other than the backup server 3700 based on such information.

The CPU 3111 of the first controller 3110 allocates a data area to the restoration destination volume based on the allocation bitmap with the thin provisioning program 3121, and updates the mapping table 3123 according to this allocation status.

The CPU 3111 of the first controller 3110 notifies the backup server 3700 of the completion of updating the mapping table 3117, and the backup server 3400 that detects this writes the data stored in the tape device 3800 in the restoration destination volume of the first storage sub system 3100.

The CPU 3111 of the first controller 3110 performs restoration by writing data only in sections allocated with a data area during the foregoing writing of data with the thin provisioning program 3121, and abandoning all other data.

After completing the writing of the overall restoration source data, the CPU 3701 of the backup server 3700 completes the restoration process by notifying the completion of writing to the tape device 3800.

FIG. 15 is a diagram showing the schematic configuration of the allocation management table 3124. The allocation management table 3124 is configured from an ID storage column 31241, a WWN storage column 31242, and an allocation bitmap storage column 31243.

The allocation management table 3124 stores the ID for the CPU 3111 of the first controller 3110 to specify the allocation bitmap of the target volume in the ID storage column 31241.

Further, in order to limit the restorable network servers, the allocation management table 3124, if necessary, stores WWN or the like as information for specifying the backup server 3700 in the WWN storage column 31242.

Moreover, the allocation management table 3124 manages the status of the data area allocated to a volume using the thin provisioning function with the allocation bitmap allocated to each prescribed bitmap, and stores this allocation bitmap in the allocation bitmap storage column 31243.

Figure 16:
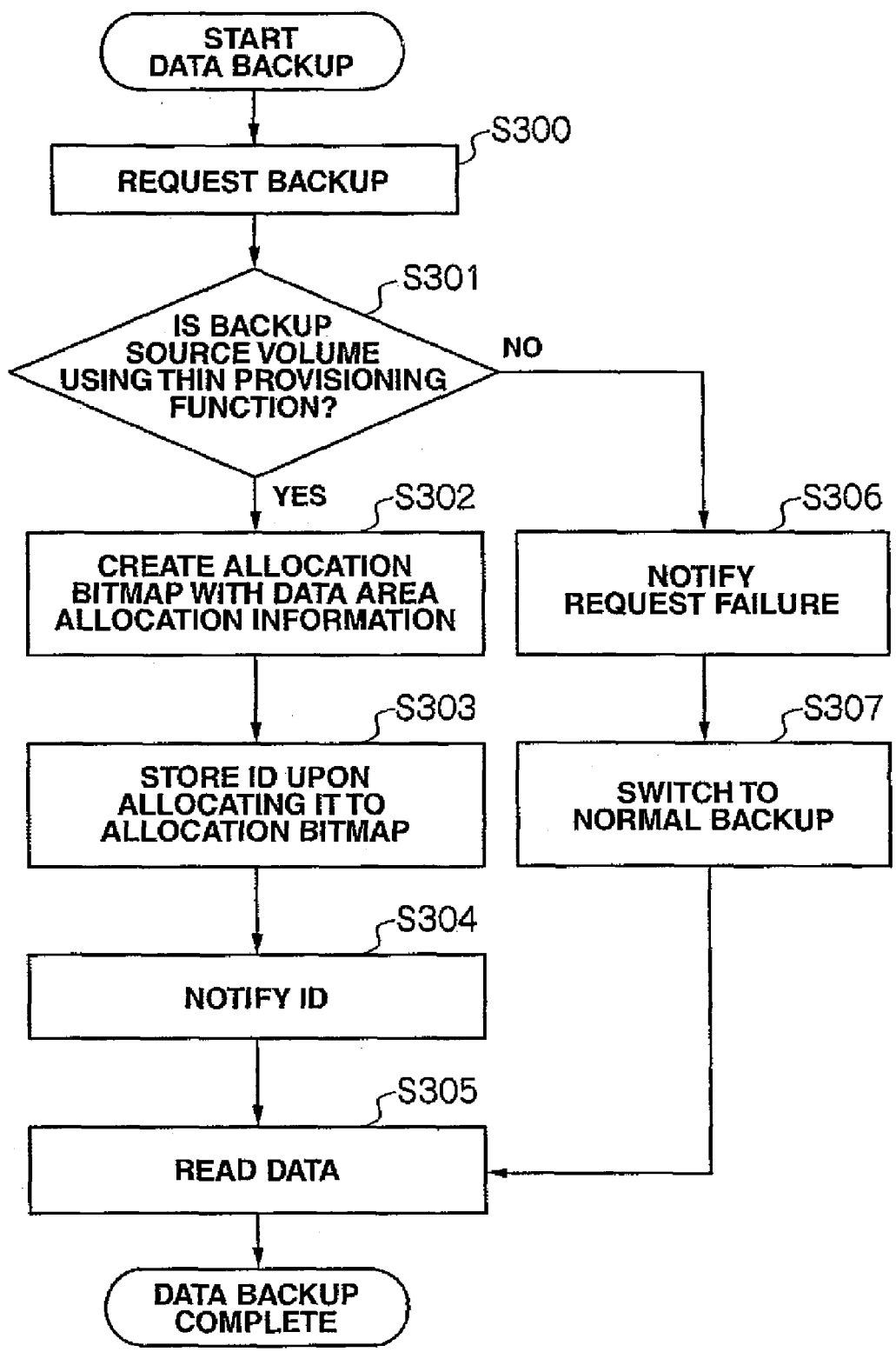
FIG. 16 is a flowchart showing the operation of the overall system of backup processing using an ID in the third embodiment.

FIG. 16 is a flowchart showing the schematic operation of the backup processing from a volume using the thin provisioning function of the first storage sub system 3100 to the tape device 3800 in this embodiment using the backup server 3700.

Incidentally, this flowchart shows the control method for storing the allocation bitmap at the time of backup in the first storage sub system 3100.

Foremost, the CPU 3701 of the backup server 3700, at step S300, requests the start of backup of a volume using the thin provisioning function in the storage sub system 3100.

Thereafter, the CPU 3701 of the backup server 3700 proceeds to step S301 for checking whether there is any defect in the subject matter notified from the backup server 3700 together with the backup request in the first controller 3110.

The CPU 3111 of the first controller 3110, at step S301, checks the validity of information of the volume using the thin provisioning function regarding volumes recognized by the backup program 3710 as using the thin provisioning function.

The CPU 3111 of the first controller 3110, at step S301, acquires information regarding the target volume of the volume management program 3120, and, when it becomes clear that the volume is not using the thin provisioning function, proceeds to step S306 and notifies the failure of coordination with the thin provisioning function in response to the backup request of the backup server 3700.

When the CPU 3701 of the backup server 3700 detects that the coordination with the thin provisioning function at step S306 is not possible, it proceeds to step S307, and, at step S307, changes the target volume, as with a volume that does not use the thin provisioning function, to a normal backup method that does not require ID management regarding the allocation bitmap at the time of backup.

Incidentally, the CPU 3701 of the backup server 3700 may also process this as a backup failure at the time of step S306 without proceeding to step S307.

The CPU 3701 of the backup server 3700 thereafter proceeds to step S305, and, at step S305, reads data of all areas of the backup source volume, and stores this in the tape device 3800.

Meanwhile, the CPU 3111 of the first controller 3110, at step S301, acquires information concerning the target volume of the volume management program 3120, and, when it becomes clear that the volume is using the thin provisioning function, it proceeds to step S302, and, at step S302, specifies the sections allocated with a data area based on the mapping table 3123, and thereby creates an allocation bitmap.

Subsequently, the CPU 3111 of the first controller 3110, at step S303, adds an ID to the allocation bitmap, and stores this together with the ID in the allocation management table 3124. Subsequently, the CPU 3111 of the first controller 3110 proceeds to step S304.

The CPU 3111 of the first controller 3110, at step S304, transmits the ID added at step S303 to the backup server 3700. The CPU 3701 of the backup server 3700 manages the ID by associating it with the tape device 3800 of the backup destination.

After the preparation of the backup processing in coordination with the thin provisioning function starting at step S301 is complete, the CPU 3701 of the backup server 3700 proceeds to step S305, and, at step S305, reads data of all areas of the backup source volume, and stores this in the tape device 3800. The backup processing is completed pursuant to the completion of step S305.

Figure 17:
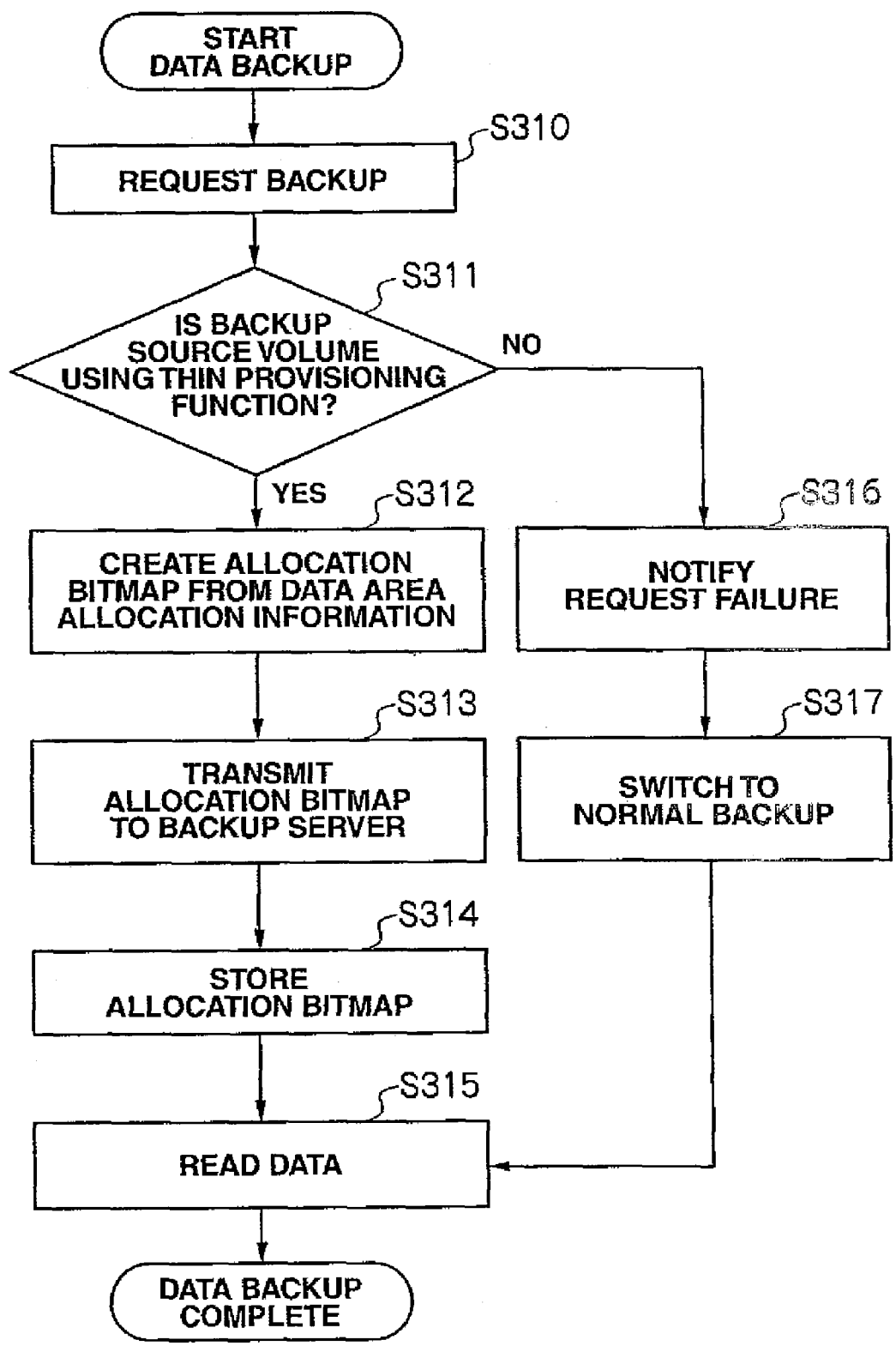
FIG. 17 is a flowchart showing the operation of the overall system of backup processing using an allocation bitmap in the third embodiment.

FIG. 17 is a flowchart showing the schematic operation of the backup processing from a volume using the thin provisioning function of the first storage sub system 3100 to the tape device 3800 in this embodiment using the backup server 3700.

Incidentally, this flowchart shows the control method for storing the allocation bitmap at the time of backup in the backup server 3400.

Foremost, the CPU 3701 of the backup server 3700, at step S310, requests the start of backup of a volume using the thin provisioning function in the storage sub system 3100.

Thereafter, the CPU 3701 of the backup server 3700 proceeds to step S311 for checking whether there is any defect in the subject matter notified from the backup server 3700 together with the backup request in the first controller 3110.

The CPU 3111 of the first controller 3110, at step S311, checks the validity of information of the volume using the thin provisioning function regarding volumes recognized by the backup program 3710 as using the thin provisioning function.

The CPU 3111 of the first controller 3110, at step S311, acquires information regarding the target volume of the volume management program 3120, and, when it becomes clear that the volume is not using the thin provisioning function, proceeds to step S316 and notifies the failure of coordination with the thin provisioning function in response to the backup request of the backup server 3700.

When the CPU 3701 of the backup server 3700 detects that the coordination with the thin provisioning function at step S316 is not possible, it proceeds to step S317, and, at step S317, changes the target volume, as with a volume that does not use the thin provisioning function, to a normal backup method that does not require allocation bitmap management at the time of backup.

Incidentally, the CPU 3701 of the backup server 3700 may also process this as a backup failure at the time of step S316 without proceeding to step S317.

The CPU 3701 of the backup server 3700 thereafter proceeds to step S315, and reads data of all areas of the backup source volume, and stores this in the tape device 3800.

Meanwhile, the CPU 3111 of the first controller 3110, at step S311, acquires information concerning the target volume of the volume management program 3120, and, when it becomes clear that the volume is using the thin provisioning function, it proceeds to step S312, and, at step S312, specifies the sections allocated with a data area based on the mapping table 3123, and thereby creates an allocation bitmap.

Subsequently, the CPU 3111 of the first controller 3110, at step S313, transmits the created bitmap to the backup server 3700.

The CPU 3701 of the backup server 3700, at step S314, stores the allocation bitmap transmitted from the first controller 3110. Subsequently, the CPU 3701 of the backup server 3700 proceeds to step S315.

After the preparation of the backup processing in coordination with the thin provisioning function starting at step S311 is complete, the CPU 3701 of the backup server 3700 proceeds to step S315, and, at step S315, reads data of all areas of the backup source volume, and stores this in the tape device 3800. The backup processing is completed pursuant to the completion of step S315.

Figure 18:
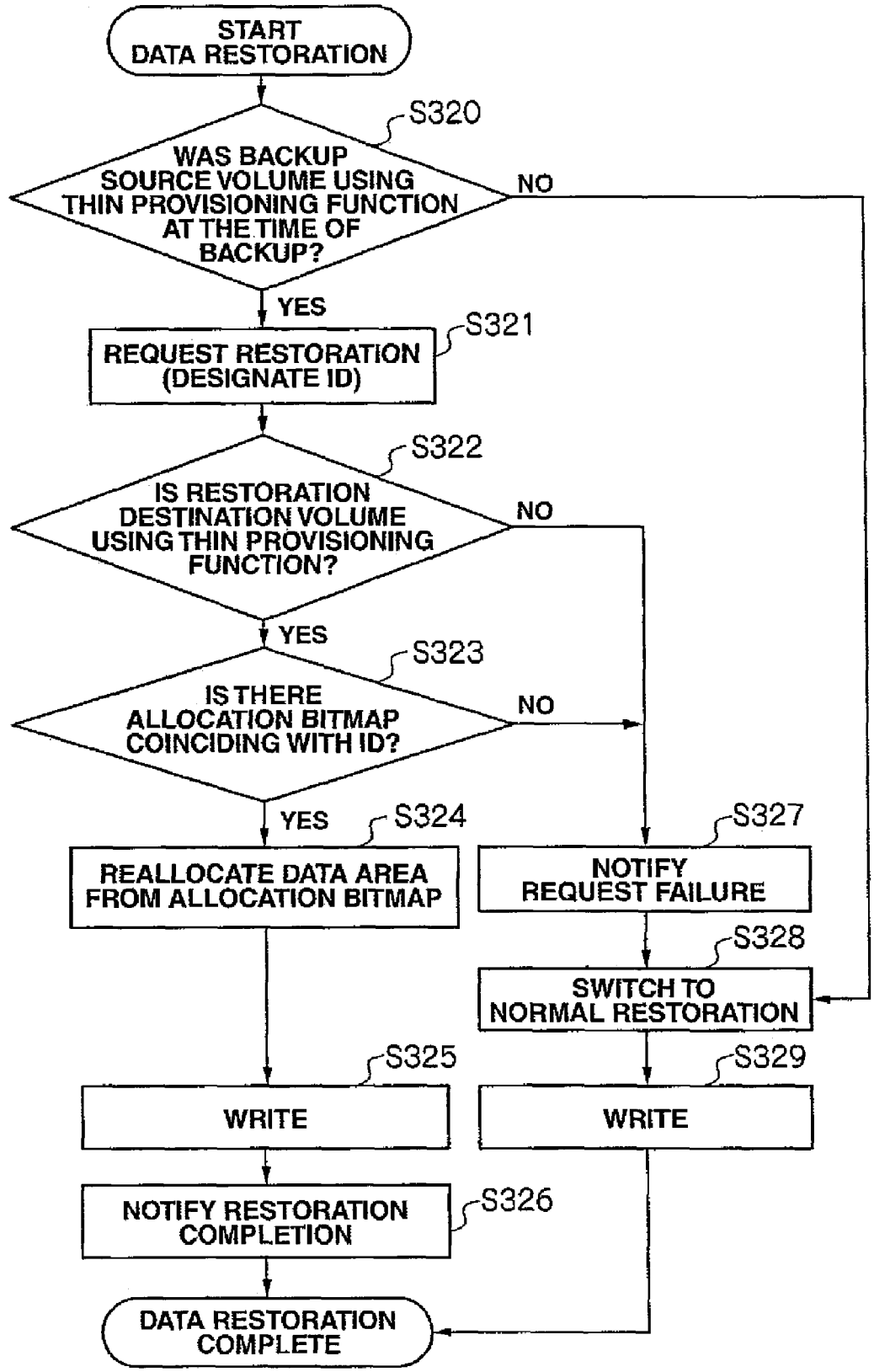
FIG. 18 is a flowchart showing the operation of the overall system of restoration processing using an ID in the third embodiment.

FIG. 18 is a flowchart showing the schematic operation of the restoration processing from the tape device 3800 to the volume using the thin provisioning function of the first storage sub system 3100 in this embodiment using the backup server 3700.

Incidentally, this flowchart shows the control method for storing the allocation bitmap, which is data area allocation information at the time of backup, in the first storage sub system 3100.

Foremost, the CPU 3701 of the backup server 3700, at step S320, checks whether the restoration destination volume was performing backup using the thin provisioning function. The CPU 3701 of the backup server 3700 proceeds to step S328 when the foregoing does not apply.

Meanwhile, when backup was being performed using the thin provisioning function, the CPU 3701 of the backup server 3700 proceeds to step S321, and notifies, together with the ID acquired at the time of backup, the first controller 3110 to perform restoration using the thin provisioning function to the first storage sub system 3100.

Thereafter, the CPU 3701 of the backup server 3700 proceeds to step S322 to check whether it is possible to perform restoration using the thin provisioning function in the first controller 3110.

The CPU 3111 of the first controller 3110, at step S322, checks the usage status of the thin provisioning function by the target volume since the restoration destination volume must be using the thin provisioning function as a premise for performing such restoration processing.

When it becomes clear that the restoration destination volume is not using the thin provisioning function as a result of the check at step S322, the CPU 3111 of the first controller 3110 proceeds to step S327, and provides a notification to such effect at step S327.

Meanwhile, when it becomes clear that the restoration destination volume is using the thin provisioning function as a result of the check at step S322, the CPU 3111 of the first controller 3110 proceeds to step S323, and, at step S323, checks whether an allocation bitmap corresponding to the designated ID exists.

The CPU 3111 of the first controller 3110, at step S323, searches the allocation management table 3124 with the thin provisioning program 3121, and checks whether an allocation bitmap coinciding with the designated ID exists.

When an allocation bitmap coinciding with the designated ID does not exist at S323, the CPU 3111 of the first controller 3110 deems that restoration using the thin provisioning function cannot be performed, and proceeds to step S327 in order to provide a notification to such effect.

Meanwhile, when an allocation bitmap coinciding with the designated ID does exist at S323, the CPU 3111 of the first controller 3110 proceeds to step S324 for restoring the data area at the time of backup since it is possible to perform restoration using the thin provisioning function.

The CPU 3111 of the first controller 3110, at step S324, performs processing for restoring the data area allocation at the time of backup to the target volume with the thin provisioning program 3121 based on the detected allocation bitmap.

Further, the CPU 3111 of the first controller 3110 changes the mapping table 3123 according to the allocation of the data area. After the completion of this allocation processing, the CPU 3111 of the first controller 3110 proceeds to step S325 for transferring data to be restored in the backup server 3700.

The CPU 3701 of the backup server 3700, at step S325, writes data of all areas of the volume at the time of backup.

Here, the CPU 3111 of the first controller 3110 performs writing processing for writing data transmitted from the backup server 3700 only in the data area corresponding to sections allocated with a data area according to the mapping table 3123 with the thin provisioning program 3121, and abandoning data for all other sections. The CPU 3111 of the first controller 3110 proceeds to step S326 after the completion of this writing processing.

The CPU 3111 of the first controller 3110, at step S326, continues the writing control only in the data areas corresponding to sections allocated with a data area according to the mapping table 3123. In order to cancel this, the CPU 3701 of the backup server 3700 notifies the completion of restoration to the first storage sub system 3100. The CPU 3111 of the first controller 3110 ends the restoration control based on the mapping table 3121 according to the notification of the completion of restoration. The restoration processing is completed thereby.

Meanwhile, the CPU 3111 of the first controller 3110, at step S327, notifies the backup server 3700 that it was not possible to restore the data area allocation status at the time of backup.

Upon receiving this notice, the CPU 3701 of the backup server 3700 proceeds to step S328 for performing processing according to the notice.

The CPU 3701 of the backup server 3700, at step S328, does not restore the allocation of the data area, and proceeds to step S329 in order to start the restoration of writing in all areas even if unnecessary allocation of data areas will occur.

Incidentally, the CPU 3701 of the backup server 3700, in this processing, may also select a different method such as discontinuing the restoration processing of switching the restoration destination volume to a volume that does not use the thin provisioning function.

The CPU 3701 of the backup server 3700, at step S329, writes data of all areas of the target volume regardless of whether or not the restoration destination volume is using the thin provisioning function. The restoration processing is completed pursuant to the completion of this writing processing.

Figure 19:
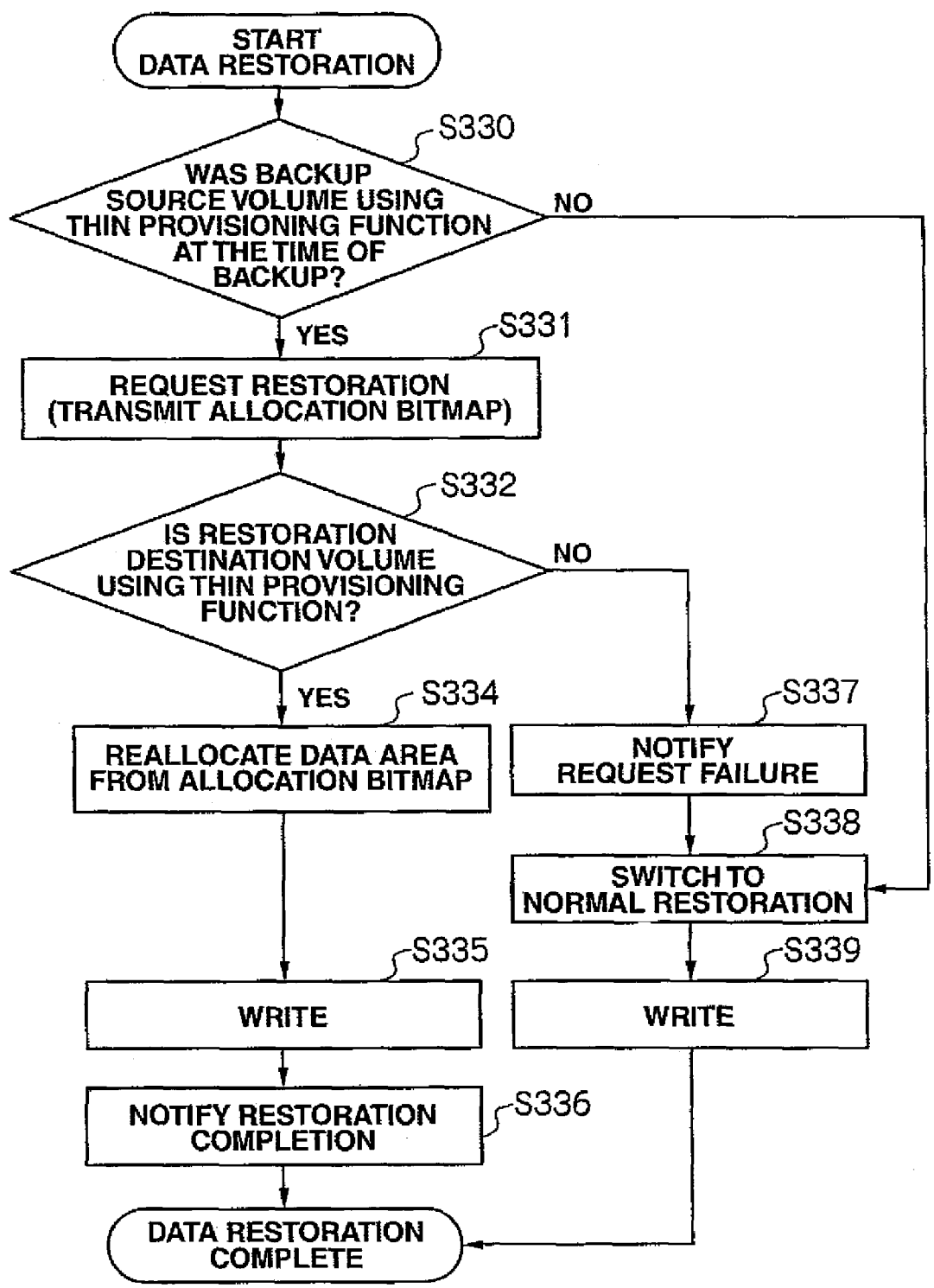
FIG. 19 is a flowchart showing the operation of the overall system of restoration processing using an allocation bitmap in the third embodiment.

FIG. 19 is a flowchart showing the schematic operation of the restoration processing from the tape device 3800 to the volume using the thin provisioning function of the first storage sub system 3100 in this embodiment using the backup server 3700.

Incidentally, this flowchart shows the control method for storing the allocation bitmap, which is data area allocation information at the time of backup, in the backup server 3700.

Foremost, the CPU 3701 of the backup server 3700, at step S330, checks whether the restoration destination volume was performing backup using the thin provisioning function. The CPU 3701 of the backup server 3700 proceeds to step S338 when the foregoing does not apply.

Meanwhile, when backup was being performed using the thin provisioning function, the CPU 3701 of the backup server 3700 proceeds to step S331, and notifies, together with the allocation bitmap acquired at the time of backup, the first controller 3110 to perform restoration using the thin provisioning function to the first storage sub system 3100.

Thereafter, the CPU 3701 of the backup server 3700 proceeds to step S332 to check whether it is possible to perform restoration using the thin provisioning function in the first controller 3110.

The CPU 3111 of the first controller 3110, at step S332, checks the usage status of the thin provisioning function by the target volume since the restoration destination volume must be using the thin provisioning function as a premise for performing such restoration processing.

When it becomes clear that the restoration destination volume is not using the thin provisioning function as a result of the check at step S332, the CPU 3111 of the first controller 3110 proceeds to step S337, and provides a notification to such effect at step S337.

Meanwhile, when it becomes clear that the restoration destination volume is using the thin provisioning function as a result of the check at step S332, the CPU 3111 of the first controller 3110 proceeds to step S334 for restoring the data area at the time of backup since it is possible to perform restoration using the thin provisioning function.

The CPU 3111 of the first controller 3110, at step S334, performs processing for restoring the data area allocation at the time of backup to the target volume with the thin provisioning program 3121 based on the allocation bitmap transmitted from the backup server 3700.

Further, the CPU 3111 of the first controller 3110 changes the mapping table 3123 according to the allocation of the data area. After the completion of this allocation processing, the CPU 3111 of the first controller 3110 proceeds to step S335 for transferring data to be restored in the backup server 3700.

The CPU 3701 of the backup server 3700, at step S335, writes data of all areas of the volume at the time of backup.

Here, the CPU 3111 of the first controller 3110 performs writing processing for writing data transmitted from the backup server 3700 only in the data area corresponding to sections allocated with a data area according to the mapping table 3123 with the thin provisioning program 3121, and abandoning data for all other sections. The CPU 3111 of the first controller 3110 proceeds to step S336 after the completion of this writing processing.

The CPU 3111 of the first controller 3110, at step S336, continues the writing control only in the data areas corresponding to sections allocated with a data area according to the mapping table 3123. In order to cancel this, the CPU 3701 of the backup server 3700 notifies the completion of restoration to the first storage sub system 3100. The CPU 3111 of the first controller 3110 ends the restoration control based on the mapping table 3121 according to the notification of the completion of restoration. The restoration processing is completed thereby.

Meanwhile, the CPU 3111 of the first controller 3110, at step S337, notifies the backup server 3700 that it was not possible to restore the data area allocation status at the time of backup.

Upon receiving this notice, the CPU 3701 of the backup server 3700 proceeds to step S338 for performing processing according to the notice.

The CPU 3701 of the backup server 3700, at step S338, does not restore the allocation of the data area, and proceeds to step S339 in order to start the restoration of writing in all areas even if unnecessary allocation of data areas will occur.

Incidentally, the CPU 3701 of the backup server 3700, in this processing, may also select a different method such as discontinuing the restoration processing of switching the restoration destination volume to a volume that does not use the thin provisioning function.

The CPU 3701 of the backup server 3700, at step S339, writes data of all areas of the target volume regardless of whether or not the restoration destination volume is using the thin provisioning function. The restoration processing is completed pursuant to the completion of this writing processing.

Figure 20:
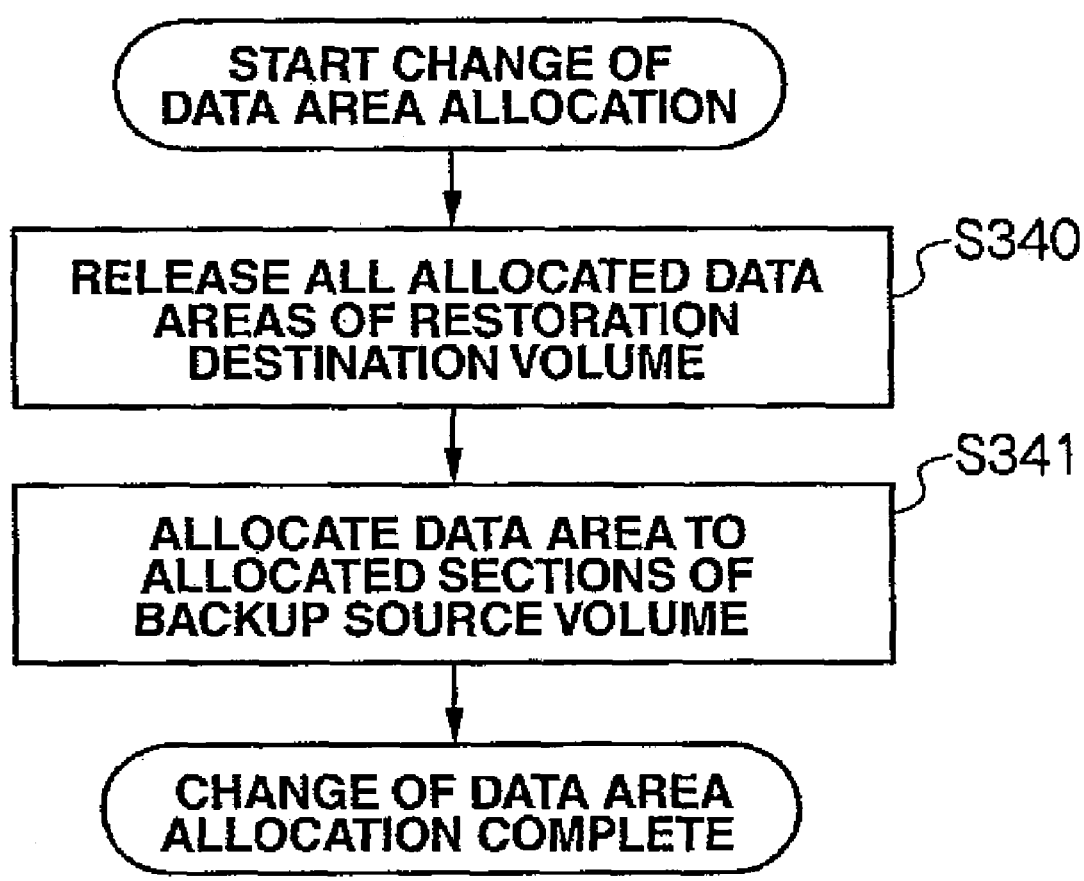
FIG. 20 is a flowchart showing the operation of controlling the reallocation of the first data area of restoration processing in the third embodiment.

FIG. 20 is a flowchart showing the first method regarding the detailed processing at step S324 and step S334.

In this method, after releasing all data areas allocated to the restoration destination volume, reallocation is performed to sections requiring allocation. The outline of this method is described below.

Foremost, the CPU 3111 of the first controller 3110, at step S340, releases all data areas allocated to the target volume. After the completion of this processing, the CPU 3111 of the first controller 3110 proceeds to step S341.

The CPU 3111 of the first controller 3110, at step S341, refers to the allocation bitmap, and performs data area allocation processing to sections allocated with a data area of the backup source volume. In this case, data area allocation processing is not performed to sections not allocated with a data area. The processing of step S324 and step S334 is completed pursuant to the completion of this processing.

Figure 21:
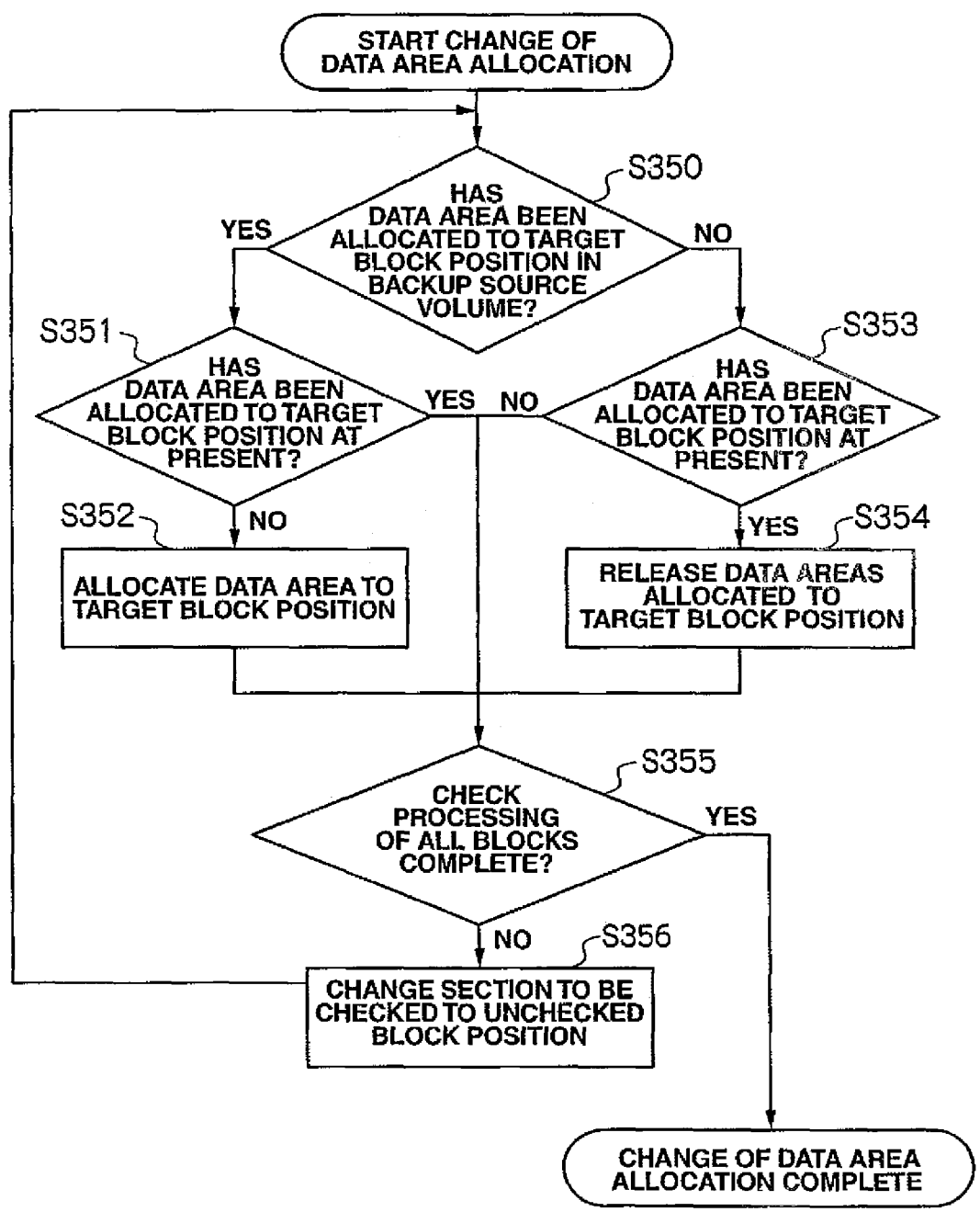
FIG. 21 is a flowchart showing the operation of controlling the reallocation of the second data area of restoration processing in the third embodiment.

FIG. 21 is a flowchart showing the second method regarding the detailed processing at step S324 and step S334.

In this method, among the data areas allocated to the target volume, allocation to sections that do not require allocation after the completion of step S324 and step S334 is released, and, among the sections not allocated with a data area, a data area is allocated to sections that require allocation after the completion of step S324 and step S334. The outline of this method is described below. In this flowchart, the data area allocation of a target volume is indicated as being conducted in volume block number units corresponding to the bitmaps of the allocation bitmap.

Foremost, the CPU 3111 of the first controller 3110, at step S350, acquires the data area allocation status at the time of backup of a certain volume block number. The CPU 3111 of the first controller 3110 proceeds to step S351 if a data area was allocated to the target volume block number of the backup source volume at the time of backup, and proceeds to step S353 if a data area was not allocated.

The CPU 3111 of the first controller 3110, at step S351, acquires the data area allocation status of the backup destination volume. Here, the CPU 3111 of the first controller 3110, at step S351, in concert with the processing of step S350, judges that a data area needs to be allocated to the target volume block number of the backup destination volume if the target volume block number is allocated with a data area of the backup source volume and a data area has not been allocated to the target volume block number of the backup destination volume, and, at step S352, allocates a data area to such volume block number.

The CPU 3111 of the first controller 3110, after the data area allocation processing at step S352, proceeds to step S355 for judging whether processing of all volume block numbers of the target volume has ended.

Meanwhile, the CPU 3111 of the first controller 3110, at step S351, in concert with the processing of step S350, judges that the data area may be ongoingly used if the target volume block number is allocated with a data area of the backup source volume and backup destination volume, and proceeds to step S355 for judging whether processing of all volume block numbers of the target volume has ended.

The CPU 3111 of the first controller 3110, at step S353, acquires the data area allocation status of the backup destination volume. Here, the CPU 3111 of the first controller 3110, at step S353, in concert with the processing of step S354, judges that a data area does not need to be allocated to the target volume block number of the backup destination volume if the target volume block number is not allocated with a data area of the backup source volume and a data area has been allocated to the target volume block number of the backup destination volume, and, at step S354, releases the data area of such volume block number.

The CPU 3111 of the first controller 3110, after the release of data area allocation at step S354, proceeds to step S355 for judging whether processing of all volume block numbers of the target volume has ended.

Meanwhile, the CPU 3111 of the first controller 3110, at step S353, in concert with the processing of step S350, judges that operations relating to data area allocation is not required when a data area has not been allocated to the target volume block number of the backup source volume and backup destination volume, does not perform any such operation, and proceeds to step S355 for judging whether processing of all volume block numbers of the target volume has ended.

The CPU 3111 of the first controller 3110, at step S355, compares the data area allocation of the target volume block number of the backup source volume and the backup destination volume regarding all volume block numbers in the target volume, and judges whether the incidental data area allocation or release processing is complete.

If processing of all volume block numbers is incomplete, the CPU 3111 of the first controller 3110, at step S356, switches the target volume block number to an unprocessed volume block number, and returns to step S350. When there is no remaining unprocessed volume block number, the processing routine is ended.

Figure 22:
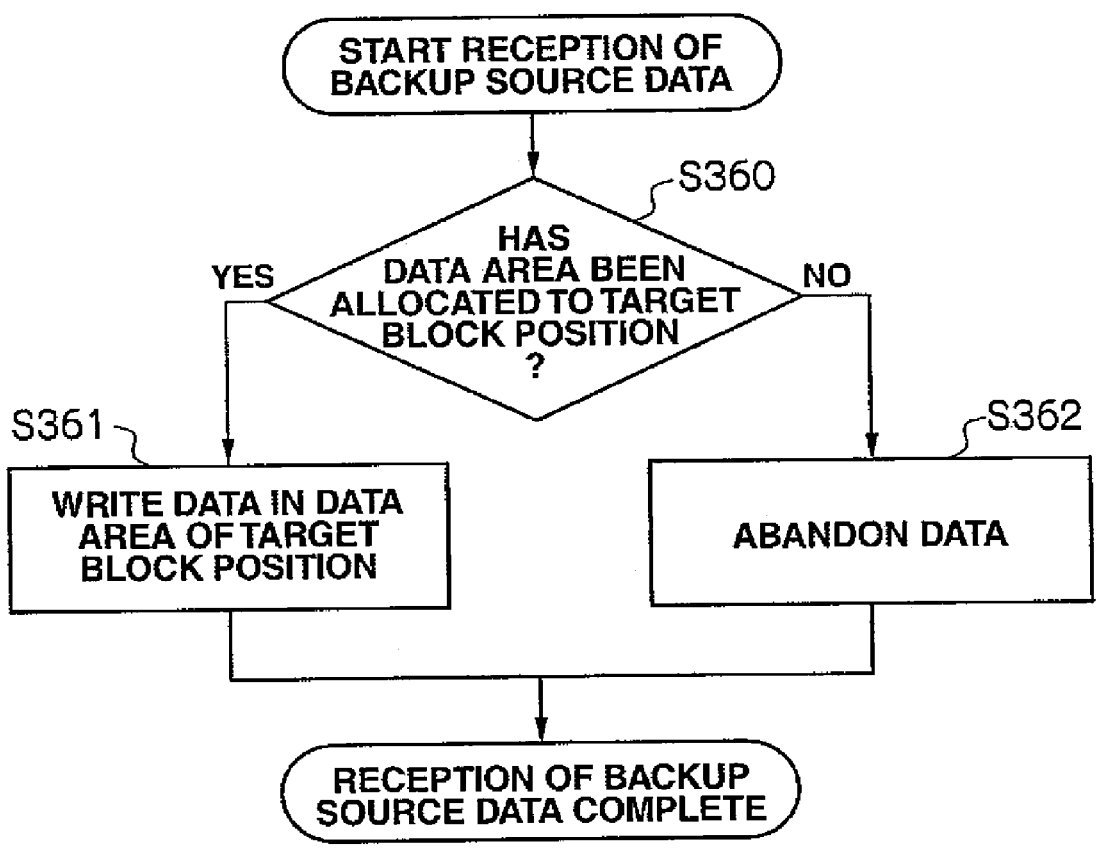
FIG. 22 is a flowchart showing the operation of controlling the data writing of restoration processing in the third embodiment.
Figure 23:
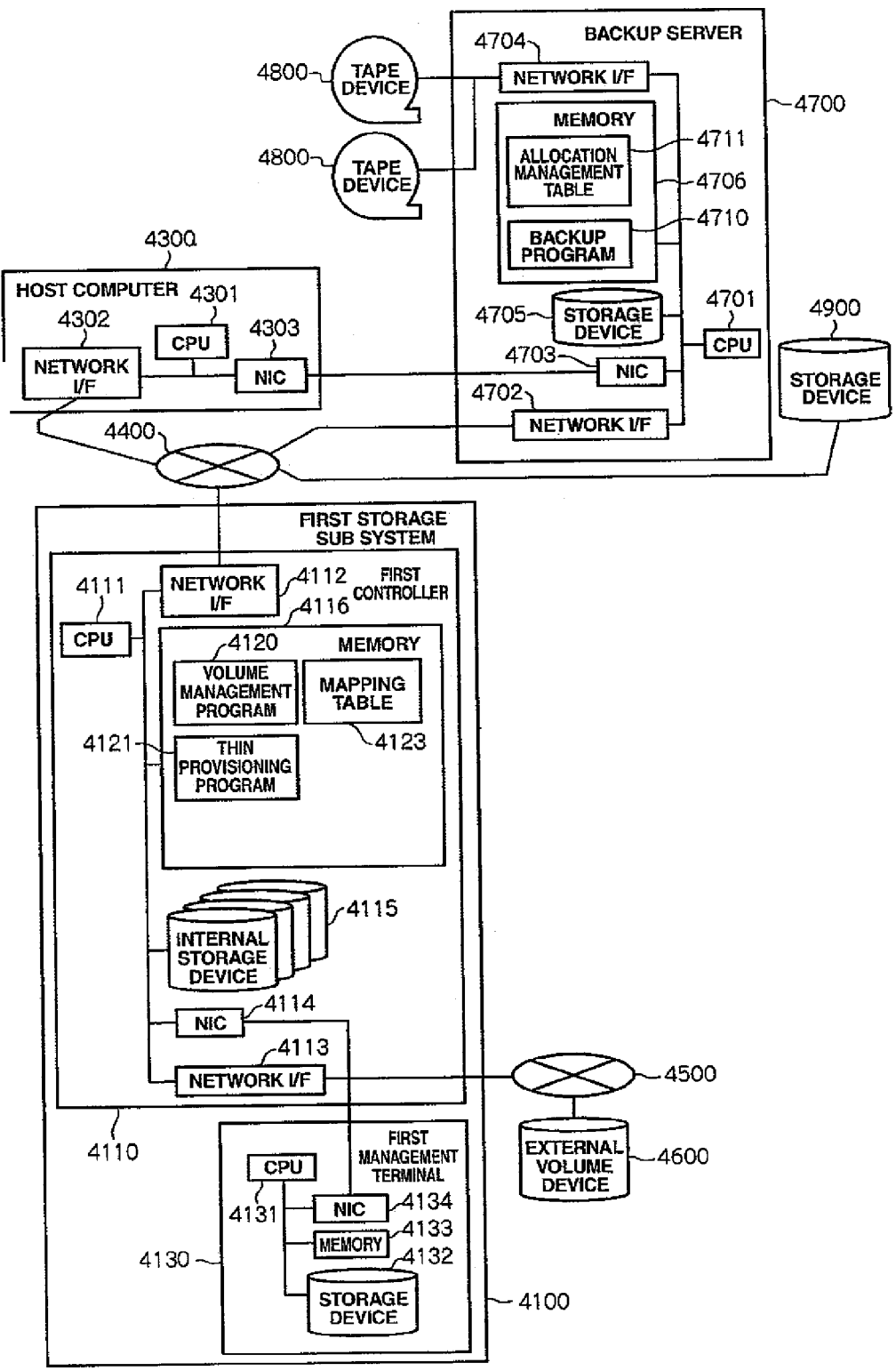
FIG. 23 is a diagram showing the overall configuration in the fourth embodiment.

FIG. 22 is a flowchart showing the schematic operation in the detailed processing of step S325 and step S335 which is data reception processing in the restoration destination volume using the thin provisioning function.

The CPU 3111 of the first controller 3110, at step S360, checks whether a data area is allocated to a section that received a write request from the backup program 3710 based on the allocation bitmap transmitted from the network server. Here, the CPU 3111 of the first controller 3110 proceeds to step S361 for writing data in this data area if the target volume block number is allocated with a data area.

Meanwhile, the CPU 3111 of the first controller 3110 proceeds to step S362 since it does not need to write data in this data area if the target volume block number is not allocated with a data area.

The CPU 3111 of the first controller 3110, at step S361, stores the received data in the data area in order to restore the data stored in the data area of the backup source volume.

The CPU 3111 of the first controller 3110, at step S362, does not perform writing processing since it determines that the data not allocated with a data area at the time of backup can be restored without having to store the data, and abandons such data.

Like this, with the storage system 3000, upon backing up data of a volume that uses the thin provisioning function in the first storage sub system 3100, an allocation bitmap is created from information for specifying the data position in the volume allocated with a data area, and ID is added to this allocation bitmap, and this is stored in the allocation management table 3124 together with the ID.

Subsequently, with the storage system 3000, the ID added to the allocation bitmap is transmitted to the backup server 3700 in the first storage sub system 3100, and the backup server 3700 manages this ID by associating it with the tape device 3800 of the backup destination.

And, with the storage system 3000, upon restoring the backup data, the data area allocation at the time of backup is restored with the ID managed in the backup server 3700 and the allocation bitmap stored in the first storage sub system 3100, and the backup data is written in the data area.

As a result, with the storage system 3000, it is possible to effectively prevent the allocation of an unnecessary data area to the backup destination volume and the wasteful consumption of the data area, and, as a result, the data area can be efficiently allocated to the restoration destination volume.

Figure 24:
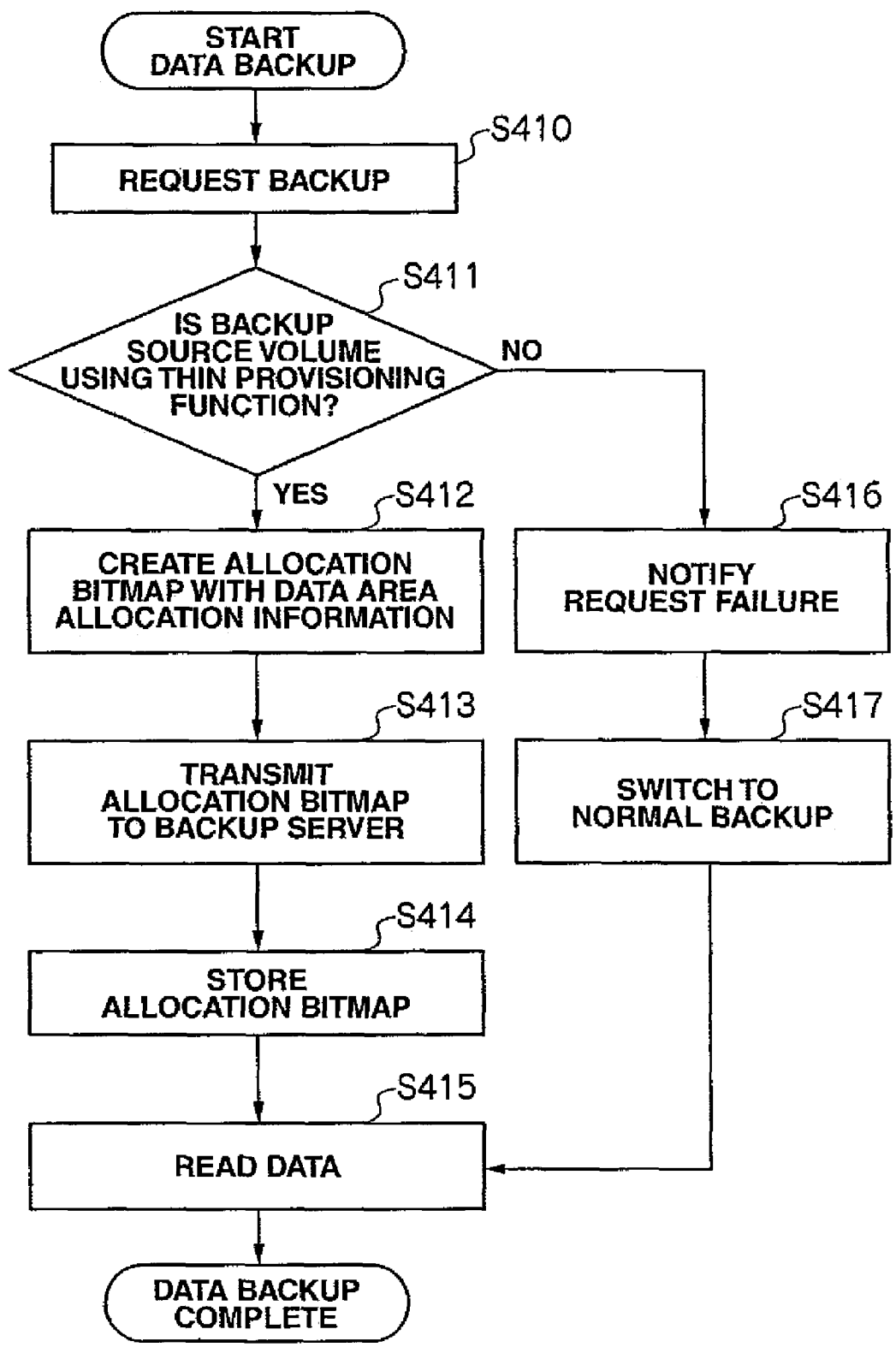
FIG. 24 is a flowchart showing the operation of the overall system of backup processing the fourth embodiment.

(4) Fourth Embodiment (4-1) Configuration of Storage System in Fourth Embodiment FIG. 24 is a diagram showing the configuration of the storage system applying this invention in the fourth embodiment. The storage system 4000 according to this embodiment is configured by a first storage sub system 4100, a backup server 4700, a storage device 4900, and a host computer 4300 being connected via a network 4400 such as a SAN.

Incidentally, in this embodiment, although a configuration is illustrated where the first storage sub system 4100, backup server 4700, storage device 4900, and host computer 4300 are connected via the same network 4400, in addition to this configuration, the network between the first storage sub system 4100 and host computer 4300, and the network of the first storage sub system 4100, backup server 4700, and storage device 4900 may be separated.

Here, a storage sub system is a system that consolidates a plurality of hard disk drives or the like, manages these hard disk drives or the like with a RAID or JBOD configuration, and provides these as a logical storage area to a host computer. Incidentally, this logical storage area is referred to as a volume.

The first storage sub system 4100 is configured from a first controller 4110 and a first management terminal 4130, and is capable of performing maintenance operations such as creating volumes and setting various functions with the first management terminal 4130. Further, the host computer 4300 may also be used to set the various functions.

Further, the first storage sub system 4100 is connected to an external volume device 4600 via a prescribed network 4500.

The first controller 4110 is configured from one or more CPUs 4111 for controlling the overall first controller 4110, a network I/F 4112 for connecting to the network 4400, a network I/F 4113 for connecting to the network 4500, an NIC 4114 for connecting to the first management terminal 4130, an internal storage device 4115 formed from a plurality of hard disk drives or the like storing various types of configuration information or programs of the first controller 4110 as well as data transmitted from the host computer 4300, and a memory 4116 for expanding such various types of configuration information or programs.

Expanded in the memory 4116 are a volume management program 4120, a thin provisioning program 4121, and a mapping table 4123. The volume management program 4120 and thin provisioning program 4121 are programs to be executed with the CPU 4111.

The first management terminal 4130 is configured from one or more CPUs 4131 for controlling the overall first management terminal 4130, a storage device 4132 storing various types of information and programs of the first controller 4110, a memory 4133 for expanding various types of configuration information and programs, and an NIC 4134 for connecting to the first controller 4110.

Meanwhile, the backup server 4700 is configured from one or more CPUs 4701 for controlling the overall backup server 4700, a network I/F 4702 for connecting to the network 4400, an NIC 4703 for connecting to the host computer 4300, a network I/F 4704 for connecting to a tape device 4800, a storage device 4705 formed from a plurality of hard disk drives or the like storing various types of configuration information or programs of the backup server 4700 as well as data transmitted from the host computer 4300 and first storage sub system 4100, and a memory 4706 for expanding such various types of configuration information or programs.

Expanded in the memory 4706 are a backup program 4710 and a backup storage table 4711. This backup program 4710 is a program to be executed with the CPU 4701.

Further, the backup server 4700, for instance, is connected to the tape device 4800 via the network I/F 4704 of the backup server 4700 based on a prescribed network such as a SCSI.

In this case, the backup server 4700 has a function of controlling the backup and restoration of volumes of the first storage sub system 4100, and this function is provided by the backup program 4710 stored in the memory 4706 of the backup server 4700.

Incidentally backup means to replicate a volume by transmitting data in a volume of a storage sub system at an arbitrary time to a volume of another storage sub system.

The backup program 4710 has a function of notifying the first storage sub system 4100 the start of restoration, and restoring the data read from the a storage accessible by the backup server 4700 by transferring it to the first storage sub system 4100.

Incidentally, restoration means to restore the volume of a certain storage sub system to a point in time when such volume was backed up by returning the data backed up in the volume of another storage sub system to the volume of a certain sub system in the event of a disaster such as the loss of data in the storage sub system.

Moreover, the backup program 4710 has a function of determining whether the host computer 4300 has written data in an area of the backup source data based on the information notified from the backup server 4700 at the time of backup.

In addition, the backup program 4710 has a function of requesting initialization to the first storage sub system 4100.

Incidentally, so as long as the physical device of the backup destination is accessible from the backup server 4700, it may be a tape device 4800 on a network independent from the network 4400 that is not directly accessible from the first storage sub system 4100, or on the network 4400 that is directly accessible from the first storage sub system 4100.

Nevertheless, this embodiment is based on the premise that the backup data is not altered. Thus, the physical device of the backup destination is desirably a medium such as a tape media or DVD-R in which alteration of data is not fundamentally performed.

Meanwhile, the host computer 4300 is a computer device having a CPU 4301 and a network I/F 4302 for connecting to the network 4400, and, for instance, is configured from a server having UNIX (registered trademark) or Windows (registered trademark) as its OS. Further, the host computer 4300 also has an information processing resource such as a memory. Moreover, the host computer 4300 is connected to a personal computer or workstation as an information I/O device via a network.

In this case, management of the volume of the first storage sub system 4100 is conducted by the volume management program 4120 stored in the memory 4116 of the storage controller 4110 being executed by the CPU 4111.

The first storage subsystem 4100 handles the external volume device 4600 the same as the internal storage device 4115, and may also be a storage device configuring a volume to be provided to the host computer 4300. Further, the first storage sub system 4100, without possessing the internal storage device 4115, may provide a volume to the host computer 4300 with only the external volume device 4600. Incidentally, the external volume device 4600 may also be a volume provided by another storage sub system.

The first storage sub system 4100, upon providing a volume, has a thin provisioning function which is a function for dynamically allocating a data area regarding a storage area in which a write request was given by the host computer 4300. A data area referred to herein indicates a specific area of a physical device (hard disk drive, etc.) of the internal storage device 4115 and external volume device 4600.

The thin provisioning function is operated in coordination with the volume management program 4120 and thin provisioning program 4121 stored in the memory 4116 being executed by the CPU 4111. Further, the thin provisioning program 4121 operates based on the information stored in the mapping table 4123.

With this thin provisioning function, upon receiving a write request from the host computer 4300, the thin provisioning program 4121 refers to the mapping table 4123, and, when it is detected that the allocation of a data area to the data to be written has not yet been performed, allocation of the data area is performed, and the correspondence of the section that received the write request and the allocated data area is stored in the mapping table 4123.

Further, with the thin provisioning function, upon receiving a write request from the host computer 4300, the thin provisioning program 4121 refers to the mapping table 4123, and, when it is detected that the allocation of a data area to the data to be written has been performed, the data area allocated in correspondence with the section that received the write request is specified with the information stored in the mapping table 4123, and data is written in this data area.

Moreover, with the thin provisioning function, upon receiving a read request from the host computer 4300, the thin provisioning program 4121 refers to the mapping table 4123, and, when it is detected that the allocation of a data area to the data to be read has not been performed, a predetermined pattern such as "0" is transmitted to the host computer 4300.

Moreover, with the thin provisioning function, upon receiving a read request from the host computer 4300, the thin provisioning program 4121 refers to the mapping table 4123, and, when it is detected that the allocation of a data area to the data to be read has been performed, the data area allocated in correspondence with the section that received the read request is specified with the information stored in the mapping table 4123, and the data to be read stored in the data area is transmitted to the host computer 4300.

Moreover, with the thin provisioning function, upon receiving an initialization request from the host computer 4300, the thin provisioning program 4120 releases the data areas allocated to the initialization target volume, and changes the data area allocation information stored in the mapping table 4123. Nevertheless, with the thin provisioning function, if the initialization target volume is not using the thin provisioning function, the volume management program 4120 performs initialization processing such as storing "0" in all areas of the target volume.

When the host computer 4300 requests the acquisition of information regarding an arbitrary volume, the first storage sub system 4100 is able to respond by adding information to a reply message to such information acquisition request when it detects that the target volume is using the thin provisioning function in the volume management program 4120.

Incidentally, even if the first storage sub system 4100 is not able to return information that the thin provisioning function is being used to the host computer 4300, it will suffice so as long as the system administrator or management software of the first storage sub system 4100 that set the target volume transmits information that the thin provisioning function is being used to the backup server 4700.

(4-2) Backup and Restoration Control Method in Fourth Embodiment

The method of performing backup from the first storage sub system 4100 to the tape device 4800 via the backup server 4700 in this embodiment is now explained.

Here, although an explanation is provided where the physical device of the backup destination is a tape device 4800 on a network that is independent from the network 4400 capable of directly transferring data from the first storage sub system 4100, the physical device of the backup destination may also be a storage device 4900 connected to the network 4400 capable of directly transferring data from the first storage sub system 4100.

With this storage system 4000, backup is performed from a volume using the thin provisioning function of the first storage sub system 4100 to the tape device 4800 managed by the backup server 4700 that is unrelated to the thin provisioning function.

Nevertheless, in the backup server 4700 controlling the backup, it is known at the start of backup that the backup source volume is using the thin provisioning function.

Prior to backing up the data in the backup source volume, the CPU 4701 of the backup server 4700 requests the first storage sub system 4100 to perform the backup of information for specifying sections in which a data area has been allocated to the target volume. Here, a dedicated command for a volume using the thin provisioning function is used.

The CPU 4111 of the first controller 4110 that received the backup request refers to the mapping table 4123 with the thin provisioning program 4121, creates a bitmap of information regarding the sections allocated with a data area (this information is hereinafter referred to as the "allocation bitmap"), and transmits this to the backup server 4700.

The CPU 4701 of the backup server 4700 stores the received information of the allocation bitmap in the allocation management table 4711, and manages such information by associating it with the tape device 4800 of the backup destination.

The CPU 4701 of the backup server 4700, after storing the allocation bitmap, issues a read request to the backup source volume of the first controller 4110 for data of all areas of the volume, and stores this in the tape device 4800. This backup is complete pursuant to completing the storage of data of all areas of the volume.

Next, the method of restoring data from the tape device 4800 to the first storage sub system 4100 via the backup server 4700 based on the foregoing backup data is explained.

Here, although an explanation is provided where the physical device of the restoration source is a tape device 4800 on a network that is independent from the network 4400 capable of directly transferring data from the first storage sub system 4100, the physical device of the restoration source may also be a storage device 4900 connected to the network 4400 capable of directly transferring data from the first storage sub system 4100.

With this storage system 4000, restoration is performed from the tape device 4800 managed by the backup server 4700 that is unrelated to the thin provisioning function to the volume using the thin provisioning function of the first storage sub system 4100.

Nevertheless, in the backup server 4700 controlling the restoration, it is known at the start of backup that the restoration destination volume is using the thin provisioning function. Further, it is possible to determine that the backup source volume was using the thin provisioning function at the time of backup based on information such as the allocation bitmap status acquired at the time of backup.

Prior to the restoration of data, the CPU 4701 of the backup server 4700 requests initialization by designating the restoration destination volume of the first storage sub system 4100 with the backup program 4710, and releases all data areas allocated to the volume.

After releasing all data areas, the CPU 4701 of the backup server 4700 refers to the allocation bitmap with the backup program 4710, and transmits the restoration source data stored in the tape device 3800 only regarding sections allocated with a data area. This restoration is complete pursuant to the completion of transmission of the restoration source data regarding all sections allocated with a data area.

FIG. 24 is a flowchart showing the schematic operation of the backup processing from a volume using the thin provisioning function of the first storage sub system 4100 to the tape device 4800 in this embodiment using the backup server 4700.

Foremost, the CPU 4701 of the backup server 4700, at step S410, requests the start of backup of a volume using the thin provisioning function in the storage sub system 4100.

Thereafter, the CPU 4701 of the backup server 4700 proceeds to step S411 for checking whether there is any defect in the subject matter notified from the backup server 4700 together with the backup request in the first controller 4110.

The CPU 4111 of the first controller 4110, at step S411, checks the validity of information of the volume using the thin provisioning function regarding volumes recognized by the backup program 4710 as using the thin provisioning function.

The CPU 4111 of the first controller 4110, at step S411, acquires information regarding the target volume of the volume management program 4120, and, when it becomes clear that the volume is not using the thin provisioning function, proceeds to step S416 and notifies the failure of coordination with the thin provisioning function in response to the backup request of the backup server 4700.

When the CPU 4701 of the backup server 4700 detects that the coordination with the thin provisioning function at step S416 is not possible, it proceeds to step S417, and, at step S417, changes the target volume, as with a volume that does not use the thin provisioning function, to a normal backup method that does not require allocation bit management regarding the allocation bitmap at the time of backup.

Incidentally, the CPU 4701 of the backup server 4700 may also process this as a backup failure at the time of step S416 without proceeding to step S417.

The CPU 4701 of the backup server 4700 thereafter proceeds to step S415, and, at step S415, reads data of all areas of the backup source volume, and stores this in the tape device 4800.

Meanwhile, the CPU 4111 of the first controller 4110, at step S411, acquires information concerning the target volume of the volume management program 4120, and, when it becomes clear that the volume is using the thin provisioning function, it proceeds to step S412, and, at step S412, specifies the sections allocated with a data area based on the mapping table 4123, and thereby creates an allocation bitmap.

Subsequently, the CPU 4111 of the first controller 4110, at step S413, transmits the created bitmap to the backup server 4700.

The CPU 4701 of the backup server 4700, at step S414, stores the allocation bitmap transmitted from the first controller 4110 in the allocation management table 4711. Subsequently, the CPU 4701 of the backup server 4700 proceeds to step S415.

After the preparation of the backup processing in coordination with the thin provisioning function starting at step S411 is complete, the CPU 4701 of the backup server 4700 proceeds to step S415, and, at step S415, reads data of all areas of the backup source volume, and stores this in the tape device 4800. The backup processing is completed pursuant to the completion of step S415.

Figure 25:
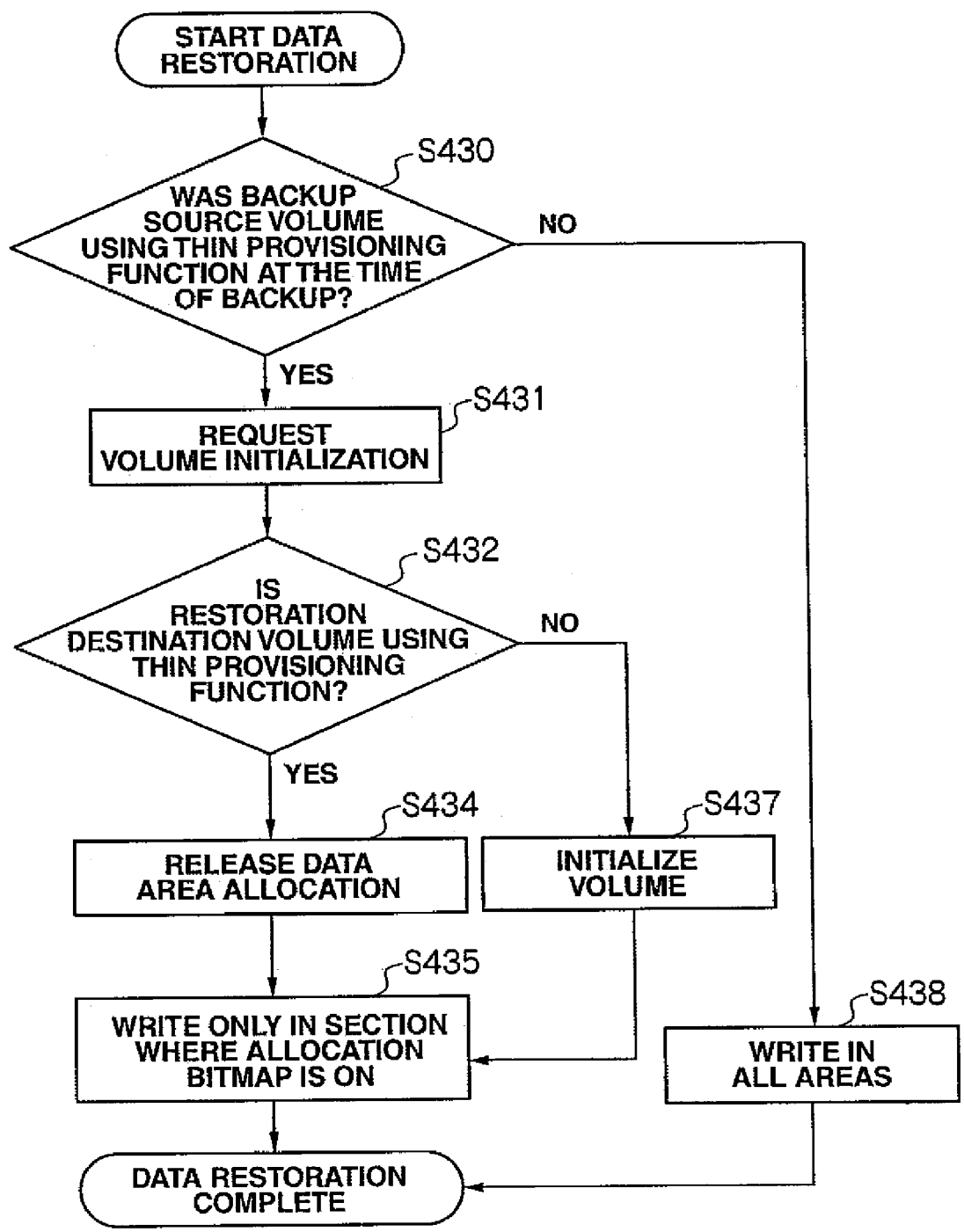
FIG. 25 is a flowchart showing the operation of the overall system of restoration processing the fourth embodiment.

FIG. 25 is a flowchart showing the schematic operation of the restoration processing from the tape device 4800 to the volume using the thin provisioning function of the first storage sub system 4100 in this embodiment using the backup server 4700.

Foremost, the CPU 4701 of the backup server 4700, at step S430, checks whether the restoration destination volume was performing backup using the thin provisioning function. The CPU 4701 of the backup server 4700 proceeds to step S438 when the foregoing does not apply, and performs restoration by writing data in all areas of the backup destination volume as in the case of a normal volume.

Meanwhile, when backup was being performed using the thin provisioning function, the CPU 4701 of the backup server 4700 proceeds to step S431, and issues an initialization request to the first storage sub system 4100 in order to release the data areas allocated by the restoration destination volume, and then proceeds to step S432.

The CPU 4111 of the first controller 4110, upon receiving the initialization request, at step S432, uses the volume management program 4120 to determine whether it is necessary to release the data area in the target volume, or to write "0" data in all areas. The CPU 4111 of the first controller 4110 proceeds to step S434 if the target volume is using the thin provisioning function as a result of the foregoing determination, and proceeds to step S437 if the target volume is not using the thin provisioning function.

The CPU 4111 of the first controller 4110, at step S434, activates the thin provisioning program 4121 with the volume management program 4120, and releases the allocation of data areas allocated to the target volume. The CPU 4111 of the first controller 4110 thereafter proceeds to step S435.

The CPU 4111 of the first controller 4110, at step S437, performs the initialization processing of the target volume with the volume management program 4120. Initialization processing referred to herein refers to the processing for storing data such as "0" in all areas of the target volume and nullifying data stored in the volume. The CPU 4111 of the first controller 4110 thereafter proceeds to step S435. Incidentally, upon reading the data stored in the target volume at the completion of step S434 and step S437, there would be no difference in the data.

The CPU 3701 of the backup server 3700, at step S435, checks the allocation bitmap with the backup program 4410, and transmits the [allocation bitmap] to the first storage sub system 4100 only regarding sections allocated with a data area at the time of backup. And, the CPU 4111 of the first controller 4110 allocates a data area only to sections allocated with a data area at the time of backup, and writes data in the restoration destination volume. Data is not written in sections not allocated with a data area. The restoration processing is completed thereby.

Figure 26:
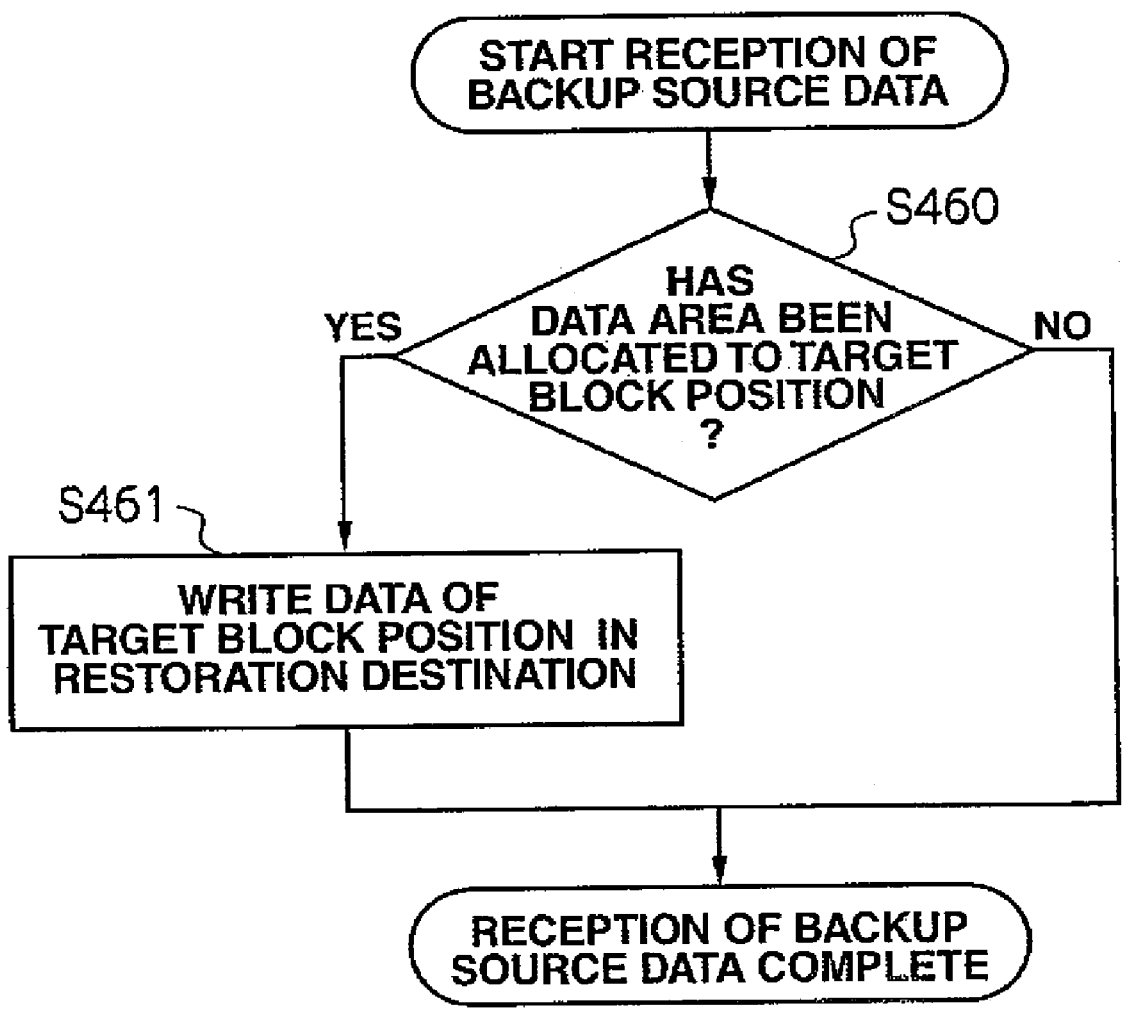
FIG. 26 is a flowchart showing the operation of controlling the data writing of restoration processing in the fourth embodiment.

FIG. 26 is a flowchart showing the schematic operation in the detailed processing of step S435 which is data writing processing in the restoration destination volume using the thin provisioning function with the backup program 4710.

The CPU 4701 of the backup server 4700, at step S460, checks whether data is to be written with the backup program 4710 based on the acquired allocation bitmap. Here, the CPU 4701 of the backup server 4700 proceeds to step S461 for writing data in this data area if the target storage position is allocated with a data area.

Meanwhile, if the target storage position is not allocated with a data area, the CPU 4701 of the backup server 4700 ends the processing since it is not necessary to write data in the data area.

The CPU 4111 of the first controller 4110, at step S461, stores the received data in the data area in order to restore the data stored in the data area at the time of backup. The data storage processing is completed thereby.

Like this, with the storage system 4000, upon backing up data of a volume that uses the thin provisioning function in the first storage sub system 4100, an allocation bitmap is created from information for specifying the data position in the volume allocated with a data area, this allocation bitmap is transmitted to the backup server 4700, this is stored in the data area table 4711 of the backup server 4700, and the allocation bitmap is managed by associating it with the tape device 3800 of the backup destination with the backup server 4700.

And, with the storage system 4000, upon restoring backup data, the backup server 3700 checks the stored allocation bitmap and transmits the [allocation bitmap] to the first storage sub system 4100 only regarding sections allocated with a data area at the time of backup. And, the CPU 4111 of the first controller 4110 allocates a data area only to sections allocated with a data area at the time of backup, and writes data in the restoration destination volume.

As a result, with the storage system 4000, it is possible to effectively prevent the allocation of an unnecessary data area to the backup destination volume and the wasteful consumption of the data area, and, as a result, the data area can be efficiently allocated to the restoration destination volume.

(5) Fifth Embodiment (5-1) Configuration of Storage System in Fifth Embodiment

Figure 27:
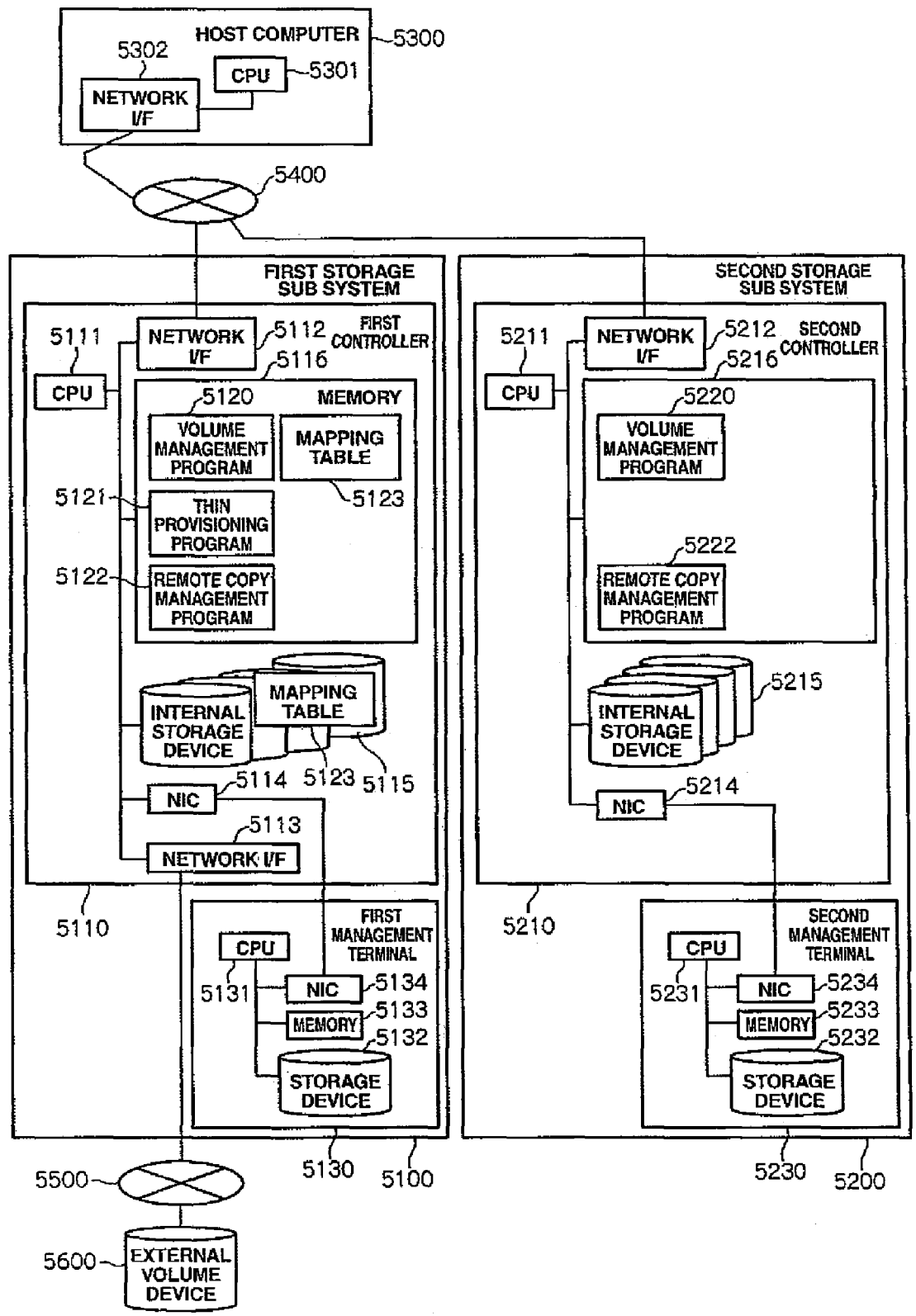
FIG. 27 is a diagram showing the overall configuration in the fifth embodiment.

FIG. 27 is a diagram showing the configuration of the storage system applying this invention in the fifth embodiment. The storage system 5000 according to this embodiment is configured by a first storage sub system 5100, a second storage sub system 5200 and a host computer 5300 being connected via a network 5400 such as a SAN.

Incidentally, in this embodiment, although a configuration is illustrated where the first storage sub system 5100, second storage sub system 5200 and host computer 5300 are connected via the same network 5400, in addition to this configuration, the network between the first storage sub system 5100 and host computer 5300, and the network between the first storage sub system 5100 and second storage sub system 5200 may be separated.

Here, a storage sub system is a system that consolidates a plurality of hard disk drives or the like, manages these hard disk drives or the like with a RAID or JBOD configuration, and provides these as a logical storage area to a host computer. Incidentally, this logical storage area is referred to as a volume.

The first storage sub system 5100 is configured from a first controller 5110 and a first management terminal 5130, and is capable of performing maintenance operations such as creating volumes and setting various functions with the first management terminal 5130. Further, the host computer 5300 may also be used to set the various functions.

Further, the first storage sub system 5100 is connected to an external volume device 5600 via a prescribed network 5500.

The first controller 5110 is configured from one or more CPUs 5111 for controlling the overall first controller 5110, a network I/F 5112 for connecting to the network 5400, a network I/F 5113 for connecting to the network 5500, an NIC 5114 for connecting to the first management terminal 5130, an internal storage device 5115 formed from a plurality of hard disk drives or the like storing various types of configuration information or programs of the first controller 5110 as well as data transmitted from the host computer 5300, and a memory 5116 for expanding such various types of configuration information or programs.

The internal storage device 5115 stores a mapping table 5123. Incidentally, although the mapping table 5123 is stored in the internal storage device 5115, as described below, it may also be temporarily stored in the memory 5116 to seek the improvement the performance of the internal storage device 5115 in performing referrals and updates.

Expanded in the memory 5116 are a volume management program 5120, a thin provisioning program 5121, a remote copy management program 5122, and a mapping table 5123. The volume management program 5120, thin provisioning program 5121, and remote copy management program 5122 are programs to be executed with the CPU 5111.

The first management terminal 5130 is configured from one or more CPUs 5131 for controlling the overall first management terminal 5130, a storage device 5132 storing various types of information and programs of the first controller 5110, a memory 5133 for expanding various types of configuration information and programs, and an NIC 5134 for connecting to the first controller 5110.

Meanwhile, the second storage sub system 5200 is configured from a second controller 5210 and a second management terminal 5230, and is capable of performing maintenance operations such as creating volumes and setting various functions with the second management terminal 5230.

The second controller 5210 is configured the same as the first controller 5110 other than that it is not provided with a network I/F for connecting to the network 5500, and that a thin provisioning program and a mapping table are not expanded (provided) in the memory 5116, and is configured from a CPU 5211, a network I/F 5212, an NIC 5214, an internal storage device 5215 and a memory 5216.

Expanded in the memory 5216 are a volume management program 5220 and a remote copy management program 5221. The volume management program 5220 and remote copy management program 5221 are programs to be executed with the CPU 5211.

The second management terminal 5230 is configured the same as the first management terminal 5130, and is configured from a CPU 5231, a storage device 5232, a memory 5233 and an NIC 5234.

Meanwhile, the host computer 5300 is a computer device having a CPU 5301 and a network I/F 5302 for connecting to the network 5400, and, for instance, is configured from a server having UNIX (registered trademark) or Windows (registered trademark) as its OS. Further, the host computer 5300 also has an information processing resource such as a memory. Moreover, the host computer 5300 is connected to a personal computer or workstation as an information I/O device via a network.

In this case, management of the volume of the first storage sub system 5100 is conducted by the volume management program 5120 stored in the memory 5116 of the storage controller 5110 being executed by the CPU 5111.

The first storage sub system 5100 handles the external volume device 5600 the same as the internal storage device 5115, and may also be a storage device configuring a volume to be provided to the host computer 5300. Further, the first storage sub system 5100, without possessing the internal storage device 5115, may provide a volume to the host computer 5300 with only the external volume device 5600. Incidentally, the external volume device 5600 may also be a volume provided by another storage sub system.

The first storage sub system 5100, upon providing a volume, has a thin provisioning function which is a function for dynamically allocating a data area regarding a storage area in which a write request was given by the host computer 5300. A data area referred to herein indicates a specific area of a physical device (hard disk drive, etc.) of the internal storage device 5115 and external volume device 5600.

The thin provisioning function is operated in coordination with the volume management program 5120 and thin provisioning program 5121 stored in the memory 5116 being executed by the CPU 5111. Further, the thin provisioning program 5121 operates based on the information stored in the mapping table 5123.

Although the second storage sub system 5200 is explained here as a storage sub system that does not have a thin provisioning function, it may also be a storage sub system having a thin provisioning function as with the first storage sub system 5100.

The first storage sub system 5100 and second storage sub system 5200 mutually have a remote copy function. A remote copy function is a function of designating volumes of different storage sub systems, and with these respectively as a replication source and a replication destination, transferring the data in the volume of the replication source to the volume of the replication destination so as to replicate such volume.

Here, when the volume of the first storage sub system 5100 is made to be the replication source and the volume of the second storage sub system 5200 is made to be the replication destination, data of the replication source volume is transmitted to the replication destination volume by the remote copy management program 5122 being executed by the CPU 5111.

Contrarily, when the volume of the second storage sub system 5200 is made to be the replication source and the volume of the first storage sub system 5100 is made to be the replication destination, data of the replication source volume is transmitted to the replication destination volume by the remote copy management program 5222 being executed by the CPU 5211.

Incidentally, when the volume of the first storage sub system 5100 is made to be the replication source and the volume of the second storage sub system 5200 is made to be the replication destination, the volume of the first storage sub system 5100 is referred to as a backup source volume, and the volume of the second storage sub system 5200 is referred to as a backup destination volume, and this replication processing is referred to as backup.

Incidentally, backup means to replicate a volume by transmitting data in a volume of a storage sub system at an arbitrary time to a volume of another storage sub system.

Further, after performing backup, when the volume of the second storage sub system 5200 is made to be the replication source and the volume of the first storage sub system 5100 is made to be the replication destination, the volume of the second storage sub system 5200 is referred to a restoration source volume, and the volume of the first storage sub system 5100 is referred to as a restoration destination volume, and this replication processing is referred to as restoration.

Incidentally, restoration means to restore the volume of a certain storage sub system to a point in time when such volume was backed up by returning the data backed up in the volume of another storage sub system to the volume of a certain sub system in the event of a disaster such as the loss of data in the storage sub system.

Figure 28:
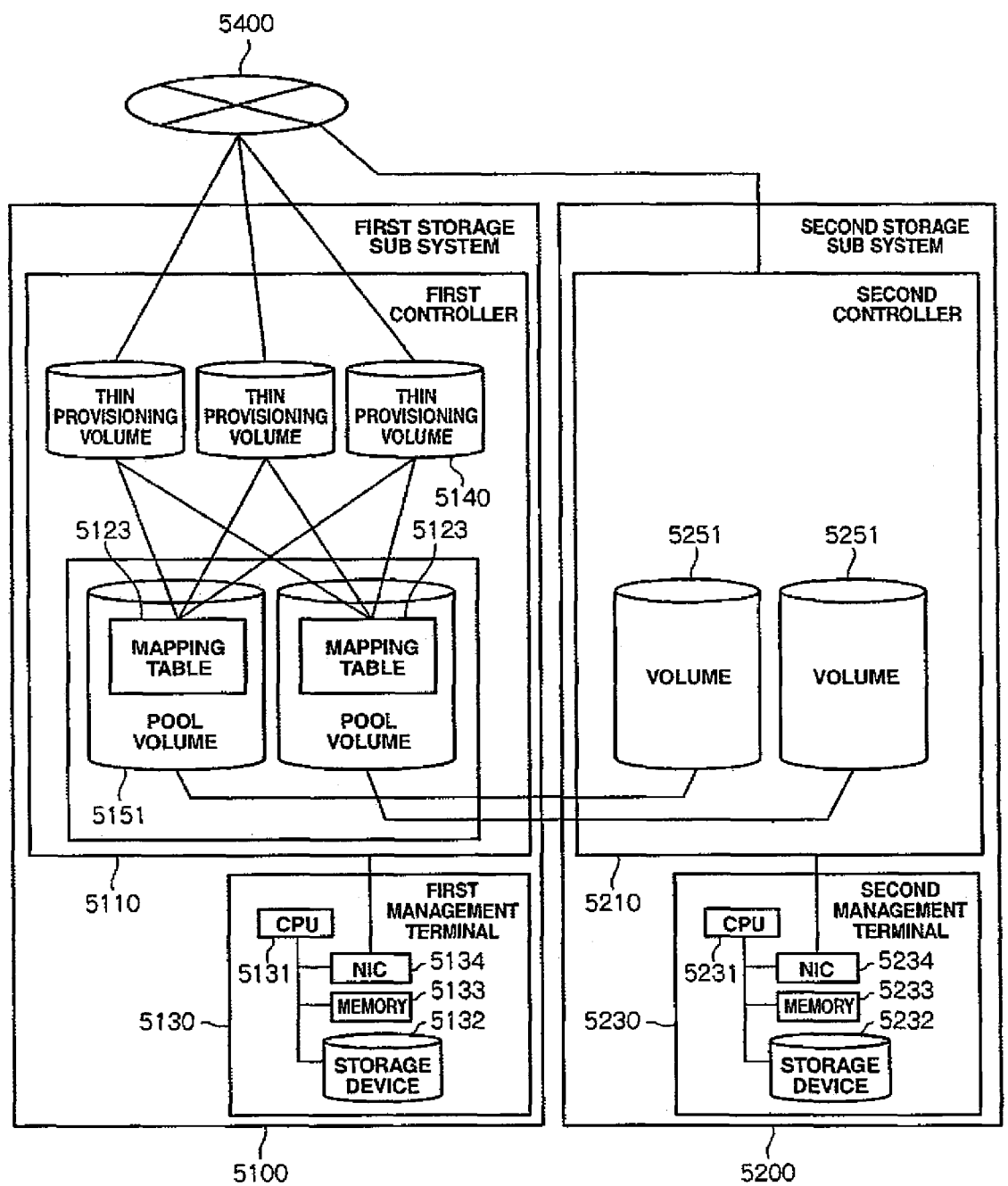
FIG. 28 is a diagram showing the volume configuration in the fifth embodiment.

FIG. 28 shows the system configuration regarding the logical volumes of the first storage sub system 5100 and second storage sub system 5200.

The first storage sub system 5100 has one or more thin provisioning volumes 5140 which are volumes that use the thin provisioning function. The thin provisioning volume 5140, upon receiving a write request from the host computer 5300, allocates a part of the data area in a pool group 5150 to an area in which [data] was written in the thin provisioning volume 5140.

The pool group 5140 is able to set a volume that does not use an arbitrary thin provisioning function as a pool volume 5151, and use a partial area thereof as the data area to be allocated to the thin provisioning volume 5140.

Here, the pool volume 5151 stores a mapping table 5123 together with the data to be allocated to the thin provisioning volume 5140. Incidentally, the mapping table 5123 is a table for recording the correspondence of the arbitrary area of the thin provisioning volume 5140 and the pool volume 5151 allocated to the thin provisioning volume 5140.

The storage sub system 5200 has a volume 5251 having a size that can be replicated with the pool volume 5151. If a plurality of pool volumes 5151 exist in the pool group 5150, volumes 5251 in the same number of pool volumes 5151 and the same size as the individual pool volumes 5151 are required.

With this storage system 5000, as a result of backing up the pool volume 5151 in the pool group 5150, the thin provisioning volumes 5140 using the same pool group 5150 for the allocation of data areas are collectively backed up, and restoration is performed with the backup data thereof.

(5-2) Backup and Restoration Control Method in Fifth Embodiment

The method of performing backup from the first storage sub system 5100 to the second storage sub system 5200 in this embodiment is now explained.

With this storage system 5000, based on the remote copy function, the remote copy management program 5122 is operated in the storage sub system 5100, and the remote copy management program 5222 is operated in the second storage sub system 5200.

The CPU 5111 of the first controller 5110, upon performing backup, performs copy processing from the pool volume 5151 of the backup source to the backup destination volume 5251 via the network 5400 with the remote copy management program 5122.

Here, since the CPU 5111 of the first controller 5110 replicates the mapping table 5123 of all pool volumes 5151 in the pool group 5150 in the backup destination volume 5251 together with the data area, information of the data used by the thin provisioning volume 5140 will not be lost. Like this, the CPU 5111 of the first controller 5110 replicates the data to be backed up.

Next, the method of performing restoration from the second storage sub system 5200 to the first storage sub system 5100 in this embodiment is explained.

The CPU 5211 of the second controller 5210, upon performing restoration, performs copy processing from the restoration source volume 5251 to the pool volume 5151 of the backup source via the network 5400 with the remote copy management program 5222.

Here, the CPU 5211 of the second controller 5210 replicates the mapping table 5123 of the restoration source volume 5241 in the pool volume 5151 together with the data area. Since the restoration [source] volume 5251 includes all information used by the thin provisioning volume 5140 at the time of backup, it is possible to restore the thin provisioning volume 5140 at the time of backup.

Incidentally, this embodiment may be used in an application wherein, by using a storage sub system capable of using the thin provisioning function in the second storage sub system 5200, and making the backup destination volume 5251 a pool group having the same configuration as the pool group 5150, the system can be transferred to the second storage sub system 5200 so as to continue business when a disaster occurs in the first storage sub system 5100.

Like this, with the storage system 5000, the mapping table 5123 showing the allocated sections storing data is stored together with the data to be backed up in the pool volume 5151, and the mapping table 5123 of all pool volumes 5151 in the pool group 5150 is replicated together with the data to be backed up in the backup destination volume 5251.

As a result, with the storage system 5000, upon restoring backup data, it is possible to effectively prevent the allocation of an unnecessary data area to the restoration destination volume and the wasteful consumption of the data area, and, as a result, the data area can be efficiently allocated to the restoration destination volume.

(6) Sixth Embodiment (6-1) Configuration of Storage System in Sixth Embodiment

Figure 29:
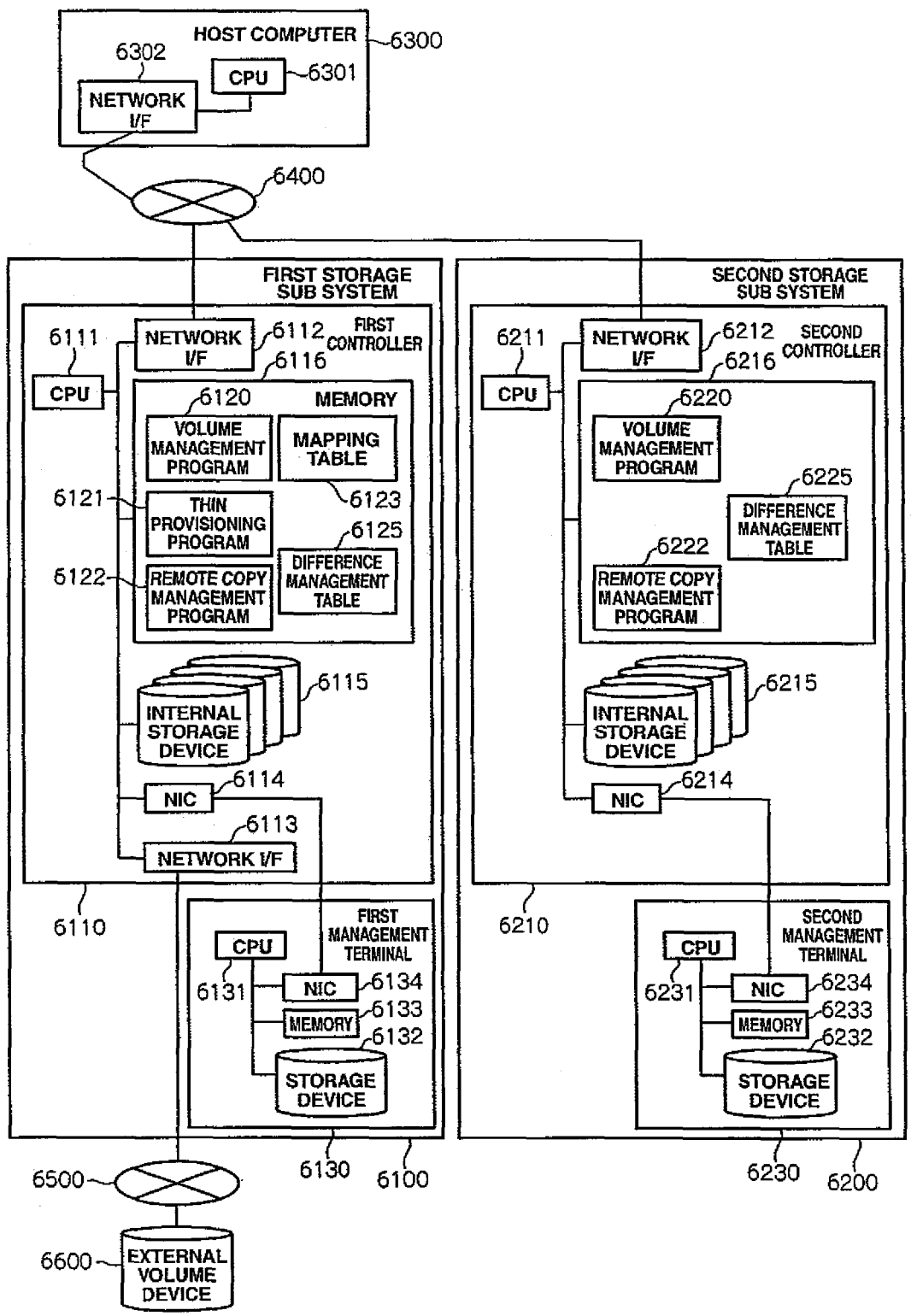
FIG. 29 is a diagram showing the overall configuration in the sixth embodiment.

FIG. 29 is a diagram showing the configuration of the storage system applying this invention in the sixth embodiment. The storage system 6000 according to this embodiment is configured by a first storage sub system 6100, a second storage sub system 6200 and a host computer 6300 being connected via a network 6400 such as a SAN.

Incidentally, in this embodiment, although a configuration is illustrated where the first storage sub system 6100, second storage sub system 6200 and host computer 6300 are connected via the same network 6400, in addition to this configuration, the network between the first storage sub system 6100 and host computer 6300, and the network between the first storage sub system 6100 and second storage sub system 6200 may be separated.

Here, a storage sub system is a system that consolidates a plurality of hard disk drives or the like, manages these hard disk drives or the like with a RAID or JBOD configuration, and provides these as a logical storage area to a host computer. Incidentally, this logical storage area is referred to as a volume.

The first storage sub system 6100 is configured from a first controller 6110 and a first management terminal 6130, and is capable of performing maintenance operations such as creating volumes and setting various functions with the first management terminal 6130. Further, the host computer 6300 may also be used to set the various functions.

Further, the first storage sub system 6100 is connected to an external volume device 6600 via a prescribed network 6500.

The first controller 6110 is configured from one or more CPUs 6111 for controlling the overall first controller 6110, a network I/F 6112 for connecting to the network 6400, a network I/F 6113 for connecting to the network 6500, an NIC 6114 for connecting to the first management terminal 6130, an internal storage device 6115 formed from a plurality of hard disk drives or the like storing various types of configuration information or programs of the first controller 6110 as well as data transmitted from the host computer 6300, and a memory 6116 for expanding such various types of configuration information or programs.

Expanded in the memory 6116 are a volume management program 6120, a thin provisioning program 6121, a remote copy management program 6122, a mapping table 6123 and a difference management table 6125. The volume management program 6120, thin provisioning program 6121, and remote copy management program 6122 are programs to be executed with the CPU 6111.

The first management terminal 6130 is configured from one or more CPUs 6131 for controlling the overall first management terminal 6130, a storage device 6132 storing various types of information and programs of the first controller 6110, a memory 6133 for expanding various types of configuration information and programs, and an NIC 6134 for connecting to the first controller 6110.

Meanwhile, the second storage sub system 6200 is configured from a second controller 6210 and a second management terminal 6230, and is capable of performing maintenance operations such as creating volumes and setting various functions with the second management terminal 6230.

The second controller 6210 is configured the same as the first controller 6110 other than that it is not provided with a network I/F for connecting to the network 6500, and that a thin provisioning program and a mapping table are not expanded (provided) in the memory 6116, and is configured from a CPU 6211, a network I/F 6212, an NIC 6214, an internal storage device 6215 and a memory 6216.

Expanded in the memory 6216 are a volume management program 6220, a remote copy management program 6221 and a difference management table 6225. The volume management program 6220 and remote copy management program 6221 are programs to be executed with the CPU 6211.

The second management terminal 6230 is configured the same as the first management terminal 6130, and is configured from a CPU 6231, a storage device 6232, a memory 6233 and an NIC 6234.

Meanwhile, the host computer 6300 is a computer device having a CPU 6301 and a network I/F 6302 for connecting to the network 6400, and, for instance, is configured from a server having UNIX (registered trademark) or Windows (registered trademark) as its OS. Further, the host computer 6300 also has an information processing resource such as a memory. Moreover, the host computer 6300 is connected to a personal computer or workstation as an information I/O device via a network.

In this case, management of the volume of the first storage sub system 6100 is conducted by the volume management program 6120 stored in the memory 6116 of the storage controller 6110 being executed by the CPU 6111.

The first storage sub system 6100 handles the external volume device 6600 the same as the internal storage device 6115, and may also be a storage device configuring a volume to be provided to the host computer 6300. Further, the first storage sub system 6100, without possessing the internal storage device 6115, may provide a volume to the host computer 6300 with only the external volume device 6600. Incidentally, the external volume device 6600 may also be a volume provided by another storage sub system.

The first storage sub system 6100, upon providing a volume, has a thin provisioning function which is a function for dynamically allocating a data area regarding a storage area in which a write request was given by the host computer 6300. A data area referred to herein indicates a specific area of a physical device (hard disk drive, etc.) of the internal storage device 6115 and external volume device 6600.

The thin provisioning function is operated in coordination with the volume management program 6120 and thin provisioning program 6121 stored in the memory 6116 being executed by the CPU 6111. Further, the thin provisioning program 6121 operates based on the information stored in the mapping table 6123.

With this thin provisioning function, upon receiving a write request from the host computer 6300, the thin provisioning program 6121 refers to the mapping table 6123, and, when it is detected that the allocation of a data area to the data to be written has not yet been performed, allocation of the data area is performed, and the correspondence of the section that received the write request and the allocated data area is stored in the mapping table 6123.

Further, with the thin provisioning function, upon receiving a write request from the host computer 6300, the thin provisioning program 6121 refers to the mapping table 6123, and, when it is detected that the allocation of a data area to the data to be written has been performed, the data area allocated in correspondence with the section that received the write request is specified with the information stored in the mapping table 6123, and data is written in this data area.

Moreover, with the thin provisioning function, upon receiving a read request from the host computer 6300, the thin provisioning program 6121 refers to the mapping table 6123, and, when it is detected that the allocation of a data area to the data to be read has not been performed, a predetermined pattern such as "0" is transmitted to the host computer 6300.

Moreover, with the thin provisioning function, upon receiving a read request from the host computer 6300, the thin provisioning program 6121 refers to the mapping table 6123, and, when it is detected that the allocation of a data area to the data to be read has been performed, the data area allocated in correspondence with the section that received the read request is specified with the information stored in the mapping table 6123, and the data to be read stored in the data area is transmitted to the host computer 6300.

The second storage sub system 6200 is a storage sub system that does not have a thin provisioning function, or has a thin provisioning function but the function thereof is not operating, or has a thin provisioning function but is not able to link the first storage sub system 6100 and the thin provisioning function.

Incidentally, although this embodiment can be employed even in a case where the second storage sub system 6200 has a thin provisioning function, in such a case, it is desirable to use a method other than this embodiment.

The first storage sub system 6100 and second storage sub system 6200 mutually have a remote copy function. A remote copy function is a function of designating volumes of different storage sub systems, and, with these respectively as a replication source and a replication destination, transferring the data in the volume of the replication source to the volume of the replication destination so as to replicate such volume.

Here, when the volume of the first storage sub system 6100 is made to be the replication source and the volume of the second storage sub system 6200 is made to be the replication destination, data of the replication source volume is transmitted to the replication destination volume by the remote copy management program 6122 being executed by the CPU 6111.

Contrarily, when the volume of the second storage sub system 6200 is made to be the replication source and the volume of the first storage sub system 6100 is made to be the replication destination, data of the replication source volume is transmitted to the replication destination volume by the remote copy management program 6222 being executed by the CPU 6211.

Incidentally, when the volume of the first storage sub system 6100 is made to be the replication source and the volume of the second storage sub system 6200 is made to be the replication destination, the volume of the first storage sub system 6100 is referred to as a backup source volume, and the volume of the second storage sub system 6200 is referred to as a backup destination volume, and this replication processing is referred to as backup.

Incidentally, backup means to replicate a volume by transmitting data in a volume of a storage sub system at an arbitrary time to a volume of another storage sub system.

Further, after performing backup, when the volume of the second storage sub system 6200 is made to be the replication source and the volume of the first storage sub system 6100 is made to be the replication destination, the volume of the second storage sub system 6200 is referred to a restoration source volume, and the volume of the first storage sub system 6100 is referred to as a restoration destination volume, and this replication processing is referred to as restoration.

Incidentally, restoration means to restore the volume of a certain storage sub system to a point in time when such volume was backed up by returning the data backed up in the volume of another storage sub system to the volume of a certain sub system in the event of a disaster such as the loss of data in the storage sub system.

In the remote copy function, after completing the copy from the volume of the first storage sub system 6100 of the backup source to the volume of the second storage sub system 6200 of the backup destination, there is a function of migrating the data of the two to an asynchronous mode. This function is referred to as "split".

In this case, the CPU 6111 of the first controller 6110, after performing the split, stores the update of the target data position in the difference management table 6125 when a write request is issued to the first storage sub system 6100.

Further, the CPU 6211 of the second controller 6210, after performing the split, stores the update of the target data position in the difference management table 6225 when a write request is issued to the storage sub system 6200.

Further, the storage system 6000 also has a difference restoration function of efficiently performing restoration, without transferring data of the overall volume, by transferring data only regarding sections that were changed based on the difference management table 6214 upon restoring the backup data.

(6-2) Backup and Restoration Control Method in Sixth Embodiment

The method of performing backup from the first storage sub system 6100 to the second storage sub system 6200 in this embodiment is now explained.

With this storage system 6000, the volume of the second storage sub system 6200 is backed up with a remote copy function based on the volume using the thin provisioning function of the first storage sub system 6100.

The backup performed with the remote copy function between the volume using the thin provisioning function of the first storage sub system 6100 and the volume of the second storage sub system 6200 is implemented, in the first storage sub system 6100, by the volume management program 6120, remote copy management program 6122 and thin provisioning program 6121 being executed by the CPU 6111.

Meanwhile, in the second storage sub system 6200, [such backup] is implemented by the volume management program 6220 and remote copy management program 6222 being executed by the CPU 6211.

Among the above, the volume management program 6120 and volume management program 6220 manage whether the target volume uses the thin provisioning function. Further, the remote copy management program 6122 and remote copy management program 6222 perform backup from the backup source volume to the backup destination volume via the network 6400.

This backup is started after a backup request is issued from the host computer 6300 or the first management terminal 6130 of the first storage sub system 6100 to the first controller 6110, the backup request is transferred to the second controller 6210 of the second storage sub system 6200 via the network 6400, and the backup request is received by the second controller 6210.

This backup request may also be issued from the host computer 6300 or second management terminal 6220 to the second controller 6210. In this case, the backup is started after the backup request is transferred from the storage controller 6210 of the second storage sub system 6200 to the storage controller 6110 of the first storage sub system 6100 via the network 6400, and the backup request is received by the first controller 6110.

With the remote copy function, although backup is basically performed by the remote copy management program 6122 transmitting the overall target volume data, if the backup source volume is a volume using the thin provisioning function, it transmits data of the backup source volume not allocated with a data area.

Incidentally, with the remote copy function, instead of performing backup processing, a request may be issued for initializing the target volume in the second storage sub system 6200. Nevertheless, in this case, if the volume uses the thin provisioning function, it is necessary that the data of the backup source volume when the first storage sub system 6100 was not allocated with a data area, and the data of the second storage sub system 6200 after initialization must coincide.

The remote copy management program 6122 activates a function of splitting the remote copy function status after the data transmission, and storing sections in which the volume was changed in the difference management table 6125 and difference management table 6225

The thin provisioning program 6121, after the split, specifies a data area allocated with a data area of the backup source volume based on the mapping table 6123, and writes the data stored in the data area corresponding to the data area in the area that is the same as the data area of the backup destination.

As a result, with the storage system 6000, the first storage sub system 6100 stores information regarding sections allocated with a data area in the difference management table 6225.

The method of restoring data backed up in this embodiment from the second storage sub system 6200 to the first storage sub system 6100 is now explained.

When a volume failure of the first storage sub system 6100 occurs, the host computer 6300, storage management terminal 6120 and storage management terminal 6220 request difference restoration processing of copying the updated data of the backup destination volume to the backup source volume.

Here, when the volume management program 6120 detects that the restoration destination is a volume using the thin provisioning function of the first storage sub system 6100, it requests the thin provisioning program 6121 to release all data areas allocated to the restoration destination volume. The thin provisioning program 6121 that received the release request releases all areas allocated to the target volume.

The remote copy management program 6222, after the release of data areas, transmits the difference data to the first storage sub system 6100. With the first storage sub system 6100 that received the data, since the target volume is using the thin provisioning function, as with normal writing processing, a data area is allocated only to sections to which data was transmitted, and data is stored therein.

Like this, by restoring the allocation of data areas and data stored in the allocated data area with the storage system 6000, it is possible to restore the target volume data of the first controller 6110, as well as restore the data area allocated to the target volume before backup.

Figure 30:
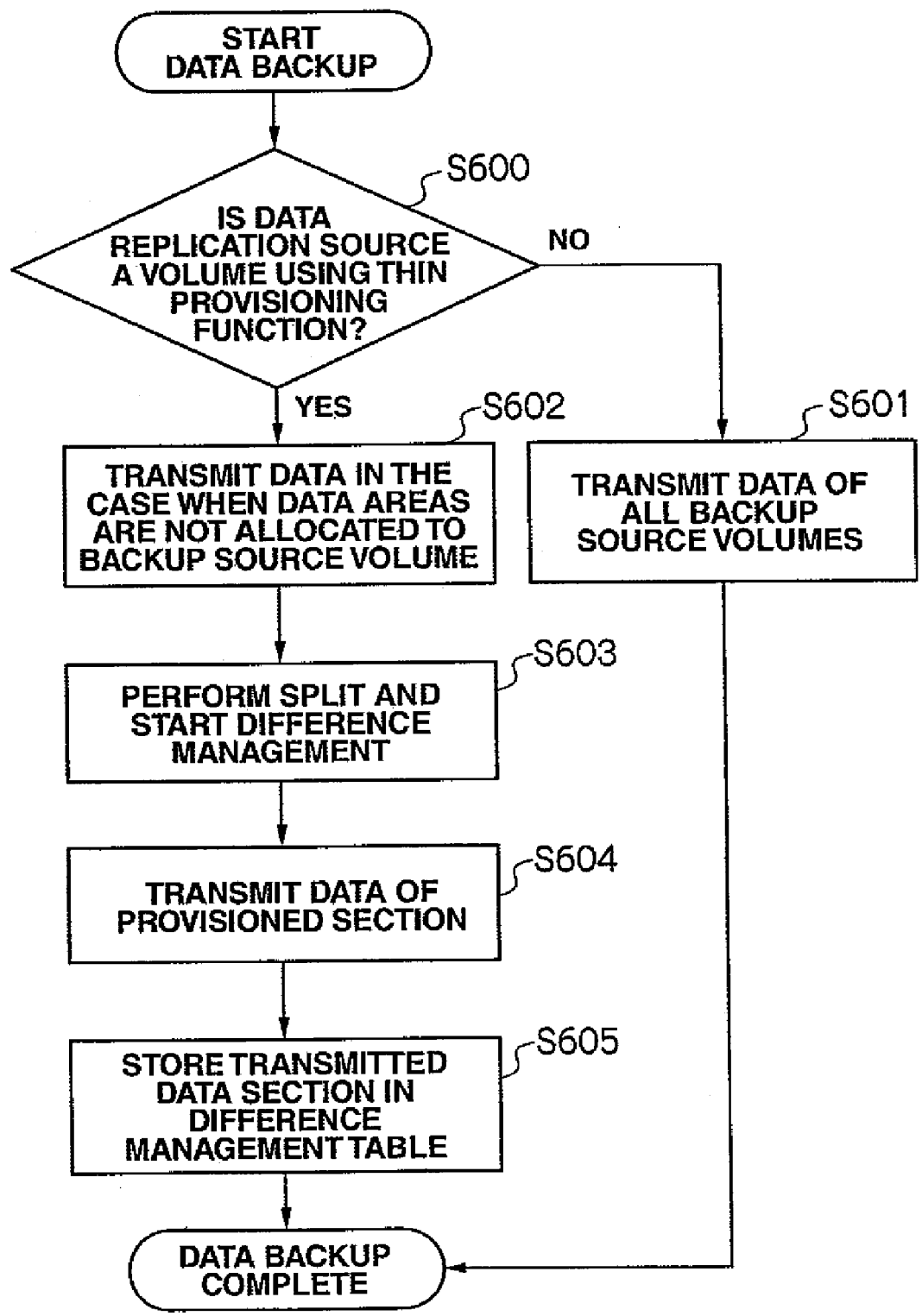
FIG. 30 is a flowchart showing the operation of the overall system of backup processing the sixth embodiment.

FIG. 30 is a flowchart showing the schematic operation of the coordinated control method of the volume management program 6120, thin provisioning program 6121 and remote copy management program 6122 in the first storage controller 6110 as the backup, which is the transmission source of data, upon performing backup with the remote copy function.

Foremost, the CPU 6111 of the first controller 6110, at step S600, calls the volume management program 6120 to check whether the backup source volume is a volume that uses the thin provisioning function.

As a result of checking whether it is a volume that uses the thin provisioning function, if it becomes clear that it is a volume that does not use the thin provisioning function, the CPU 6111 of the first controller 6110 proceeds to step S601 for transferring data of all areas in the target volume to the backup destination volume. Incidentally, this transfer processing is performed based on the remote copy management program 6122.

Meanwhile, as a result of checking whether it is a volume that uses the thin provisioning function, if it becomes clear that it is a volume that does use the thin provisioning function, the CPU 6111 of the first controller 6110 proceeds to step S602, and notifies the thin provisioning program 6121 that the remote copy management program 6122 will execute a remote copy.

The CPU 6111 of the first controller 6110 handles a [volume] as not being allocated with a data area upon reading data of the backup source volume based on the thin provisioning program 6118 that received the notification The CPU 6111 of the first controller 6110, after the completion of data transfer of the overall volume, proceeds to step S603 after the thin provisioning program 6118 once again notifies such completion to the thin provisioning program 6118.

The CPU 6111 of the first controller 6110, at step S603, provides a notification that it will perform a split to the remote copy management program 6222 with the remote copy management program 6122.

Thereafter, when the CPU 6211 of the second controller 6210 receives a write request for writing in the backup destination volume, the remote copy management program 6222 records the occurrence of an update in the difference management table 6225. Further, when the CPU 6111 of the first controller 6110 receives a write request for writing in the backup source volume, the remote copy management program 6122 records the occurrence of an update in the difference management table 6125. After the completion of split, the routine proceeds to step S604.

The CPU 6111 of the first controller 6110, at step S604, since the data of the backup source volume is not yet transmitted, transmits this to the backup destination volume. The CPU 6111 of the first controller 6110, in order to make this transmission, requests the thin provisioning program 6121 to specify sections allocated with a data area and the allocated data area.

The CPU 6111 of the first controller 6110, upon receiving this, refers to the mapping table 6123 with the thin provisioning program 6121, and performs specification processing of sections allocated with a data area and [allocated] data area.

And, the CPU 6111 of the first controller 6110 requests the writing of data of the data area in second storage sub system 6200 with the remote copy management program 6122, and then proceeds to step S605.

The CPU 6211 of the second controller 6210, at step S605, stores the occurrence of an update in the sections written with the remote copy management program 6222 that received the data writing request in the difference management table 6225. Here, a section where an update occurred corresponds to a section allocated with a data area in the first storage sub system 6100. Backup is completed pursuant to the completion of this processing.

Figure 31:
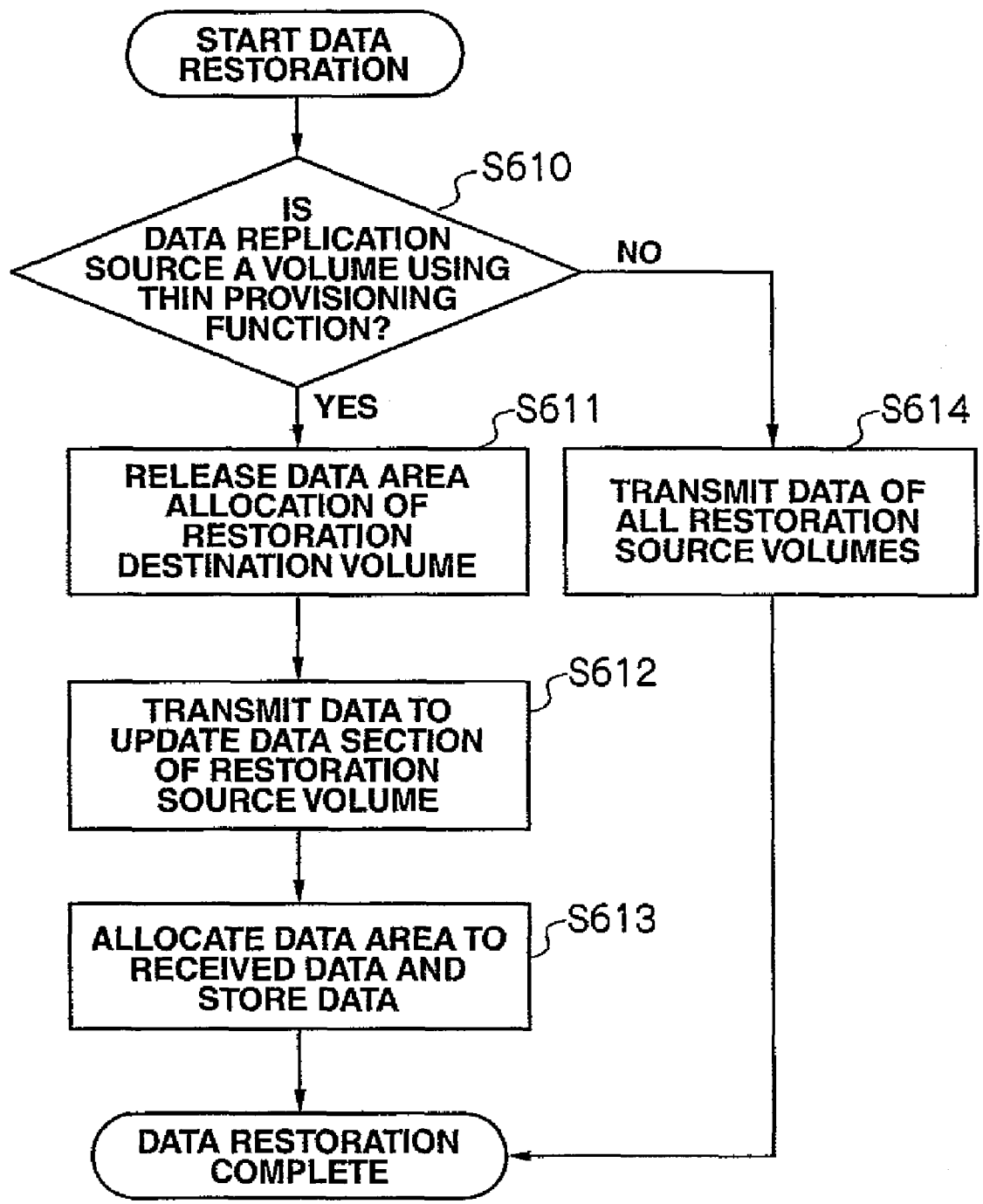
FIG. 31 is a flowchart showing the operation of the overall system of restoration processing the sixth embodiment.

FIG. 31 is a flowchart showing the schematic operation of the restoration control method from backup data using the remote copy function.

Foremost, the CPU 6211 of the second controller 6210, at step S610, calls the volume management program 6120 to check whether the restoration destination volume is a volume that uses the thin provisioning function.

As a result of checking whether it is a volume that uses the thin provisioning function at step S610, if it becomes clear that it is a volume that does not use the thin provisioning function, the CPU 6211 of the second controller 6210 proceeds to step S614 for transferring data of all areas in the restoration source volume to the restoration destination volume. This transfer processing is performed based on the remote copy management program 6219.

The CPU 6211 of the second controller 6210, at step S614, transfers data to the first storage sub system 6100 with the same processing as normal restoration with the remote copy management program 6219.

Meanwhile, as a result of checking whether it is a volume that uses the thin provisioning function at S610, if it becomes clear that it is a volume that does use the thin provisioning function, the CPU 6211 of the second controller 6210 proceeds to step S611 for copying data only for sections allocated with a data area at the time of backup.

The CPU 6211 of the second controller 6210, at step S611, as preparation for restoration of data, requests the thin provisioning program 6121 to release the data areas allocated to the restoration destination volume with the remote copy management program 6222. The CPU 6211 of the second controller 6210, after releasing the allocation of data areas, proceeds to step S612 which is the difference restoration processing.

The CPU 6211 of the second controller 6210, at step S612, refers to the difference management table 6225 with the remote copy management program 6222, transfers data regarding sections that were updated, and then proceeds to step S613 which is reception processing in the first storage sub system 6100 pursuant to the transmission processing.

The CPU 6111 of the first controller 6110, at step S613, receives data transmitted from the remote copy management program 6222. The CPU 6111 of the first controller 6110, in this reception processing, stores data accompanying the allocation of data areas as equivalent to a case where data has been written. Restoration processing is completed pursuant to the completion of this processing.

Like this, with the storage system 6000, data is read from the backup source volume to the backup destination volume as those with no allocation of a data area, and, after the split is completed, records the occurrence of an update with the difference management table 6125, transmits data of sections allocated with a data area and the allocated data area to the second storage sub system 6200, and records the sections allocated with a data area in the difference management table 6225.

And, with the storage system 6000, upon restoring the backup data, the difference management table 6225 recorded in the second storage sub system 6200 is referred to, data regarding updated sections is transferred, and data accompanying the allocation of data areas is stored.

As a result, with the storage system 6000, upon restoring backup data, it is possible to effectively prevent the allocation of an unnecessary data area to the restoration destination volume and the wasteful consumption of the data area, and, as a result, the data area can be efficiently allocated to the restoration destination volume.

Figure 32:
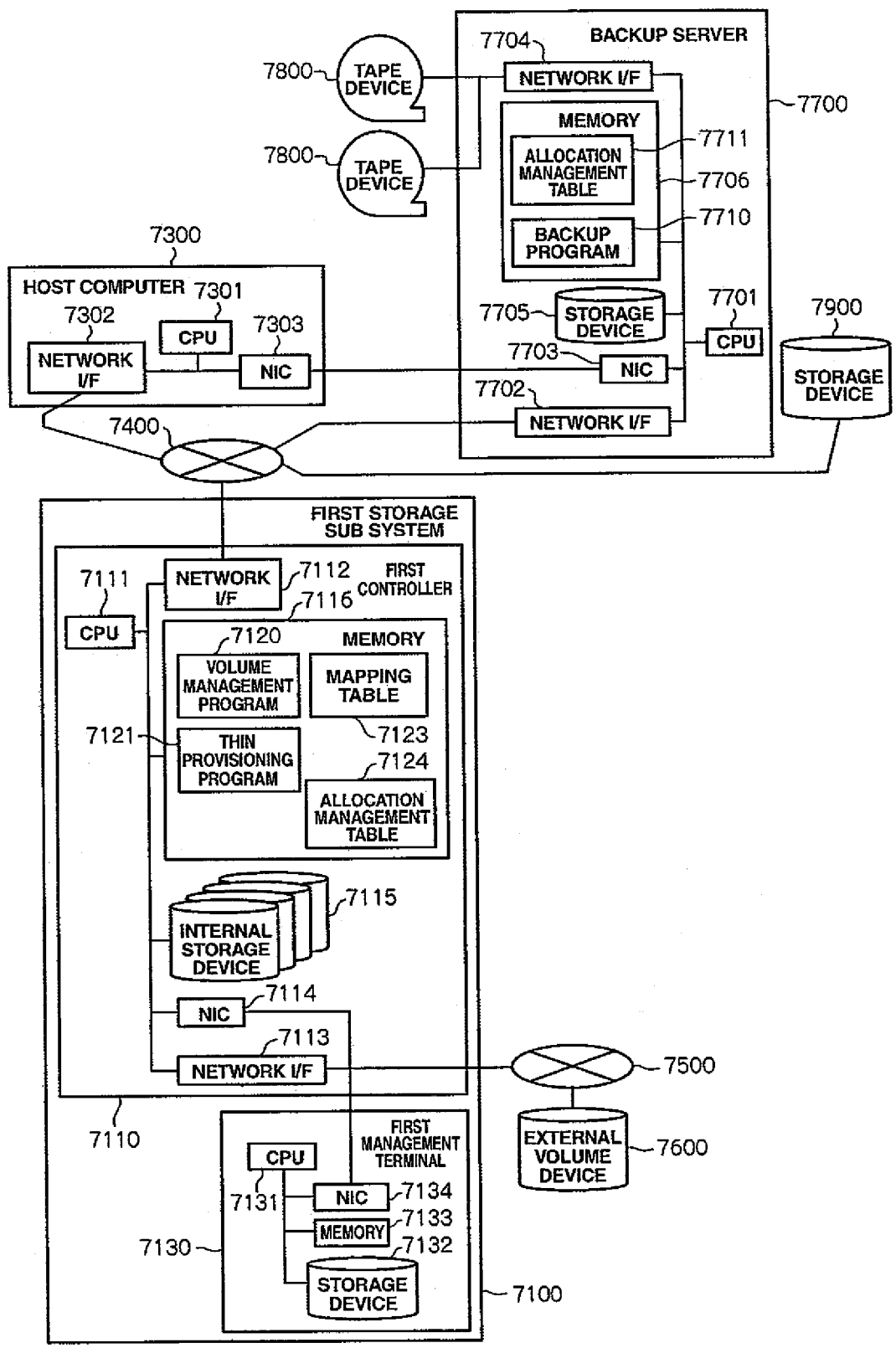
FIG. 32 is a diagram showing the overall configuration in the seventh embodiment.

(7) Seventh Embodiment (7-1) Configuration of Storage System in Seventh Embodiment FIG. 32 is a diagram showing the configuration of the storage system applying this invention in the seventh embodiment. The storage system 7000 according to this embodiment is configured by a first storage sub system 7100, a backup server 7700, a storage device 7900, and a host computer 7300 being connected via a network 7400 such as a SAN.

Incidentally, in this embodiment, although a configuration is illustrated where the first storage sub system 7100, backup server 7700, storage device 7900, and host computer 7300 are connected via the same network 7400, in addition to this configuration, the network between the first storage sub system 7100 and host computer 7300, and the network of the first storage sub system 7100, backup server 7700, and storage device 7900 may be separated.

Here, a storage sub system is a system that consolidates a plurality of hard disk drives or the like, manages these hard disk drives or the like with a RAID or JBOD configuration, and provides these as a logical storage area to a host computer. Incidentally, this logical storage area is referred to as a volume.

The first storage sub system 7100 is configured from a first controller 7110 and a first management terminal 7130, and is capable of performing maintenance operations such as creating volumes and setting various functions with the first management terminal 7130. Further, the host computer 7300 may also be used to set the various functions.

Further, the first storage sub system 7100 is connected to an external volume device 7600 via a prescribed network 7500.

The first controller 7110 is configured from one or more CPUs 7111 for controlling the overall first controller 7110, a network I/F 7112 for connecting to the network 7400, a network I/F 7113 for connecting to the network 7500, an NIC 7114 for connecting to the first management terminal 7130, an internal storage device 7115 formed from a plurality of hard disk drives or the like storing various types of configuration information or programs of the first controller 7110 as well as data transmitted from the host computer 7300, and a memory 7116 for expanding such various types of configuration information or programs.

Expanded in the memory 7116 are a volume management program 7120, a thin provisioning program 7121, and a mapping table 7123. The volume management program 7120 and thin provisioning program 7121 are programs to be executed with the CPU 7111.

The first management terminal 7130 is configured from one or more CPUs 7131 for controlling the overall first management terminal 7130, a storage device 7132 storing various types of information and programs of the first controller 7110, a memory 7133 for expanding various types of configuration information and programs, and an NIC 7134 for connecting to the first controller 7110.

Meanwhile, the backup server 7700 is configured from one or more CPUs 7701 for controlling the overall backup server 7700, a network I/F 7702 for connecting to the network 7400, an NIC 7703 for connecting to the host computer 7300, a network I/F 7704 for connecting to a tape device 7800, a storage device 7705 formed from a plurality of hard disk drives or the like storing various types of configuration information or programs of the backup server 7700 as well as data transmitted from the host computer 7300 and first storage sub system 7100, and a memory 7706 for expanding such various types of configuration information or programs.

Expanded in the memory 7706 are a backup program 7710 and a backup storage table 7711. This backup program 7710 is a program to be executed with the CPU 7701.

Meanwhile, the host computer 7300 is a computer device having a CPU 7301 and a network I/F 7302 for connecting to the network 7400, and, for instance, is configured from a server having UNIX (registered trademark) or Windows (registered trademark) as its OS. Further, the host computer 7300 also has an information processing resource such as a memory. Moreover, the host computer 7300 is connected to a personal computer or workstation as an information I/O device via a network.

In this case, management of the volume of the first storage sub system 7100 is conducted by the volume management program 7120 stored in the memory 7116 of the storage controller 7110 being executed by the CPU 7111.

The first storage sub system 7100 handles the external volume device 7600 the same as the internal storage device 7115, and may also be a storage device configuring a volume to be provided to the host computer 7300. Further, the first storage sub system 7100, without possessing the internal storage device 7115, may provide a volume to the host computer 7300 with only the external volume device 7600. Incidentally, the external volume device 7600 may also be a volume provided by another storage sub system.

The first storage sub system 7100, upon providing a volume, has a thin provisioning function which is a function for dynamically allocating a data area regarding a storage area in which a write request was given by the host computer 7300. A data area referred to herein indicates a specific area of a physical device (hard disk drive, etc.) of the internal storage device 7115 and external volume device 7600.

The thin provisioning function is operated in coordination with the volume management program 7120 and thin provisioning program 7121 stored in the memory 7116 being executed by the CPU 7111. Further, the thin provisioning program 7121 operates based on the information stored in the mapping table 7123.

With this thin provisioning function, upon receiving a write request from the host computer 7300, the thin provisioning program 7121 refers to the mapping table 7123, and, when it is detected that the allocation of a data area to the data to be written has not yet been performed, allocation of the data area is performed, and the correspondence of the section that received the write request and the allocated data area is stored in the mapping table 7123.

Further, with the thin provisioning function, upon receiving a write request from the host computer 7300, the thin provisioning program 7121 refers to the mapping table 7123, and, when it is detected that the allocation of a data area to the data to be written has been performed, the data area allocated in correspondence with the section that received the write request is specified with the information stored in the mapping table 7123, and data is written in this data area.

Moreover, with the thin provisioning function, upon receiving a read request from the host computer 7300, the thin provisioning program 7121 refers to the mapping table 7123, and, when it is detected that the allocation of a data area to the data to be read has not been performed, a predetermined pattern such as "0" is transmitted to the host computer 7300.

Moreover, with the thin provisioning function, upon receiving a read request from the host computer 7300, the thin provisioning program 7121 refers to the mapping table 7123, and, when it is detected that the allocation of a data area to the data to be read has been performed, the data area allocated in correspondence with the section that received the read request is specified with the information stored in the mapping table 7123, and the data to be read stored in the data area is transmitted to the host computer 7300.

When the host computer 7300 requests the acquisition of information regarding an arbitrary volume, the first storage sub system 7100 is able to respond by adding information to a reply message to such information acquisition request when it detects that the target volume is using the thin provisioning function in the volume management program 7120.

Incidentally, even if the first storage sub system 7100 is not able to return information that the thin provisioning function is being used to the host computer 7300, it will suffice so as long as the system administrator or management software of the first storage sub system 7100 that set the target volume transmits information that the thin provisioning function is being used to the backup server 7700.

When there is a backup request regarding an arbitrary volume from the host computer 7300, the first storage sub system 7100 has a function of separately ensuring a backup source data storage volume (this is hereinafter referred to as the "backup volume") for such volume when the volume management program 7120 detects that the target volume is using the thin provisioning function. Here, even when an existing volume is designated as the backup volume, the volume management program 7120 may newly create a volume.

The backup volume excludes the data areas not allocated with a data area in the volume using the corresponding thin provisioning function, and retains consolidated data of the data areas allocated with a data area. Thus, the backup volume capacity will be less than the volume capacity using the corresponding thin provisioning function.

(7-2) Backup and Restoration Control Method in Seventh Embodiment

The method of performing backup from the first storage sub system 7100 to the tape device 7800 via the backup server 7700 in this embodiment is now explained.

Here, although an explanation is provided where the physical device of the backup destination is a tape device 7800 on a network that is independent from the network 7400 capable of directly transferring data from the first storage sub system 7100, the physical device of the backup destination may also be a storage device 7900 connected to the network 7400 capable of directly transferring data from the first storage sub system 7100.

With this storage system 7000, backup is performed from a volume using the thin provisioning function of the first storage sub system 7100 to the tape device 7800 managed by the backup server 7700 that is unrelated to the thin provisioning function.

Nevertheless, in the backup server 7700 controlling the backup, it is known at the start of backup that the backup source volume is using the thin provisioning function.

Prior to backing up the data in the backup source volume, the CPU 7701 of the backup server 7700 requests the first storage sub system 7100 to perform the backup of information for specifying sections in which a data area has been allocated to the target volume. Here, a dedicated command for a volume using the thin provisioning function is used.

The CPU 7111 of the first controller 7110 that received the backup request notifies the logical volume management program 7120, and thereby activates the thin provisioning program 7121 with the volume management program 7120.

The activated thin provisioning program 7121 refers to the mapping table 7123, and notifies the volume management program 7120 of the total capacity of the data areas allocated to the volume using the thin provisioning function of the designated backup target.

The volume management program 7120 that received the total capacity of the data areas designates an existing volume having the same capacity as the total capacity of the data areas as the backup volume. When there is no corresponding volume or a volume is unusable, the volume management program 7120 creates a new volume having the same capacity as the total capacity of the data areas, and uses this volume as the backup volume.

After defining the backup volume, the volume management program 7120 notifies information concerning such backup volume to the backup server 7700.

Further, together with information concerning the backup volume, the volume management program 7120 notifies information for specifying the data areas in which a data area has been allocated to a volume using the thin provisioning function of the backup target (this is hereinafter referred to as the "allocation bitmap").

The CPU 7701 of the backup server 7700 prepares a tape device 7800 which is a physical device of the backup destination according to the notified backup volume, reads data from the backup volume, and writes such data in the tape device 7800.

In addition, the CPU 7701 of the backup server 7700 provides an allocation management table 7711 in the memory 7706, and stores the allocation bitmap notified from the first storage sub system 7100 therein.

Incidentally, in addition to the memory 7706, the allocation management table 7711 may also be stored in a data storage device such as a storage device 7705, tape device 7800, storage device 7900 and the like accessible from the backup server 7700. Backup processing is completed pursuant to completing the storage of the backup volume data and allocation bitmap.

Next, the method of restoring data from the tape device 7800 to the first storage sub system 7100 via the backup server 7700 based on the foregoing backup data is explained.

Here, although an explanation is provided where the physical device of the restoration source is a tape device 7800 on a network that is independent from the network 7400 capable of directly transferring data from the first storage sub system 7100, the physical device of the restoration source may also be a storage device 7900 connected to the network 7400 capable of directly transferring data from the first storage sub system 7100.

With this storage system 7000, restoration is performed from the tape device 7800 managed by the backup server 7700 that is unrelated to the thin provisioning function to the volume using the thin provisioning function of the first storage sub system 7100.

Nevertheless, in the backup server 7700 controlling the restoration, it is known at the start of backup that the restoration destination volume is using the thin provisioning function. Further, it is possible to determine that the backup source volume was using the thin provisioning function at the time of backup based on information such as the allocation bitmap status acquired at the time of backup.

At the start of restoration, the backup program 7710 requests initialization by designating the restoration destination volume of the first storage sub system 7100, and releases all data areas allocated to the volume.

Further, after releasing all data areas, the backup program 7710 refers to the allocation bitmap, and transmits the restoration source data stored in the tape device 7800 only regarding sections allocated with a data area. This restoration is complete pursuant to the completion of transmission of the restoration source data regarding all sections allocated with a data area.

Figure 33:
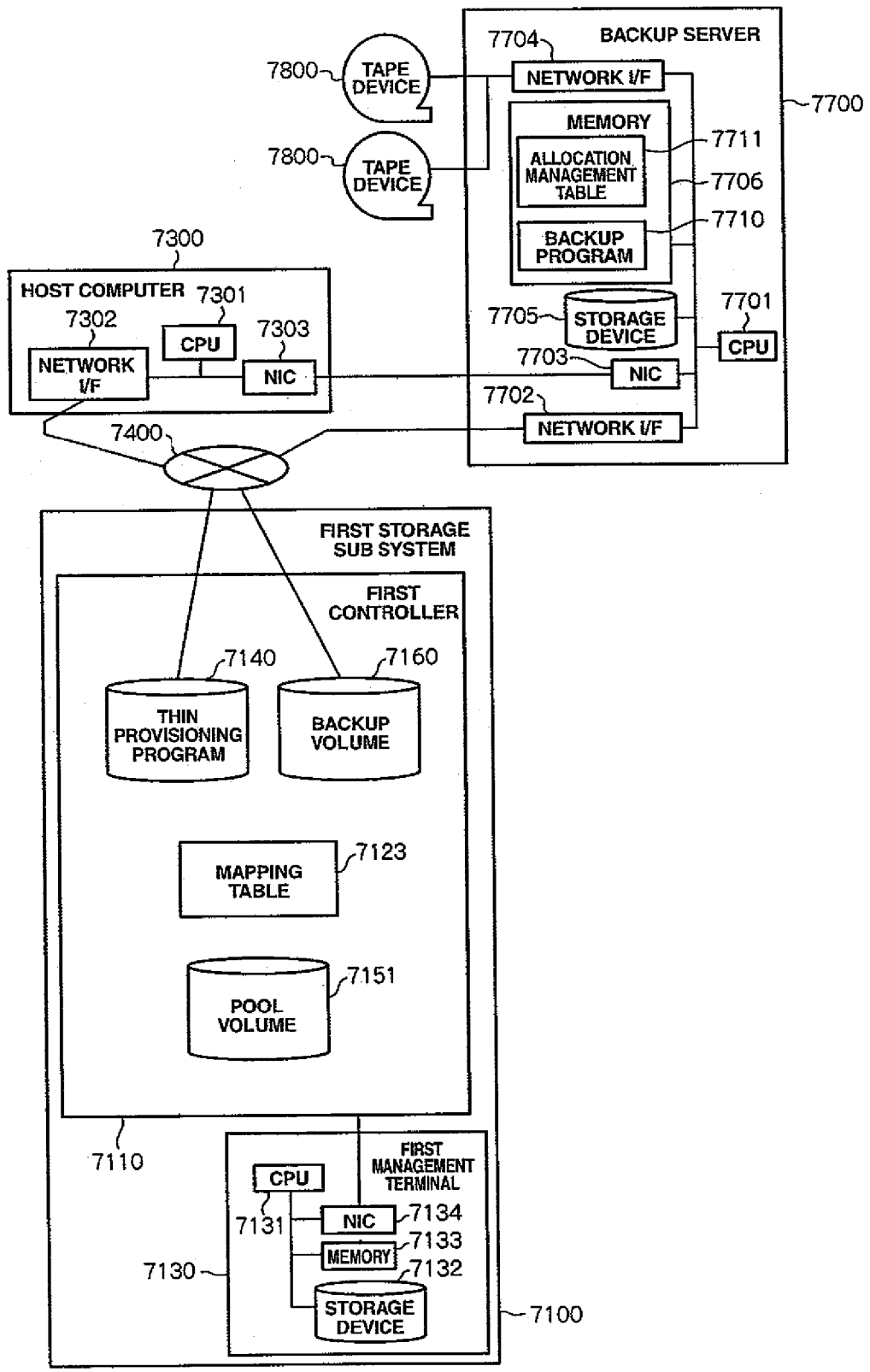
FIG. 33 is a diagram showing the configuration of the backup target volume, backup source volume and data storage destination volume in the seventh embodiment.

FIG. 33 shows the configuration of a volume managed by the first storage controller 7110.

The first controller 7110 of the first storage sub system 7100 includes a thin provisioning volume 7140 using the thin provisioning function and which is a volume to be accessed by the host computer 7300, and a backup volume 7160 which is a volume to be backed up by the backup server 7700, and data in these volumes is stored in the data area upon allocating the arbitrary data area in the pool volume 7151 as the data area.

The mapping table 7123 stores the correspondence of the thin provisioning volume 7140 and backup volume 7160 with the data area allocated in the pool volume 7151.

Figure 34:
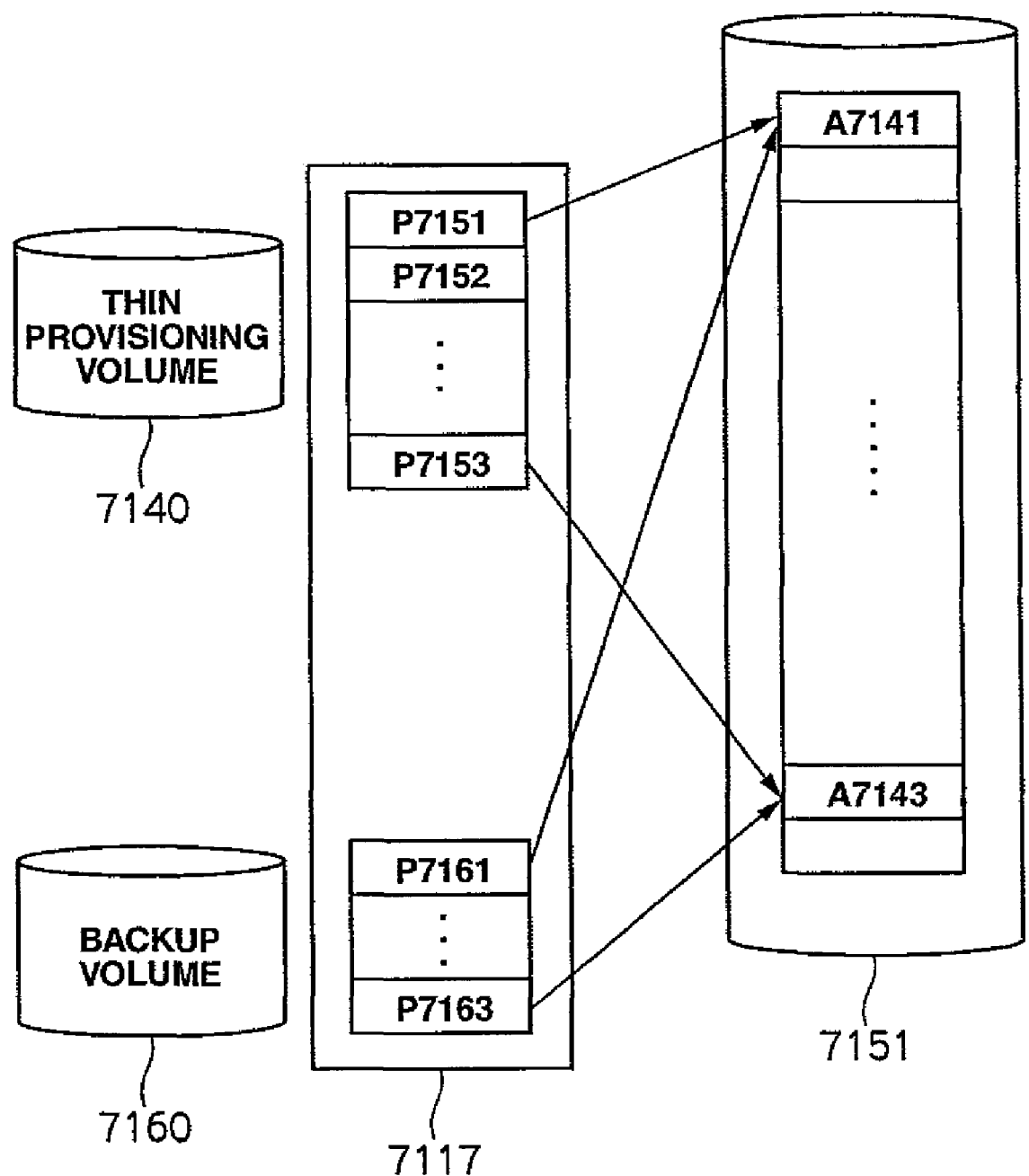
FIG. 34 is a diagram showing the configuration of a table in the seventh embodiment.

FIG. 34 illustrates the configuration of the mapping table 7123 storing the correspondence of the data area allocated in the pool volume 7151 between the thin provisioning volume 7140 and backup volume 7160, and information on such correspondence.

The mapping table 7123 retains a data area pointer indicating the data area in the pool volume 7151 incidental to the arbitrary data area in the target thin provisioning volume 7140.

Here, the data area pointer P7151, which is information in the mapping table 7123 corresponding to the data area of the thin provisioning volume 7140, for instance, points to the data area A7141 in the pool volume 7151 since the data area A7141 is allocated in the pool volume 7151.

Further, the data area pointer P7153, for example, points to the data area A7143 in the pool volume 7151 since the data area A7143 is allocated in the pool volume 7151.

Further, the data area pointer P7152, which is information in the mapping table 7123 corresponding to the data area of the thin provisioning volume 7140, for instance, does not point to any data area of the pool volume 7151 since data area in the pool volume 7151 is not allocated.

Meanwhile, the mapping table 7123, as in the case of the thin provisioning volume 7140, also retains a data area pointer indicating the data area in the pool volume 7151 incidental to the arbitrary data area in the backup volume 7160 created in correspondence with the thin provisioning volume 7140.

Nevertheless, the backup volume 7160 does not have a data area that does not point to any data area in the pool volume 7151 such as the data area pointer P7152.

Here, the data area pointer P7161, which is information in the mapping table 7123 corresponding to the data area of the thin backup volume 7160, for instance, points to the data area A7141 in the pool volume 7151 since the data area A7141 is allocated in the pool volume 7151.

Further, the data area pointer P7163, for example, points to the data area A7143 in the pool volume 7151 since the data area A7143 is allocated in the pool volume 7151.

As a result, the data area pointer P7161 and data area pointer P7151 of the mapping table 7123, and the data area pointer P7163 and data area pointer P7153 of the mapping table 7123 are able to share the same data area in the pool volume 7151.

Like this, with the storage system 7000, when data is read from the backup volume 7160 based on the table configuration of the mapping table 7123, only data stored in the data area allocated with the data area of the thin provisioning volume 7140 is acquired.

As a result, with storage system 7000, it is possible to reduce the capacity of the data storage destination at the time of backup.

Further, as a result, with the storage system 7000, it is possible to effectively prevent the allocation of an unnecessary data area to the backup destination volume and the wasteful consumption of the data area, and, as a result, the data area can be efficiently allocated to the restoration destination volume.

This invention may be employed in a storage system for replicating a volume between storage sub systems and restoring such volume, as well as in various other types of equipment involving the restoration of replicated volumes.

What we claim is:

1. A storage sub system including a first storage sub system having a first logical volume, comprised of a thin provisioning volume, where a first data area is dynamically allocated to prescribed areas, and which stores data transmitted from a host computer in said first data area, and a second storage sub system, which does not include a thin provisioning volume, having a second data area for backing up said first logical volume;

wherein said first storage sub system comprises:
a first management unit for managing the status of said first data area allocated to each of said prescribed areas of said first logical volume;
a transfer unit for transferring said data stored in said first data area allocated to each of said prescribed areas of said first logical volume to said second storage sub system; and
a restoration unit for restoring said first logical volume based on the status of said first data area managed by said first management unit and/or data transferred from said second storage sub system,
wherein, during restoring of said first logical volume, real areas of said first logical volume are allocated only to portions of said first data area where data has been written from said host computer to said first data area.

2. The storage sub system according to claim 1, wherein said restoration unit includes a first allocation unit for allocating, upon restoring said first logical volume, said first data area to an area of said first logical volume managed by said first management unit with said first data area in existence, and restores said first logical volume by writing said data transferred from said second storage sub system in said first data area allocated by said first allocation unit.

3. The storage sub system according to claim 2, wherein said first allocation unit, upon restoring said first logical volume, releases all said first data areas allocated to each of said prescribed areas of said first logical volume, and newly allocates said first data area to said area of said first logical volume managed by said first management unit with said first data area in existence.

4. The storage sub system according to claim 2, wherein said first allocation unit, upon restoring said first logical volume, releases areas deemed to be unnecessary among said first data areas allocated to each of said prescribed areas of said first logical volume, and allocates said first data area to said area when said first data area is not allocated to said area of said first logical volume managed by said first management unit with said first data area in existence.

5. The storage sub system according to claim 2, wherein said first allocation unit, upon restoring said first logical volume, releases areas designated among said first data areas allocated to each of said prescribed areas of said first logical volume, and allocates said first data area to said area when said first data area is not allocated to said area of said first logical volume managed by said first management unit with said first data area in existence.

6. The storage sub system according to claim 2, wherein said first allocation unit, upon restoring said first logical volume, allocates said first data area to said area when said first data area is not allocated to said area of said first logical volume managed by said first management unit with said first data area in existence, and releases said first data area allocated to said area when said first data area is allocated to said area of said first logical volume managed by said first management unit with said first data area not in existence.

7. The storage sub system according to claim 2, wherein said restoration unit, upon restoring said first logical volume, allocates a data area that is different from said first data area allocated to each of said prescribed areas to said area of said first logical volume managed by said first management unit with said first data area in existence.

8. The storage sub system according to claim 1, wherein said restoration unit writes said data transferred from said second storage sub system corresponding to said area when said first data area is allocated to said area of said first logical volume, and abandons said data transferred from said second storage sub system corresponding to said area when said first data area is not allocated to said area of said first logical volume.

9. The storage sub system according to claim 1, wherein said first transfer unit transfers to said second storage sub system the status of said first data area allocated to each of said prescribed areas of said first logical volume managed by said management unit;
   wherein said second storage sub system has a second logical volume in which said second data area is dynamically allocated to each of said prescribed areas, and comprises:
   a second management unit for managing the status of said first data area allocated to each of said prescribed areas of said first logical volume transferred by said first transfer unit as the status of a second data area allocated to each of said prescribed areas of said second logical volume;
   a second allocation unit for allocating said second data area to said area of said second logical volume managed by said second management unit with said second data area in existence; and
   a replication unit for replicating said first logical volume as a second logical volume by writing said data transferred by said first transfer unit in a corresponding second data area allocated by said second allocation unit.

10. The storage sub system according to claim 1, wherein said first management unit manages the status of said first data area allocated to each of said first logical volume with a bitmap, and further manages said bitmap by associating it with a number;
   wherein said first transfer unit transfers said number associated with said bitmap to said second storage sub system; and
   wherein said restoration unit restores said first logical volume based on said bitmap associated with said number transferred from said second storage sub system.

11. The storage sub system according to claim 1, wherein said first management unit manages the status of said first data area allocated to each of said prescribed areas of said first logical volume with a bitmap;
   wherein said first transfer unit transfers said bitmap to said second storage sub system; and
   wherein said second storage sub system comprises:
   a retention unit for retaining said data transferred by said first transfer unit in said second data area; and
   a second transfer unit for transferring, upon restoring said first logical volume, said data retained by said retention unit to said first storage sub system, only for sections allocated with said first data area, based on said bitmap transferred by said first transfer unit.

12. The storage sub system according to claim 1, wherein said second data area is a tape media in which the written data cannot be altered.

13. The storage sub system according to claim 1, wherein said first management unit manages the status of said first data area allocated to each of said prescribed areas of said first logical volume stored in said first logical volume;
   wherein said first transfer unit transfers the status of said first data area allocated to each of said prescribed areas of said first logical volume stored in said first logical volume, and said data, to said second storage sub system; and
   wherein said restoration unit restores said first logical volume based on the status of said first data area allocated to each of said prescribed areas of said first logical volume transferred from said second storage sub system.

14. The storage sub system according to claim 1, wherein said first management unit manages the occurrence of an update in said first logical volume;
   wherein said first transfer unit transfers the status of a data area in which the update in said first logical volume managed by said first management unit has occurred, and said data stored in said data area, to said second storage sub system; and
   wherein said second storage sub system comprises:
   a second management unit for managing the status of a data area in which the update in said first logical volume transferred by said first transfer unit has occurred;
   a retention unit for retaining said data transferred by said first transfer unit in said second data area; and
   a second transfer unit for transferring, upon restoring said first logical volume, said data retained by said retention unit to said first storage sub system, only for sections in which the update in said first logical volume has occurred, based on the status of a data area in which the update in said first logical volume managed by said second management unit has occurred.

15. The storage sub system according to claim 1, wherein said first storage sub system includes a backup volume having the same capacity as the total capacity of the capacity allocated with said first data area of said first logical volume; and
   said first management unit manages said first data area allocated to said first logical volume and said first data area allocated to said backup volume so as to share the same data area.

16. A data restoration method of a storage sub system including a first storage sub system having a first logical volume, comprised of a thin provisioning volume, where a first data area is dynamically allocated to prescribed areas, and which stores data transmitted from a host computer in said first data area, and a second storage sub system, which does not include a thin provisioning volume, having a second data area for backing up said first logical volume, comprising:
   a first step for managing the status of said first data area allocated to each of said prescribed areas of said first logical volume;
   a second step for transferring said data stored in said first data area allocated to each of said prescribed areas of said first logical volume to said second storage sub system; and
   a third step for restoring said first logical volume based on the status of said first data area managed at said first step and/or data transferred from said second storage sub system,
   wherein, during restoring of said first logical volume, real areas of said first logical volume are allocated only to portions of said first data area where data has been written from said host computer to said first data area.

17. The data restoration method of a storage sub system according to claim 16, wherein, at said third step, upon restoring said first logical volume, said first data area is allocated to an area of said first logical volume managed by said first management unit with said first data area in existence, and said first logical volume is restored by writing said data transferred from said second storage sub system in said first data area allocated by said first allocation unit.

18. The data restoration method of a storage sub system according to claim 17, wherein, at said third step, upon restoring said first logical volume, all said first data areas allocated to each of said prescribed areas of said first logical volume are released, and said first data area is newly allocated to said area of said first logical volume managed by said first management unit with said first data area in existence.

19. The data restoration method of a storage sub system according to claim 17, wherein, at said third step, upon restoring said first logical volume, areas deemed to be unnecessary among said first data areas allocated to each of said prescribed areas of said first logical volume are released, and said first data area is allocated to said area when said first data area is not allocated to said area of said first logical volume managed by said first management unit with said first data area in existence.

20. The data restoration method of a storage sub system according to claim 17, wherein, at said third step, upon restoring said first logical volume, areas designated among said first data areas allocated to each of said prescribed areas of said first logical volume are released, and said first data area is allocated to said area when said first data area is not allocated to said area of said first logical volume managed by said first management unit with said first data area in existence.

21. The data restoration method of a storage sub system according to claim 17, wherein, at said third step, upon restoring said first logical volume, said first data area is allocated to said area when said first data area is not allocated to said area of said first logical volume managed by said first management unit with said first data area in existence, and said first data area, allocated to said area when said first data area is allocated to said area of said first logical volume managed by said first management unit with said first data area not in existence, is released.

22. The data restoration method of a storage sub system according to claim 17, wherein, at said third step, said data transferred from said second storage sub system, corresponding to said area, is written when said first data area is allocated to said area of said first logical volume, and said data transferred from said second storage sub system, corresponding to said area, is abandoned when said first data area is not allocated to said area of said first logical volume.

23. The data restoration method of a storage sub system according to claim 17, wherein, at said third step, upon restoring said first logical volume, a data area that is different from said first data area allocated to each of said prescribed areas is allocated to said area of said first logical volume managed by said first management unit with said first data area in existence.

* * * * *